(12) United States Patent
Jung et al.

(10) Patent No.: US 10,558,079 B2
(45) Date of Patent: Feb. 11, 2020

(54) DISPLAY APPARATUS

(71) Applicant: Samsung Electronics Co., Ltd., Suwon-si, Gyeonggi-do (KR)

(72) Inventors: Moon Il Jung, Suwon-si (KR); Joo Ho Kim, Suwon-si (KR); Byung Hwa Seo, Seongnam-si (KR); Dong Hyun Sohn, Hwaseong-si (KR); Tatsuhiro Otsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/580,769

(22) PCT Filed: Mar. 16, 2016

(86) PCT No.: PCT/KR2016/002627
§ 371 (c)(1),
(2) Date: Dec. 8, 2017

(87) PCT Pub. No.: WO2016/200025
PCT Pub. Date: Dec. 15, 2016

(65) Prior Publication Data
US 2018/0224678 A1    Aug. 9, 2018

(30) Foreign Application Priority Data

Jun. 12, 2015 (KR) .................. 10-2015-0083286

(51) Int. Cl.
*G02F 1/1335* (2006.01)
*G02F 1/1333* (2006.01)
(Continued)

(52) U.S. Cl.
CPC ...... *G02F 1/133555* (2013.01); *G02F 1/1347* (2013.01); *G02F 1/13318* (2013.01);
(Continued)

(58) Field of Classification Search
CPC .................................................. G02F 1/133555
See application file for complete search history.

(56) References Cited

U.S. PATENT DOCUMENTS

2009/0231526 A1    9/2009 Yoshihara
2012/0026434 A1*   2/2012 Chen ................. G02F 1/133555
                                              349/106
(Continued)

FOREIGN PATENT DOCUMENTS

JP    2009086676 A    4/2009
KR    10-2008-0051800 A    6/2008
(Continued)

OTHER PUBLICATIONS

Supplementary European Search Report dated Jul. 2, 2018 in connection with European Patent Application No. 16 80 7668.
(Continued)

*Primary Examiner* — Edmond C Lau

(57) ABSTRACT

An aspect of the present disclosure is to provide a display apparatus capable of performing an information display function and a mirror function. Another aspect of the present disclosure is to provide a display apparatus of displaying a predetermined object in a turned-off state. Another aspect of the present disclosure is to provide a display apparatus including partition walls disposed in space between electrodes of a cholesteric Liquid Crystal Display (LCD) device. Another aspect of the present disclosure is to provide a transparent display apparatus with improved visibility using cholesteric liquid crystals. Disclosed is a display apparatus includes a reflective layer; and a liquid crystal layer disposed in front of the reflective layer, and configured to be converted between a transmissive mode for transmitting outside light, a display mode for reflecting outside light to display an object, and a transflective mode for transmitting outside light and reflecting outside light at a predetermined area.

19 Claims, 47 Drawing Sheets

(51) Int. Cl.
*G02F 1/1347* (2006.01)
*G02F 1/133* (2006.01)
G02F 1/1343 (2006.01)
G02F 1/137 (2006.01)

(52) U.S. Cl.
CPC ........ *G02F 1/133377* (2013.01); *G02F 1/137* (2013.01); *G02F 1/134309* (2013.01); *G02F 2001/13312* (2013.01); *G02F 2001/13478* (2013.01); *G02F 2203/01* (2013.01); *G02F 2203/02* (2013.01)

(56) References Cited

U.S. PATENT DOCUMENTS

| | | |
|---|---|---|
| 2012/0274886 A1 | 11/2012 | Hwang et al. |
| 2013/0063048 A1 | 3/2013 | Matthies |
| 2015/0138214 A1 | 5/2015 | Roh et al. |
| 2015/0226988 A1* | 8/2015 | Chen .................... G02F 1/1334 349/12 |

FOREIGN PATENT DOCUMENTS

| | | |
|---|---|---|
| KR | 10-2011-0014904 A | 2/2011 |
| KR | 10-2011-0032340 A | 3/2011 |

OTHER PUBLICATIONS

ISA/KR, "International Search Report and Written Opinion," Application No. PCT/KR2016/002627, dated Aug. 2, 2016, 13 pages.
Communication from a foreign patent office in a counterpart foreign application, European Patent Office, "Supplementary Partial European Search Report," European Application No. EP 16807668.5, dated Mar. 15, 2018, 13 pages.
European Patent Office, "Communication under Rule 71(3) EPC," Application No. EP16807668.5, dated May 8, 2019, 147 pages.

* cited by examiner

< FIRST MODE >

< FIRST MODE >

< SECOND MODE >

< SECOND MODE >

< THIRD MODE >

FIG. 20B
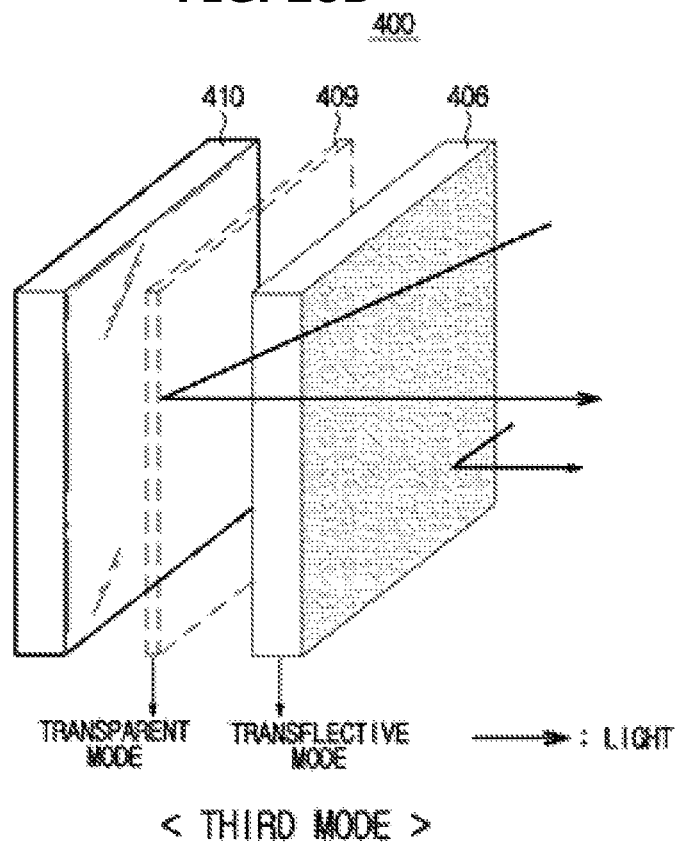
(a)
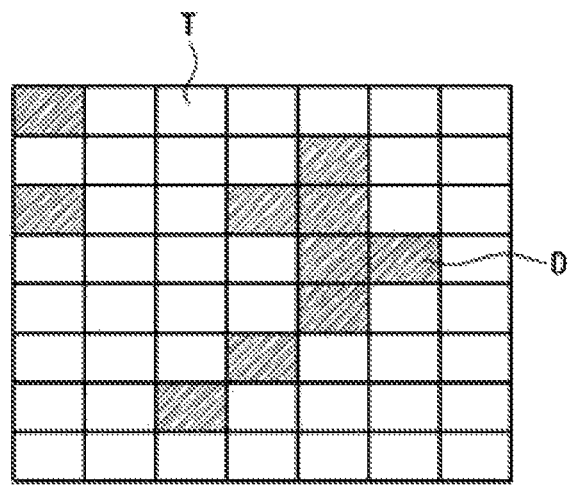
(b)

< FOURTH MODE >

< FIRST MODE >

< SECOND MODE >

< THIRD MODE >

< FOURTH MODE >

DISPLAY APPARATUS

CROSS-REFERENCE TO RELATED APPLICATIONS AND CLAIM OF PRIORITY

The present application claims priority under 35 U.S.C. § 365 and is a 371 National Stage of International Application No. PCT/KR2016/002627, filed Mar. 16, 2016, which claims the benefit of Korean Patent Application No. 10-2015-0083286, filed Jun. 12, 2015, the disclosures of which are fully incorporated herein by reference into the present disclosure as if fully set forth herein.

TECHNICAL FIELD

The present disclosure relates to a display apparatus.

A display apparatus is an apparatus of displaying image information, and recently, flat-panel display apparatuses having excellent performance are being developed.

Representative examples of the flat-panel display apparatuses are a Thin Film Transistor-Liquid Crystal Display (TFT-LCD) and a Liquid Crystal Display (LCD).

BACKGROUND

The display apparatus can be classified into a transmissive type display apparatus and a reflective type display apparatus. An example of the transmissive type display apparatus is a TFT-LCD. The TFT-LCD has a problem in which backlight sources disposed below a lower substrate consume a large amount of power.

A reflective type LCD displays image information by reflecting outside light without using backlight sources. Accordingly, the reflective type LCD has an advantage that it consumes a small amount of power compared to the transmissive type LCD.

SUMMARY

An aspect of the present disclosure is to provide a display apparatus capable of performing an information display function and a mirror function.

Another aspect of the present disclosure is to provide a display apparatus of displaying a predetermined object in a turned-off state.

Another aspect of the present disclosure is to provide a display apparatus including partition walls disposed in space between electrodes of a cholesteric Liquid Crystal Display (LCD) device.

Another aspect of the present disclosure is to provide a transparent display apparatus with improved visibility using cholesteric liquid crystals.

In accordance with an aspect of the present disclosure, there is provided a display apparatus including: a display panel; and an auxiliary panel disposed in front of the display panel, and configured to display a predetermined object if driving of the display panel terminates.

Also, the auxiliary panel may reflect light to display the predetermined object if driving of the display panel terminates.

Also, the auxiliary panel may be converted to a transparent state if the display panel is driven.

Also, the display apparatus may further include a controller configured to apply a voltage to the auxiliary panel to convert the auxiliary panel to a transparent state, if the display panel is driven.

Also, if driving of the display panel terminates, the controller may control supplying of a voltage to be applied to the auxiliary panel based on information about the predetermined object so that the auxiliary panel displays the predetermined object.

Also, the auxiliary panel may include cholesteric liquid crystals; and a substrate including an electrode configured to apply a voltage to the cholesteric liquid crystals.

Also, the substrate may further include an auxiliary electrode disposed in the electrodes, and having electrical conductivity that is higher than electrical conductivity of the electrodes.

Also, the auxiliary electrodes may be disposed in at least ones of ends in width direction of the electrodes to narrow space between the electrodes.

Also, the auxiliary panel may further include a plurality of partition walls disposed in space between the electrodes.

Also, the substrate may include: a first substrate including a plurality of first electrodes; and a second substrate including a plurality of second electrodes, and facing the first substrate, wherein the cholesteric liquid crystals are disposed between the first substrate and the second substrate.

Also, the auxiliary panel may further include a plurality of partition walls formed in a direction extending toward the second substrate in space between the plurality of first electrodes, and formed in a direction extending toward the first substrate in space between the plurality of second electrodes.

Also, the partition walls may include a polymer structure.

In accordance with another aspect of the present disclosure, there is provided a display apparatus including: a reflective layer; and a liquid crystal layer disposed in front of the reflective layer, and configured to be converted between a transmissive mode for transmitting outside light, a display mode for reflecting outside light to display an object, and a transflective mode for transmitting outside light and reflecting outside light at a predetermined area.

The display apparatus may further include a controller configured to apply a predetermined voltage to the liquid crystal layer to convert the liquid crystal layer to the transmissive mode, to control supplying of a voltage to the liquid crystal layer to convert the liquid crystal layer to the display mode, and to control supplying of a voltage to an area on which the object is displayed to convert the liquid crystal layer to the transflective mode.

The display apparatus may further include a conversion layer disposed between the reflective layer and the liquid crystal layer, and configured to be converted between an opaque mode and a transparent mode.

The conversion layer may include Twisted Nematic (TN) liquid crystals.

The display apparatus may further include: an input device configured to enable a user to select a first mode for displaying information and a second mode for performing a mirror function; and a controller configured to apply, if the second mode is selected, a predetermined voltage to the liquid crystal layer to convert the liquid crystal layer to the transmissive mode, and to stop supplying a voltage to the conversion layer to convert the conversion layer to the transparent mode, and configured to control, if the first mode is selected, supplying of a voltage to the liquid crystal layer to convert the liquid crystal layer to the display mode, and to apply a predetermined voltage to the conversion layer to convert the conversion layer to the opaque mode.

The input device may be configured to enable a user to further select a third mode for performing a mirror function and displaying an object at a predetermined area, and if the third mode is selected, the controller may apply a predetermined voltage to the liquid crystal layer to convert the liquid crystal layer to the transflective mode, control supplying of a voltage to the predetermined area on which the object is displayed so that the predetermined area has predetermined reflectivity, and stop supplying a voltage to the conversion layer to convert the conversion layer to the transmissive mode.

The display apparatus may further include a sensor configured to sense an ambient brightness around the display apparatus, and if an ambient brightness sensed by the sensor is greater than or equal to a reference value, the controller may reduce reflectivity of the predetermined area on which the object is displayed so that the predetermined area has reflectivity that is lower than reflectivity of the liquid crystal layer in the first mode.

The display apparatus may further include a sensor configured to sense an ambient brightness around the display apparatus, and if the third mode is selected, the controller may stop supplying a voltage to a part of pixels constituting the predetermined area on which the object is displayed, or if an ambient brightness sensed by the sensor is greater than or equal to a reference value, the controller may supply a voltage to the part of the pixels so that the part of the pixels has reflectivity that is lower than reflectivity of the liquid crystal layer in the first mode.

The conversion layer may include Vertical Alignment (VA) liquid crystals.

The display apparatus may further include: an input device configured to enable a user to select a first mode for displaying information and a second mode for performing a mirror function; and a controller configured to apply, if the second mode is selected, a predetermined voltage to the liquid crystal layer to convert the liquid crystal layer to the transmissive mode, and to apply a predetermined voltage to the conversion layer to convert the conversion layer to the transparent mode, and configured to control, if the first mode is selected, supplying of a voltage to the liquid crystal layer to convert the liquid crystal layer to the display mode, and to stop applying a voltage to the conversion layer to convert the conversion layer to the opaque mode.

The input device may be configured to enable a user to further select a third mode for performing a mirror function and displaying an object at a predetermined area, and if the third mode is selected, the controller may apply a predetermined voltage to the liquid crystal layer to convert the liquid crystal layer to a transflective mode, adjust supplying of a voltage to the predetermined area on which the object is displayed so that the predetermined area has predetermined reflectivity, and apply a predetermined voltage to the conversion layer to convert the conversion layer to the transparent mode.

The display apparatus may further include a sensor configured to sense an ambient brightness around the display apparatus, and if an ambient brightness sensed by the sensor is greater than or equal to a reference value, the controller may supply a voltage to the predetermined area on which the object is displayed so that the predetermined area has reflectivity that is lower than reflectivity of the liquid crystal layer in the first mode.

The display apparatus may further include a sensor configured to sense an ambient brightness around the display apparatus, and if the third mode is selected, the controller may stop supplying a voltage to a part of pixels constituting the predetermined area on which the object is displayed, and if an ambient brightness sensed by the sensor is greater than or equal to a reference value, the controller may supply a voltage to the part of the pixels so that the part of the pixels has reflectivity that is lower than reflectivity of the liquid crystal layer in the first mode.

The reflective layer may include a device to be converted between a reflective mode and a transparent mode depending on whether or not a voltage is applied.

The liquid crystal layer may include: cholesteric liquid crystal; and a substrate including an electrode configured to apply a voltage to the cholesteric liquid crystals.

The substrate may further include an auxiliary electrode disposed in the electrodes, and having electrical conductivity that is higher than electrical conductivity of the electrodes.

The auxiliary electrodes may be disposed in at least ones of ends in width direction of the electrodes to narrow space between the electrodes.

The auxiliary panel may further include a plurality of partition walls disposed in space between the electrodes.

The substrate may include: a first substrate including a plurality of first electrodes; and a second substrate including a plurality of second electrodes, and facing the first substrate, wherein the cholesteric liquid crystals are disposed between the first substrate and the second substrate.

The liquid crystal layer may include a plurality of partition walls aligned in at least one direction of a direction extending toward the second in space between the plurality of first electrodes substrate and a direction extending toward the first substrate in space between the plurality of second electrodes.

The partition walls may include a polymer structure.

In accordance with another aspect of the present disclosure, there is provided a display apparatus including: a transparent display panel; and a liquid crystal layer disposed behind the transparent display panel, and configured to be converted between a reflective mode for reflecting light generated from the transparent display panel and a transmissive mode for transmitting light generated from the transparent display panel.

Also, the display apparatus may further include a controller configured to apply a predetermined voltage to the liquid crystal layer to convert the liquid crystal layer to the transmissive mode, and to stop supplying a voltage to the liquid crystal layer to convert the liquid crystal layer to the reflective mode.

Also, the transparent display panel may include a light source and a transparent display disposed in front of the light source.

Also, the display apparatus may further include: an input device configured to enable a user to select a first mode for displaying information and a second mode for maintaining a transparent state; and a controller configured to apply, if the second mode is selected, a predetermined voltage to the liquid crystal layer to convert the liquid crystal layer to the transmissive mode, and to stop driving the light source and the transparent display, and configured to stop, if the first mode is selected, supplying a voltage to the liquid crystal layer to convert the liquid crystal layer to the reflective mode, and to drive the light source and the transparent display.

The input device may be configured to enable a user to further select a third mode for displaying information in a transparent state, and if the third mode is selected, the controller may apply a predetermined voltage to the liquid crystal layer to convert the liquid crystal layer to the transmissive mode, and drive the light source and the transparent display.

The display apparatus may further include a sensor configured to sense an ambient brightness around the display apparatus, and if an ambient brightness sensed by the sensor is greater than or equal to a reference value, the controller may reduce a brightness of the light source such that the brightness of the light source is lower than a brightness of the light source in the first mode or the third mode.

The display apparatus may further include a sensor configured to sense an ambient brightness around the display apparatus, and if the first mode mode is selected, and an ambient brightness sensed by the sensor is greater than or equal to a reference value, the controller may lower reflectivity of the liquid crystal layer so that the liquid crystal layer has reflectivity that is lower than reflectivity of the liquid crystal layer in the first mode.

The input device may be configured to enable a user to select a fourth mode for performing a lighting function, and if the fourth mode is selected, the controller may apply a predetermined voltage to the liquid crystal layer to convert the liquid crystal layer to the transmissive mode, drive the light source, and stop driving the transparent display.

The display apparatus may further include a sensor configured to sense an ambient brightness around the display apparatus, and if the fourth mode is selected, and an ambient brightness sensed by the sensor is greater than or equal to a reference value, the controller may lower a brightness of the light source so that the light source has a brightness that is lower than a brightness of the light source in the fourth mode.

In accordance with another aspect of the present disclosure, there is provided a display apparatus including a first substrate including a plurality of first electrodes; a second substrate including a plurality of second electrodes, and facing the first substrate; cholesteric liquid crystals disposed between the first substrate and the second substrate; and a plurality of partition walls formed in a direction extending toward the second substrate in space between the plurality of first electrodes, and formed in a direction extending toward the first substrate in space between the plurality of second electrodes.

Also, the display apparatus may further include an auxiliary electrode disposed in the first electrodes and the second electrodes, and having electrical conductivity that is higher than electrical conductivity of the electrodes.

Also, the auxiliary electrodes may be disposed in at least ones of ends in width direction of the electrodes to narrow space between the electrodes.

Also, the partition walls may include a polymer structure.

According to the display apparatus according to the disclosed embodiments, it is possible to reduce a voltage drop that is caused by a large screen of the display apparatus.

Also, it is possible to increase an isolation effect between electrodes of cholesteric liquid crystals, and to improve structural stability of upper and lower substrates of a cholesteric liquid crystal layer.

Also, it is possible to provide an information display function which is the unique function of the display apparatus, and a mirror function at the same time.

Also, by displaying various objects after driving of the display apparatus terminates, the display apparatus can be used like a picture.

BRIEF DESCRIPTION OF THE DRAWINGS

FIGS. 20A to 20D are views for describing a third mode of the display apparatus according to the third embodiment of the present disclosure.

DETAILED DESCRIPTION

Figure 1A:
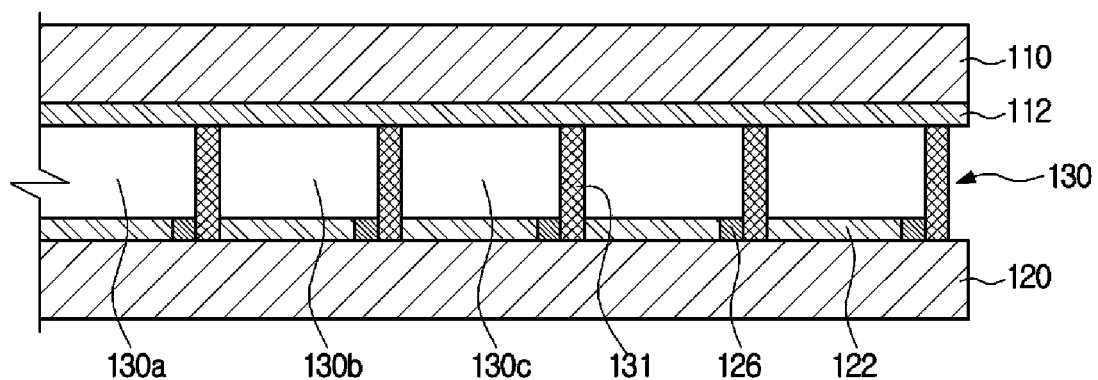
FIGS. 1A, 1B, and 2 show a structure of a display apparatus according to a first embodiment of the present disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification indicate elements or components that perform the substantially same functions.

Also, the terms used in the present specification are for describing embodiments and not for limiting and/or restricting the present disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Also, a touch input may be made by one of fingers including a thumb or a touchable input unit (for example, a stylus pen). The touch input may include hovering made by one of fingers including a thumb or a touchable input unit. Also, the touch input may include a multi-touch input as well as a single-touch input.

Hereinafter, an embodiment of the present disclosure will be described in detail with reference to the accompanying drawings.

Figure 1B:
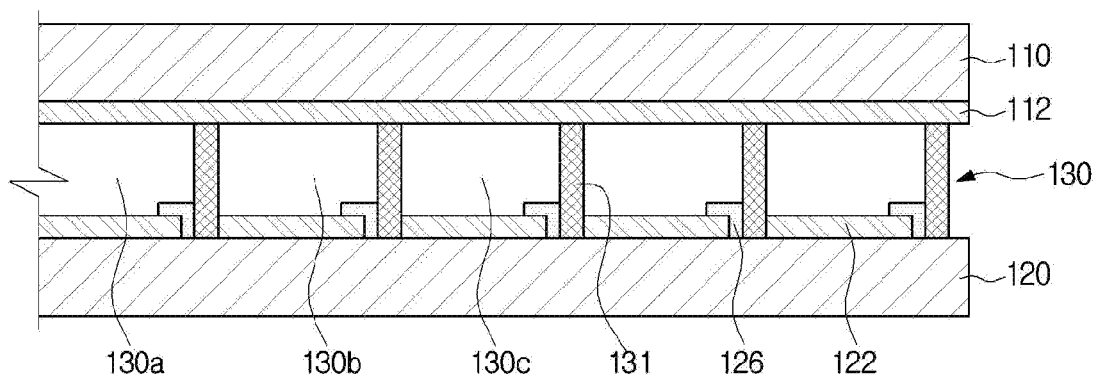
Figure 2:
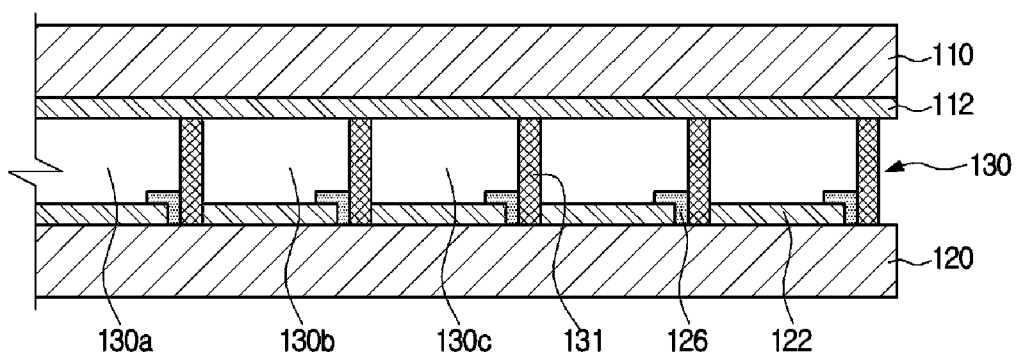
Figure 3:
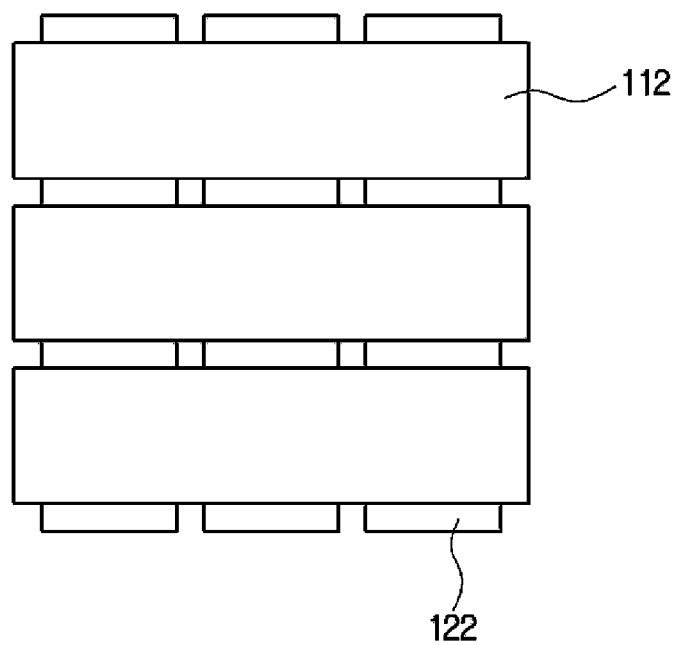
FIG. 3 shows an array of electrodes provided in the display apparatus according to the first embodiment of the present disclosure.

FIGS. 1A, 1B, and 2 show a structure of a display apparatus according to a first embodiment of the present disclosure, and FIG. 3 shows an array of electrodes provided in the display apparatus according to the first embodiment of the present disclosure.

As shown in FIG. 1A, a display apparatus 100 may include a first substrate 120, a plurality of first electrodes 122 arranged on one surface of the first substrate 120, a second substrate 110, a plurality of second electrodes 112 arranged on one surface of the second substrate 110, and a liquid crystal layer 130 disposed between the first substrate 120 and the second substrate 110. Also, although not shown in the drawings, alignment films for aligning liquid crystal molecules may be disposed on the first electrodes 122 and the second electrodes 112.

All of the first substrate 120, the first electrodes 122, the second substrate 110, and the second electrodes 112 may be transparent in order to increase transmittance of the display apparatus 100.

More specifically, the first substrate 120 and the second substrate 110 may be implemented with transparent glass or transparent plastic. For example, the plastic may be a material selected from a group including silicon, silicon oxide, silicon carbide, polyethylene terephthalate (PET), polyethylene naphthalate (PEN), etc. If the first substrate 120 and the second substrate 110 are implemented with transparent plastic, the first substrate 120 and the second substrate 110 may become thinner and lighter than glass substrates, and also have flexibility. Also, if the first and second substrates 120 and 110 have flexibility, various designs can be implemented.

Also, the first and second electrodes 120 and 110 may be transparent electrodes in order to increase transmittance of the display apparatus 100. The transparent electrodes may be formed of a transparent conductive material, and examples of the transparent conductive material may be Indium Tin Oxide (ITO), Indium Zinc Oxide (IZO), Aluminium Doped Zinc Oxide (ZAO), etc.

The display apparatus 100 may be driven by a passive matrix method or an active matrix method.

If the display apparatus 100 is driven by the passive matrix method, the first electrodes 122 and the second electrodes 112 may be arranged in straight parallel lines on the first substrate 120 and the second substrate 110, and the first substrate 120 may be coupled with the second substrate 110 such that the first electrodes 122 and the second electrodes 112 cross at right angles, as shown in FIG. 3. An area at which a first electrode 122 and a second electrode 112 cross may form a pixel, and by applying a voltage to a first electrode 122 and a second electrode 112 corresponding to a desired pixel, the corresponding pixel may be controlled.

If the display apparatus 100 is driven by the active matrix method, a switching device such as a transistor may be disposed in each pixel. For example, a TFT panel (not shown) including transistors for driving pixels may be disposed on the first substrate 120 of the display apparatus 100. In this case, common electrodes (not shown) may be formed on the second substrate 110 to apply a voltage to the liquid crystal layer 130, together with an output voltage from the transistors. The common electrodes may be formed of a transparent conductive material, and examples of the transparent conductive material may be ITO, IZO, ZAO, etc.

If the display apparatus 100 is driven by the active matrix method, a switching device such as a transistor may be disposed in each pixel. Since the transistor can adjust a brightness of the pixel quickly, high response speed and high-resolution images can be implemented. If the display apparatus 100 is driven by the passive matrix method, each pixel may need to include no switching device, thereby simplifying a manufacturing process and improving the transmittance of the display apparatus 100. Also, the pixels can be easily driven and controlled.

Figure 4:
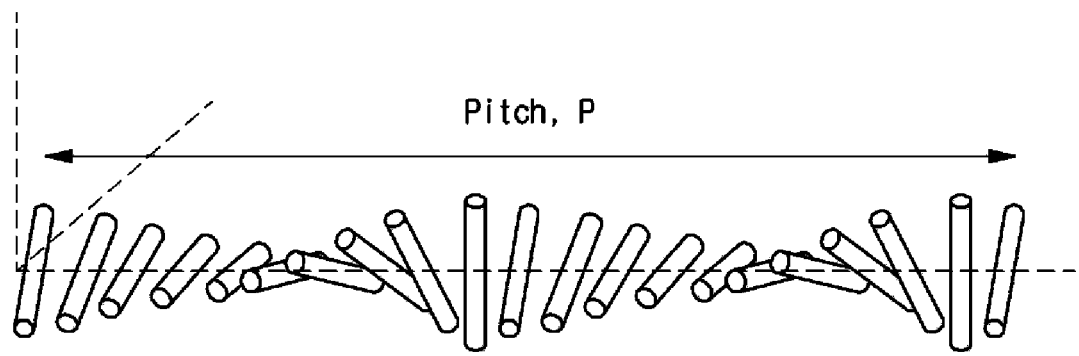
FIG. 4 shows a structure of cholesteric liquid crystals.
Figure 5:
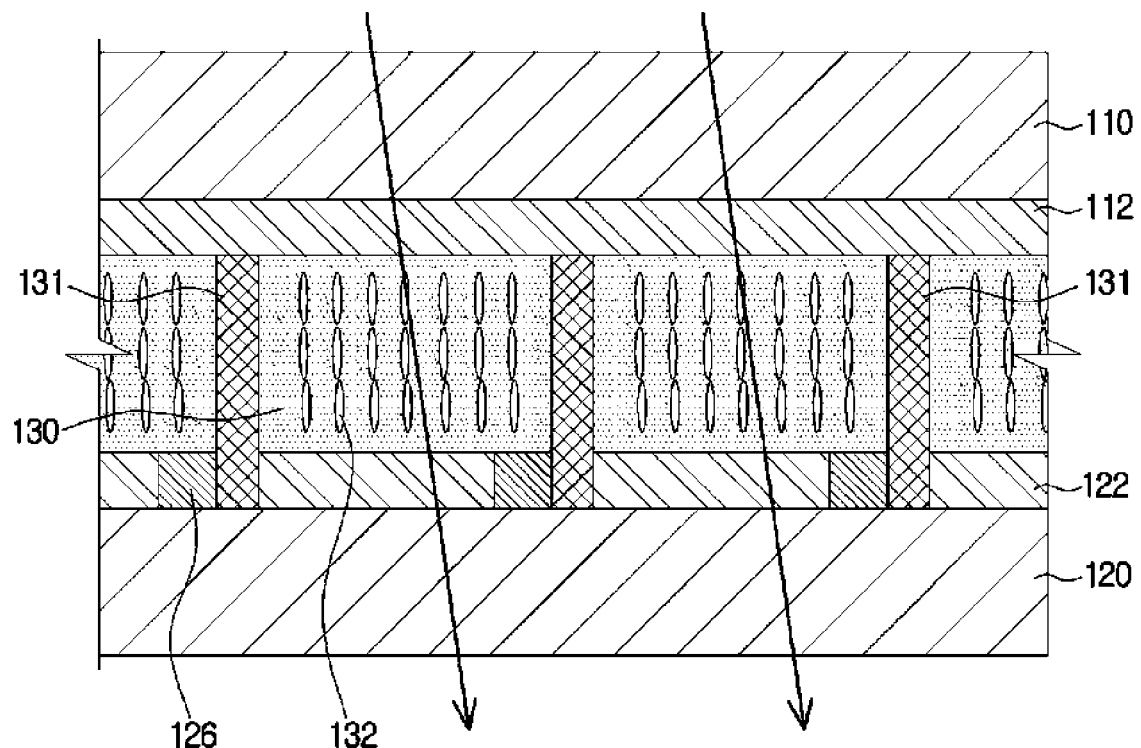
FIGS. 5 to 7 are cross-sectional views showing different states of cholesteric liquid crystals included in the display apparatus according to the first embodiment of the present disclosure.
Figure 6:
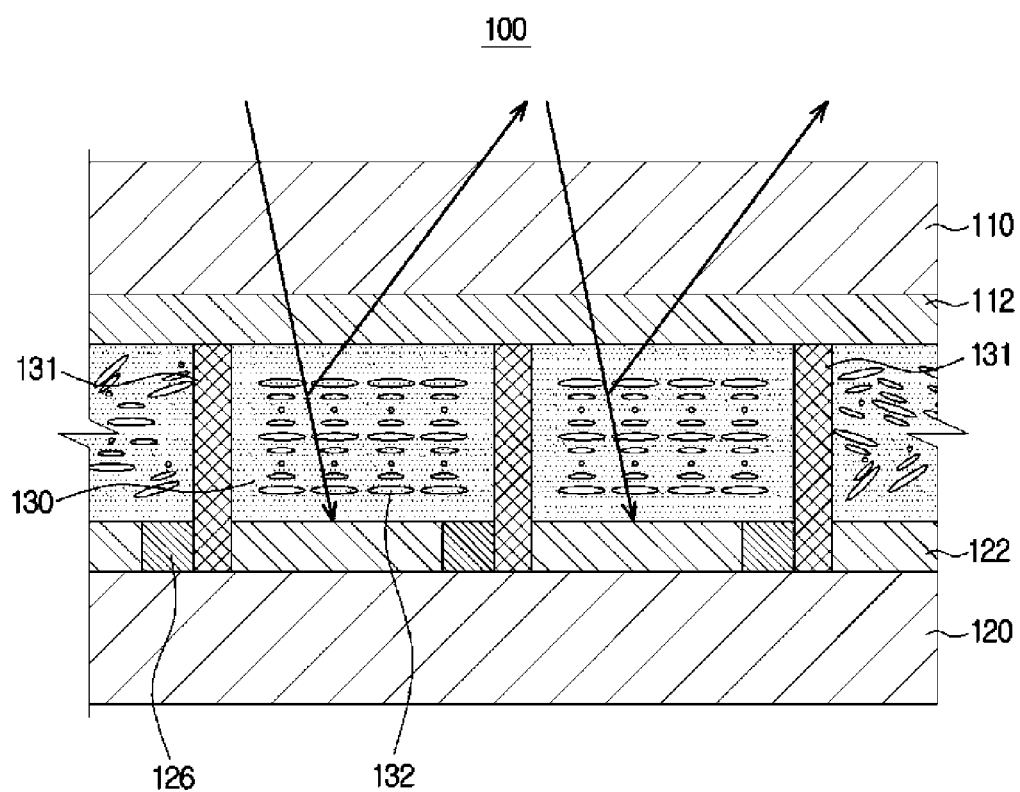
Figure 7:
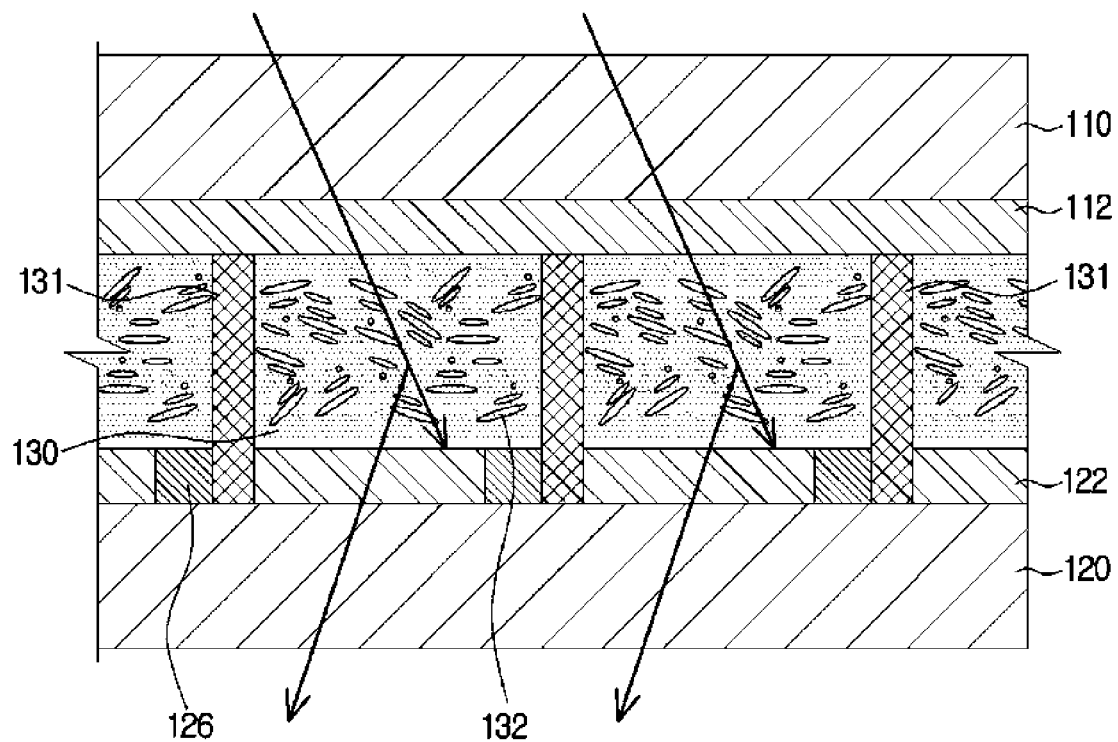

The liquid crystal layer 130 may include cholesteric liquid crystals 132 (see FIG. 5). FIG. 4 shows a structure of the cholesteric liquid crystals 132, and FIGS. 5 to 7 are cross-sectional views showing different states of the cholesteric liquid crystals 132 included in the display apparatus 100 according to the first embodiment of the present disclosure.

As shown in FIG. 4, the cholesteric liquid crystals 132 may have a helical structure in which molecules are twisted at regular intervals. The regular interval is called a "pitch" P. The cholesteric liquid crystals 132 may have characteristics of selectively reflecting light according to the twisting direction and the pitch P of the helical structure.

A reflective wavelength band may be decided by the pitch P, and a wavelength $\lambda$ at which maximum reflection occurs may be decided as $\lambda = n \cdot p$, wherein n is an average refractive index of cholesteric liquid crystal molecules, according to the Bragg law.

In order to cause the cholesteric liquid crystals 132 to have a helical structure, chiral dopants may be added, and the pitch P may be adjusted according to a chiral dopant content. If the chiral dopant content is high, the pitch P may be reduced to lower a reflective wavelength band. Accordingly, by appropriately adjusting the chiral properties to reflect a specific wavelength of a visible light area of outside light incident to the cholesteric liquid crystals 132, it is possible to implement color or to increase the transmittance of the incident light to be transparent.

The cholesteric liquid crystals 132 have bistability since they can exist in two stable states: a planar state in which they reflect light even when no voltage is applied; and a focal conic state in which they scatter light. If a high voltage is applied to the cholesteric liquid crystals 132, the cholesteric liquid crystals 132 may be converted to a homeotropic state in which they can transmit light.

The planar state means a state in which the helical axes of the cholesteric liquid crystals 132 are substantially vertical to the first and second substrates 120 and 110, for example, the first substrate 120, and the focal conic state means a state in which the helical axes of the cholesteric liquid crystals 132 are substantially parallel to the first substrate 120.

If a low-voltage pulse is applied to the cholesteric liquid crystals 132 in the planar state, the helical axes of the cholesteric liquid crystals 132 that are vertical to the first substrate 120 may be converted to be parallel to the first substrate 120 so that the cholesteric liquid crystals 132 become a focal conic state. If a high voltage continues to be applied to the cholesteric liquid crystals 132 in the focal conic state, the helical structures may be untwisted so as to become a homeotropic state in which the major axes of the liquid crystal molecules are vertical to the first and second substrates 120 and 110. If the applied voltage is gradually reduced in the homeotropic state, the homeotropic state may be converted to a focal conic state, and if the applied voltage is abruptly removed, the homeotropic state may be converted to a planar state. The states of the liquid crystal layer 130 will be described in more detail with reference to FIGS. 5 to 7, below.

FIG. 5 shows an alignment of liquid crystals in a homeotropic state. In the homeotropic state, the helical structures of liquid crystals may be untwisted so that liquid crystal molecules are aligned in the direction of an electric field. The alignment of liquid crystal molecules in the homeotropic state may appear when a high voltage is applied to the first and second electrodes 122 and 112 so that a high electric field is formed between the first electrodes 122 and the second electrodes 112, and have a characteristic of transmitting light.

FIG. 6 shows an alignment of liquid crystals in a planar state. The planar state means a state in which the helical axes of the cholesteric liquid crystals 132 are substantially vertical to the first and second substrates 120 and 110, for example, the first substrate 120. The planar state of the liquid crystal layer 130 may appear when the high electric field applied to the liquid crystals in the homeotropic state is abruptly removed. When the cholesteric liquid crystals 132 are in the planar state, the cholesteric liquid crystals 132 can reflect a specific wavelength of light among incident light.

At this time, the specific wavelength may be decided according to a helical pitch in the helical structures of the cholesteric liquid crystals 132. That is, since a reflection wavelength of light can be decided by adjusting the helical pitch, it is possible to adjust color to be reflected by adjusting the helical pitch of the cholesteric liquid crystals 132. Accordingly, it is possible to display desired color without using a separate color filter.

FIG. 7 shows an alignment of liquid crystals in a focal conic state. The focal conic state means a state in which the helical axes of the cholesteric liquid crystals 132 are substantially parallel to the first substrate 120. The structures of liquid crystals in the focal conic state may have a characteristic of scattering or diffused-reflecting light. In the foal conic state, if there is a print formed on the rear surface of the liquid crystal layer 130, scattered light may be reflected by the print so that print color appears as background color.

If the substrate of the liquid crystal layer 130 is a transparent substrate without having a separate print, incident light may be transmitted through the liquid crystal layer 130.

The focal conic state of the liquid crystal layer 130 may appear when a high voltage applied to the liquid crystals in the homeotropic state is gradually reduced. Also, when a low voltage pulse is applied to the cholesteric liquid crystals 132 in the planar state, the focal conic state of the liquid crystal layer 130 may appear. In this case, the voltage applied to the cholesteric liquid crystals 132 may be 10V to 20V. If a high voltage continues to be applied to the cholesteric liquid crystals 132 in the focal conic state, the helical structures may be untwisted so as to become a homeotropic state in which liquid crystal molecules are arranged in the direction of an electric field, wherein the voltage applied to the cholesteric liquid crystals 132 may be 30V to 50V. Also, by applying a high voltage pulse to the cholesteric liquid crystals 132 in the focal conic state, the cholesteric liquid crystals 132 may be converted to the planar state.

The liquid crystal layer 130 may be partitioned to a plurality of sub-cells including cholesteric liquid crystal molecules of different helical pitches, in order to implement different colors.

The plurality of sub-cells may include a first sub-cell 130a, a second sub-cell 130b, and a third sub-cell 130c. A group of the first sub-cell 130a, the second sub-cell 130b, and the third sub-cell 130c may form a unit pixel. That is, the liquid crystal layer 130 may include a plurality of unit pixels, and the plurality of unit pixels may be arranged two-dimensionally. The first sub-cell 130a may be a red sub-pixel cell having a reflective wavelength band corresponding to red light R, the second sub-cell 130b may be a green sub-pixel cell having a reflective wavelength band corresponding to green light G, and the third sub-cell 130c may be a blue sub-pixel cell having a reflective wavelength band corresponding to blue light B. Also, the first, second, and third sub-cells 130a, 130b, and 130c may be a magenta sub-pixel cell, a yellow sub-pixel cell, and a cyan sub-pixel cell, respectively. In FIGS. 1A and 1B, an example in which the sub-cells 130a, 130b, and 130c are partitioned by a plurality of partition walls 131 is shown, however, different types of sub-cells may be mixed in space partitioned by the partition walls 131. The plurality of sub-cells of the liquid crystal layer 130 may form a single-layered structure, as described above, or may form a multi-layered structure, as shown in FIG. 2. As shown in FIG. 2, a first sub-cell 133a of a multi-layered structure may be a red sub-pixel cell having a reflective wavelength band corresponding to red light R, a second sub-cell 133b may be a green sub-pixel cell of reflecting a wavelength band corresponding to green light G, and a third sub cell 133c may be a blue sub-pixel cell of reflecting a wavelength band corresponding to blue light B. On the entire rear surfaces of the individual sub-cells 133a, 133b, and 133c, substrates 134a, 134b, and 134c including electrodes may be disposed. The substrates 134a, 134b, and 134c may be implemented with transparent glass or transparent plastic. For example, the plastic may be a material selected from a group including silicon, silicon oxide, silicon carbide, PET, PEN, etc. If the substrates 134a, 134b, and 134c are implemented with transparent plastic, the substrates 134a, 134b, and 134c may become thinner and lighter than glass substrates, and also have flexibility. Also, if the substrates 134a, 134b, and 134c have flexibility, various designs can be implemented. Also, the electrodes included in the substrates 134a, 134b, and 134c may be transparent electrodes in order to increase the transmittance of the display apparatus 100. The transparent electrodes may be formed of a transparent conductive material, and examples of the transparent conductive material may be ITO, IZO, ZAO, etc.

Meanwhile, as the sizes of substrates of the display apparatus 100 increase, the lengths of electrodes may increase, and space between the electrodes may also increase. If the lengths of the electrodes increase, resistance of the electrodes may increase so that a voltage drop may occur. Also, since no voltage is substantially applied to liquid crystals existing in an area corresponding to the space between the electrodes, the cholesteric liquid crystals 132 existing in the area may become a planar state. Accordingly, the cholesteric liquid crystals 132 existing in the area corresponding to the space between the electrodes cannot be converted to a transparent state. The area is a so-called dead zone. If the space between the electrodes increases, the dead zone may also increase, so that an effect of transition to transparent of the display apparatus 100 may deteriorate. For this reason, the display apparatus 100 according to the first embodiment may include a plurality of auxiliary electrodes 126 formed in the first electrodes 122 and the second electrodes 112 and the partition walls 131 formed in the dead zone, in order to prevent a voltage drop and an increase of a dead zone according to the large area of the substrates 120 and 110, as shown in FIGS. 1A and 1B. Hereinafter, the auxiliary electrodes 126 and the partition walls 131 will be described in detail.

As described above, as the areas of the substrates increases, the lengths of the electrodes formed in the substrates may also increase so that the resistance of the electrodes increases. For this reason, the auxiliary electrodes 126, which are formed of a material having higher electrical conductivity than the first and second electrodes 122 and 112, may be disposed in the first electrodes 122 and the second electrodes 112 of the display apparatus 100 according to the first embodiment of the present disclosure. The auxiliary electrodes 126 may be formed of a material having higher electrical conductivity than the first and second electrodes 122 and 112, as described above, or the auxiliary electrodes 126 may be formed of the same material as the first and second electrodes 122 and 112. If the auxiliary electrodes 126 are formed of the same material as the first and second electrodes 122 and 112, the auxiliary electrodes 126 may be formed with density that is different from that of the first and second electrodes 122 and 112, in order to increase electric conductivity. The auxiliary electrodes 126 may be formed of a material, such as Ag, Cu, grapheme, carbon nanotube (CNT), etc., which has high electric conductivity, whose line width can be adjusted in units of um, and which can transmit light according to electrode processing conditions.

The auxiliary electrodes 126 may be formed in one ends in width direction of the electrodes 122, as shown in FIG. 1A. Also, the auxiliary electrodes 126 may be bent in a "¬"-shaped form from the front surfaces of the electrodes 122 to one ends in width direction of the electrodes 122, as shown in FIG. 1B. Also, the auxiliary electrodes 126 may be formed in both ends in width direction of the electrodes 122. The auxiliary electrodes 126 may extend in the longitudinal direction of the electrodes 122, with cross-sections shown in FIGS. 1A and 1B. Although not shown in the drawings, the auxiliary electrodes 126 may be applied on the front surfaces of the electrodes 122, instead of being formed in one ends in width direction of the electrodes 122. Since the auxiliary electrodes 126 are formed in order to prevent a voltage drop of the electrodes 122, the auxiliary electrodes 126 may be formed in any locations of the electrodes 122 as long as the auxiliary electrodes 126 extend in the longitudinal direction of the electrodes 122. However, if the auxiliary electrodes 126 are formed in one ends in width direction of the electrodes 122, as shown in FIGS. 1A and 1B, it is possible to prevent a voltage drop of the electrodes 122, while narrowing the space between the electrodes 122. Accordingly, it is preferable that the auxiliary electrodes 126 are formed in one ends in width direction of the electrodes 122, as shown in FIGS. 1A and 1B.

As described above, if the space between the electrodes formed on the substrate increases as the area of the substrate increases, the dead zone may also increase so that an effect of transition to transparent of the display apparatus 100 may deteriorate. For this reason, the display apparatus 100 according to the first embodiment may include the partition walls 131 provided in the space corresponding to the space between the electrodes. The partition walls 131 may be polymers formed by a photopolymerization reaction of monomers.

The liquid crystal layer 130 may include monomers and photoinitiators to form polymer structures through a photopolymerization reaction, in order to form the partition walls 131. If ultraviolet (UV) light is irradiated to the space between the electrodes, monomers existing in the space to which the UV light is irradiated may form polymers through a photopolymerization reaction. If the polymers are formed, the concentration of monomers may be reduced in the space in which the photopolymerization reaction occurs, and the concentration of monomers existing around the space in which the polymers are formed may increase relatively. Accordingly, the monomers around the space in which the photopolymerization reaction occurs may be diffused to the space in which the photopolymerization reaction occurs. Through the process, polymers may be formed in the space between the electrodes to form the partition walls 131 as shown in FIGS. 1A and 1B. Since light can be transmitted through the partition walls 131 which are polymer structures, an effect of transition to transparent of the display apparatus 100 can be improved, and visibility can also be improved in a display mode of the display apparatus 100. Also, since the partition walls 131 can function as a structural support of the display apparatus 100, the display apparatus 100 can ensure structural stability. Also, since the partition walls 131 exist in the intervals between the electrodes, the partition walls 131 may prevent short circuits between the electrodes, thereby improving an insulation property.

Hereinafter, various embodiments of a display apparatus based on the reflective type display apparatus 100 according to the first embodiment as described above will be described in detail.

Figure 8:
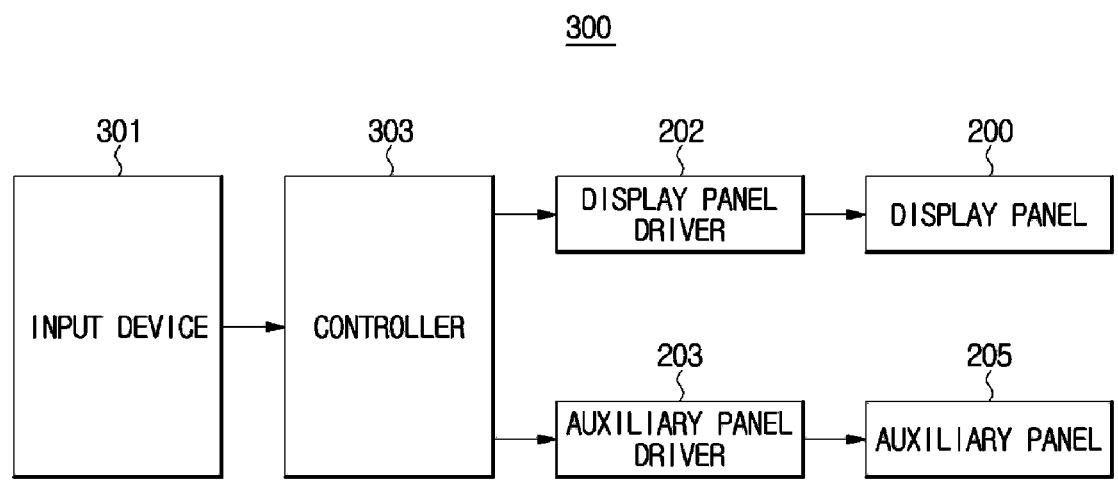
FIG. 8 is a control block diagram of a display apparatus according to a second embodiment of the present disclosure.
Figure 9:
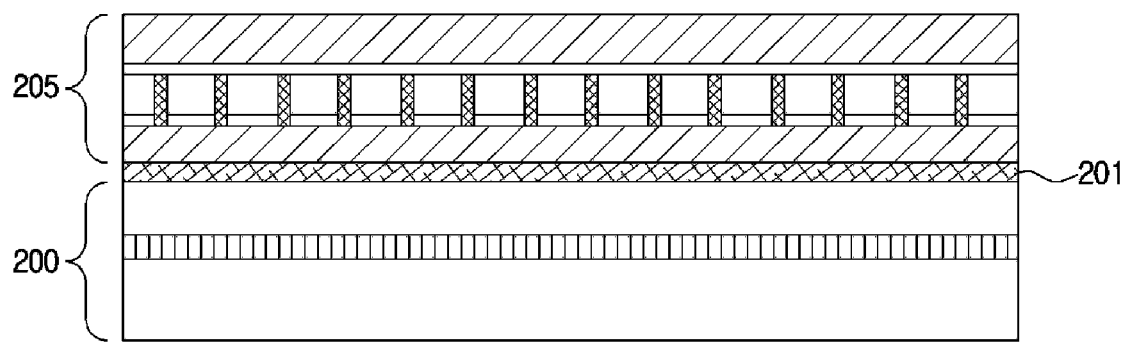
FIG. 9 is a cross-sectional view of the display apparatus according to the second embodiment of the present disclosure.
Figure 10:
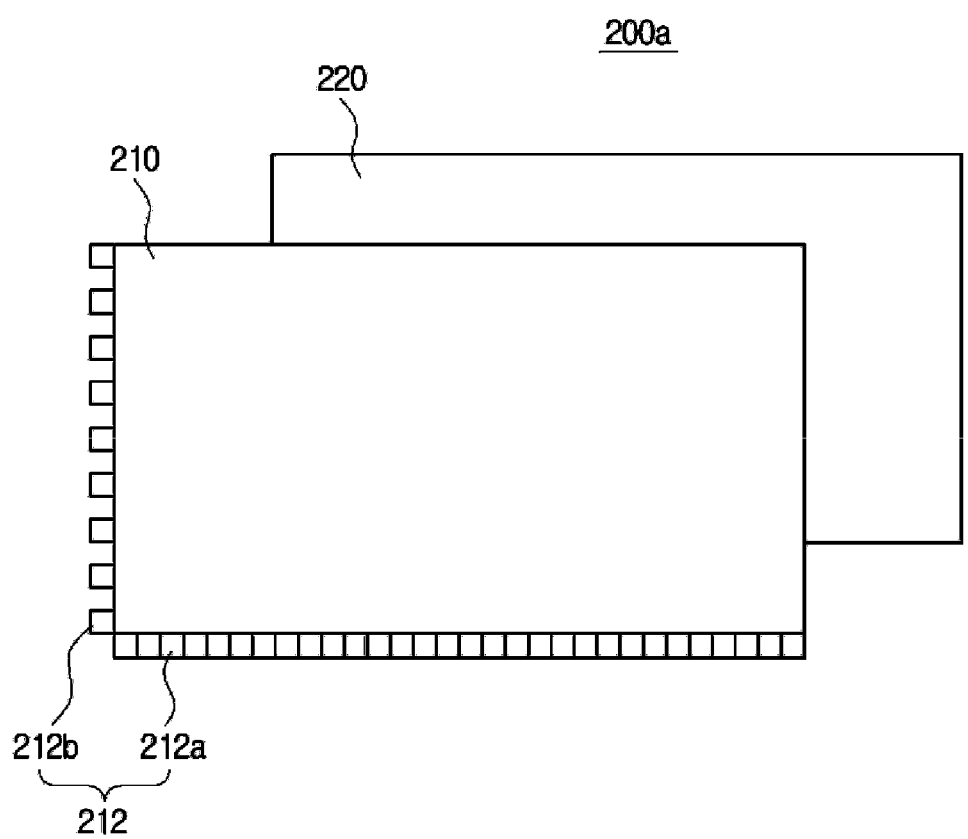
FIG. 10 shows an example of a display panel included in the display apparatus according to the second embodiment of the present disclosure.
Figure 11:
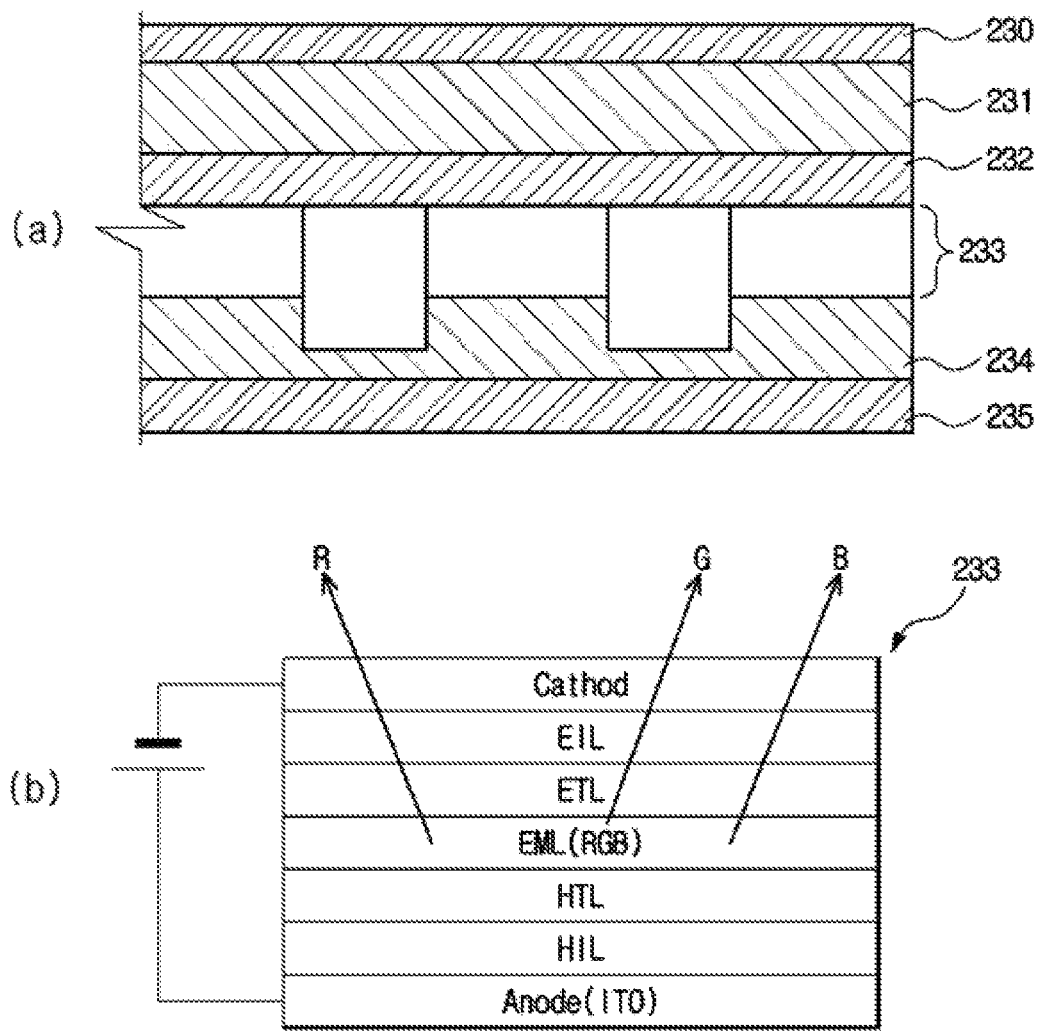
FIG. 11 shows another example of the display panel included in the display apparatus according to the second embodiment of the present disclosure.

FIG. 8 is a control block diagram of a display apparatus 300 according to a second embodiment of the present disclosure, FIG. 9 is a cross-sectional view of the display apparatus 300 according to the second embodiment of the present disclosure, FIG. 10 shows an example of a display panel 200 included in the display apparatus 300 according to the second embodiment of the present disclosure, and FIG. 11 shows another example of the display panel 200 included in the display apparatus 300 according to the second embodiment of the present disclosure.

The display apparatus 300 may be an apparatus of displaying image information, such as a television or a monitor. Also, the display apparatus 300 may be provided in a mobile communication terminal, such as a mobile phone, a tablet PC, and a laptop computer, to display images related to various functions. Also, the display apparatus 300 may be provided in a home appliance, such as a refrigerator or an air conditioner, to display image information related to various functions. Hereinafter, a television will be described as an example of the display apparatus 300 according to the second embodiment of the present disclosure.

The display apparatus 300 according to the second embodiment may include an input device 301 to enable a user to input a command for controlling the display apparatus 300, a controller 303 to output a control signal for controlling the display apparatus 300 according to a command received through the input device 301, a display panel driver 202 and an auxiliary panel driver 203 to drive the display panel 200 and an auxiliary panel 205 according to the control of the controller 303, the display panel 200 to display image information using internal light, and an auxiliary panel 205 to display image information using external light.

The input device 301 may be provided in the form of buttons, etc. in the display apparatus 300. For example, the input device 301 may be a remote controller to control the display apparatus 300 remotely. Buttons installed in the display apparatus 300 or in the remote controller may be a hard key type or a soft key type that can receive touch inputs. Also, the input device 301 may include a voice recognition apparatus or a motion recognition apparatus. Also, the input device 301 may include a mobile communication terminal, such as a smart phone or a tablet PC, which can transmit control commands, images, or text to the display apparatus 300 through wireless communication. The wireless communication for receiving commands from the mobile communication terminal may be one of communication methods including Zigbee, Near Field Communication (NFC), Bluetooth, Wireless-Fidelity (Wi-Fi), and Radio Frequency Identification (RFID).

If the display apparatus 300 according to the second embodiment is tuned on and driven, the display apparatus 300 may drive the display panel 200 to enable a user to watch a television program, and if the display apparatus 300 is turned off and no longer driven, the display apparatus 300 may display a predetermined object through the auxiliary panel 205 so that the display apparatus 300 can be used like a picture. Herein, the predetermined object may be a still image, a moving image, or text. Also, the predetermined object may be stored in memory (not shown), such as Dynamic Random Access Memory (DRAM) and flash memory. Also, if the controller 303 receives a signal for turning off the display apparatus 300, the controller 303 may transmit an operation start signal to the memory and the auxiliary panel driver 203 to display the predetermined object through the auxiliary panel 205. Details about the operation will be described later with reference to FIGS. 12 to 16, and the structures of the display apparatus 300 and the display panel 200 will be first described with reference to FIGS. 9 to 11, below.

As shown in FIG. 9, the display apparatus 300 according to the second embodiment may include the display panel 200 and the auxiliary panel 205 disposed in front of the display panel 200. Also, a refractive index compensation layer 201 may be disposed between the display panel 200 and the auxiliary panel 205 in order to compensate a refractive index between the display panel 200 and the auxiliary panel 205. The refractive index compensation layer 201 may include an optical medium material for compensating a refractive index.

Herein, the display panel 200 may be a transmissive type display panel. More specifically, the display panel 200 may be one among a LCD panel 200a (see FIG. 10) of generating internal light using a separate light source and displaying images using the generated light, and an Organic Light Emitting Diode (OLED) display panel 200b (see FIG. 11) of displaying images using a self-emission phenomenon.

The structures of the LCD panel 200a and the OLED display panel 200b are well-known in the art, and hereinafter, the structures will be briefly described below.

As shown in FIG. 10, the LCD panel 200a may include a liquid crystal panel 210 and a backlight unit 220.

For example, the liquid crystal panel 210 may include a first substrate and a second substrate that are spaced apart from each other, and a liquid crystal layer sealed between the first substrate and the second substrate, and may further include a first polarization plate disposed on an outside surface of the first substrate, a second polarization plate disposed on an outside surface of the second substrate, a plurality of first electrodes disposed between the first substrate and the liquid crystal layer, a plurality of second electrodes disposed between the second substrate and the liquid crystal layer, a color panel disposed between the second substrate and the second electrodes, a first alignment layer disposed between the first electrodes and the liquid crystal layer, and a second alignment layer disposed between the second electrodes and the liquid crystal layer.

The first substrate and the second substrate of the liquid crystal panel 210 may be formed of glass or plastic, and have flexibility. The liquid crystal panel 210 may display images by injecting liquid crystal in an intermediate state between a solid and a liquid between two thin substrates, and then changing the alignment of liquid crystal molecules by an external electric field to generate contrast. Since the liquid crystal panel 210 is a non-emissive device (a light receiving device) unlike OLED, the liquid crystal panel 210 may need a separate light-emitting device. For this reason, the liquid crystal panel 210 may require the backlight unit 220 in the form of a surface light source for maintaining the entire screen at uniform brightness.

That is, the backlight unit 220 may emit light toward the liquid crystal panel 210 using light sources (LEDs). The backlight unit 220 may be implemented as one of a direct type in which a plurality of light sources are arranged on the lower surface of a liquid crystal panel to irradiate light, and an edge type in which a light guide plate is disposed on the lower surface of a liquid crystal panel, and a plurality of light sources are arranged along at least one side of the light guide plate to irradiate light. The LCD panel 200a may adjust an amount of transmission of light emitted from the backlight unit 220 to show images through the liquid crystal panel 210. Herein, an amount of transmission of light passing through the liquid crystal layer may be adjusted according to the intensity of an applied voltage.

The LCD panel 200a may be classified into a Passive Matrix (PM) type of applying voltages respectively to electrodes on horizontal and vertical axes to drive liquid crystals at the intersections, and an Active Matrix (AM) type of controlling pixels independently through TFTs, according to a driving method.

In the LCD panel 200a of the PM type, if a voltage is applied to the first and second electrodes so that an electric field is formed between the first and second electrodes, an arrangement angle of liquid crystals of the liquid crystal panel 210 may change by the electric field, and light transmittance may change according to the changed arrangement angle. The LCD panel 200a of the PM type may display images using the principle.

The LCD panel 200a of the AM type may further include a TFT panel (not shown). The TFT panel may be spaced from a color panel, and include a plurality of gate lines, data lines, and pixel electrodes. The LCD panel 200a of the AM type may be electrically connected to a first display driver 212.

The first display driver 212 may include a first driver 212a to drive X electrodes, and a second driver 212b to drive Y electrodes. The X electrodes may be source electrodes, and the Y electrodes may be gate electrodes. The first driver 212a and the second driver 212b may be connected to the display panel driver 202.

The first driver 212a may select a gray voltage for each data line based on image data, and transfer the selected gray voltage to the liquid crystal layer through the data line. The second driver 212b may transfer an on/off signal based on image data to a thin film transistor (TFT) which is a switching device, through a scan line, to turn on/off the TFT. That is, if the first driver 212a supplies a voltage corresponding to each color value, the second driver 212b may receive the voltage, and apply the voltage to the corresponding pixel. Also, the source electrode of each TFT may be connected to a data line, the gate electrode of the TFT may be connected to a scan line, and the drain electrode of the TFT may be connected to a pixel electrode of indium Tin Oxide (ITO). The TFT may be turned on when receiving a scan signal from the scan line, to supply a data signal supplied from the data line to the pixel electrode.

The OLED display panel 200b may use a phenomenon in which when a voltage is applied to organic materials, the organic materials emit light to implement full colors using the property of organic materials of generating Red Green Blue (RGB). The OLED display panel 200b may be classified into a PM type and an AM type according to a driving method.

In the OLED display panel 200b (also, referred to as a PM-OLED panel) of the PM type, anodes and cathodes may be arranged in columns and rows. A scanning signal may be supplied to the cathodes from a row driving circuit to select a row from among the plurality of rows. Also, a data signal may be supplied to the anodes from a column driving circuit.

The OLED display panel 200b (also, referred to as an AM-OLED panel) of the AM type may control signals to be input to the individual pixels through the TFTs. Hereinafter, an AM-OLED display panel will be described as an example of the OLED display panel 220b.

As shown in (a) of FIG. 11, the OLED display panel 200b may include a first substrate 235, a second substrate 231 spaced by a predetermined distance from the first substrate 235, an organic layer 233 disposed between the first substrate 235 and the second substrate 231, a TFT panel 234 disposed between the first substrate 235 and the organic layer 233, a negative electrode layer 232 disposed between the second substrate 231 and the organic layer 233, and a polarization panel 230 disposed on an outside surface of the second substrate 231.

The first substrate 235 and the second substrate 231 may be formed of glass or plastic, and have flexibility. The first substrate 235 and the second substrate 231 may block (that is, package) the organic layer 233 from an outside environment, in order to prevent the organic layer 233 from sensitively responding to moisture or oxygen to deteriorate.

As shown in (b) of FIG. 11, the organic layer 233 may be disposed between anodes (positive poles) which are first electrodes arranged on the TFT panel 234 and cathodes (negative poles) which are second electrodes disposed on the negative electrode layer 232. The organic layer 233 may be an OLED in which holes injected from the first electrodes are recombined with electrons injected from the second electrodes in an organic light-emitting layer to generate light. The organic layer 233 may include functional organic layers, such as a Hole Injection Layer (HIL) for facilitating injection of holes, a Hole Transfer Layer (HTL) for facilitating movement of the injected holes, an Emission Material Layer (EIL) for facilitating injection of electrons, an Electron Transfer Layer (ETL) for facilitating movement of the injected electrons, and an Electron Injection Layer (EML). The HIL, HTL, EIL, and ETL are also called common layers.

The injected electrons and holes may be combined in the EML to emit light. The EML may be formed of hosts to decide the lifespan of an organic material as a material for representing display colors, and dopants to decide colors and efficiency.

More specifically, the organic layer 233 may emit light by a potential barrier between two kinds of electrodes and an organic material. That is, if a direct voltage is applied to the anodes and the cathodes, holes (+) generated in the anodes may move to the HTL from the anodes which are the first electrodes, and electrons (−) generated in the cathodes which are the second electrodes may move to the first electrodes via the ETL. At this time, light corresponding to an energy gap generated by recombination in the organic layer 233 may be generated. In the organic layer 233, if a voltage is applied to the two kinds of electrodes, holes may be injected and transferred in the first electrodes, and electrons may be injected and transferred in the second electrodes, so that positive and negative polarons may be generated by an interaction with phonons in the EML and the polarons may be recombined to generate excitons. When the excitons fall to a low energy level, the excitons may emit energy so that a specific wavelength of light may be generated. The color of the light may depend on an organic material constituting the organic layer 233.

The TFT panel 234 of the OLED display panel 200b may supply predetermined current so that the organic layer 233 can emit light. The TFT panel 234 may control a signal input for each pixel. That is, if a TFT of the TFT panel 234 is turned on, driving current may be applied to the first electrodes so that holes are injected in the first electrodes and electrons are injected in the second electrodes.

The polarization panel 230 may enable image light output through the second substrate 231 to be output in one direction.

The OLED display panel 200b may be electrically connected to the display panel driver 202. The display panel driver 202 may cause current to flow to the two kinds of electrodes, through on/off driving of the TFTs of the TFT panel.

Unlike the display panel 200 described above, the auxiliary panel 205 may be a reflective type display apparatus, and include cholesteric liquid crystals to enable conversion between a transmissive mode of transmitting outside light and a display mode of reflecting outside light to display a predetermined object. The auxiliary panel 205 may be the same as the display apparatus 100 according to the first embodiment of the present disclosure, and accordingly, a detailed description thereof will be omitted.

Figure 12:
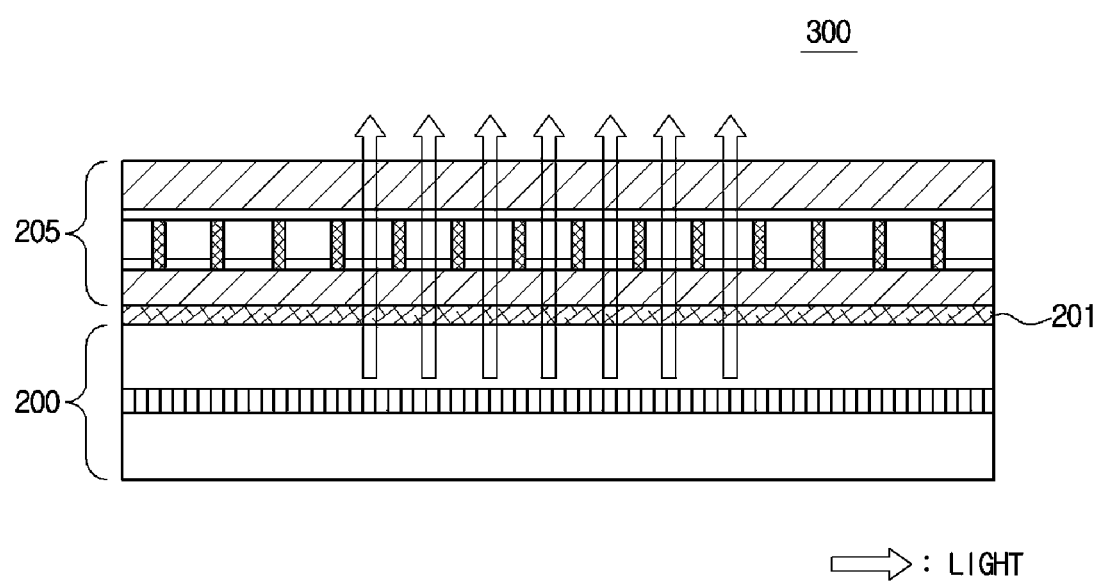
FIGS. 12 and 13 show a state in which the display panel included in the display apparatus according to the second embodiment of the present disclosure is driven.
Figure 13:
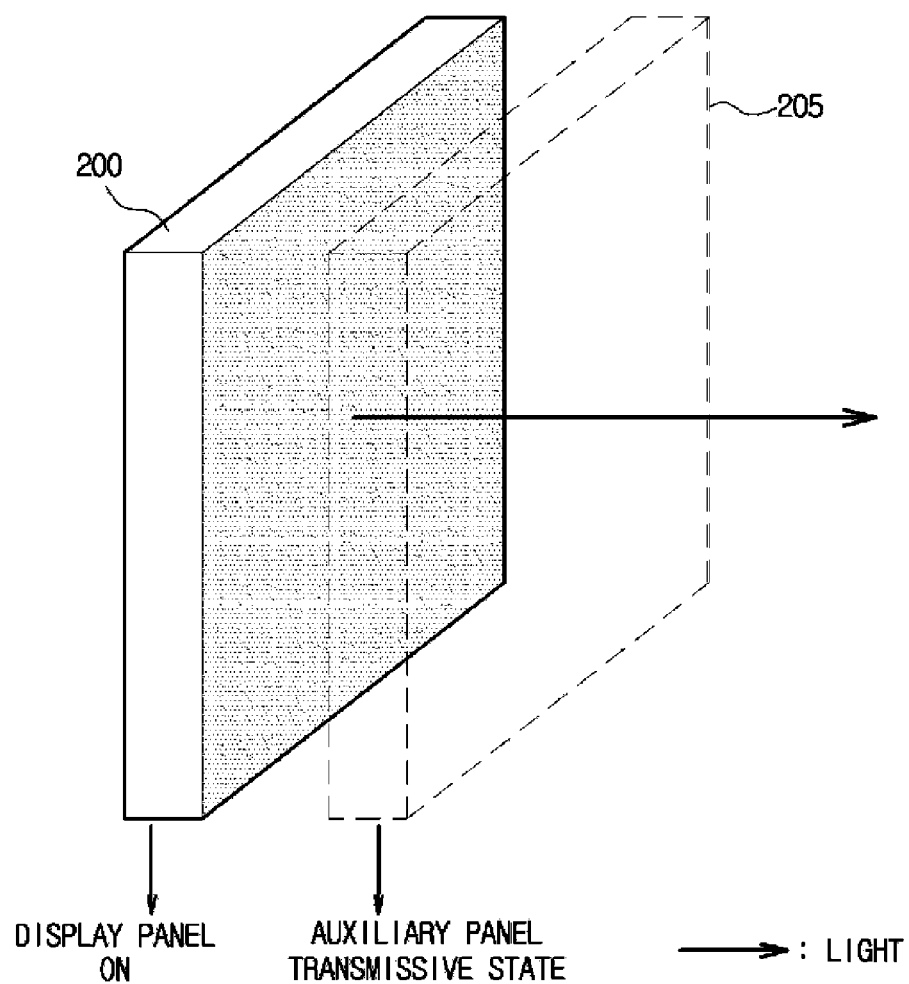
Figure 14:
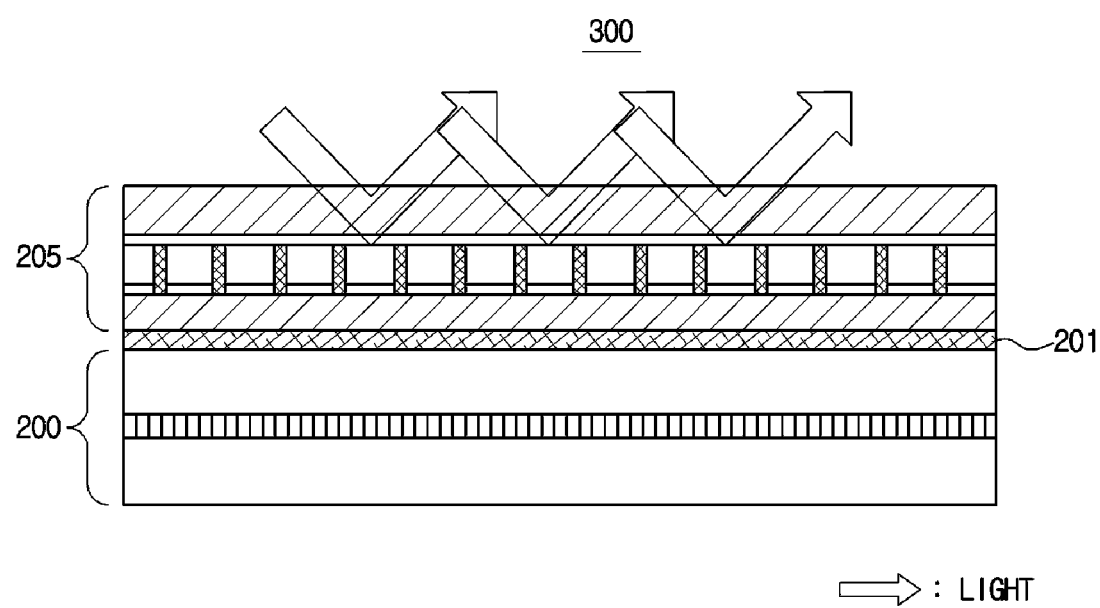
FIGS. 14 and 15 show a state in which the display panel included in the display apparatus according to the second embodiment of the present disclosure is no longer driven.
Figure 15:
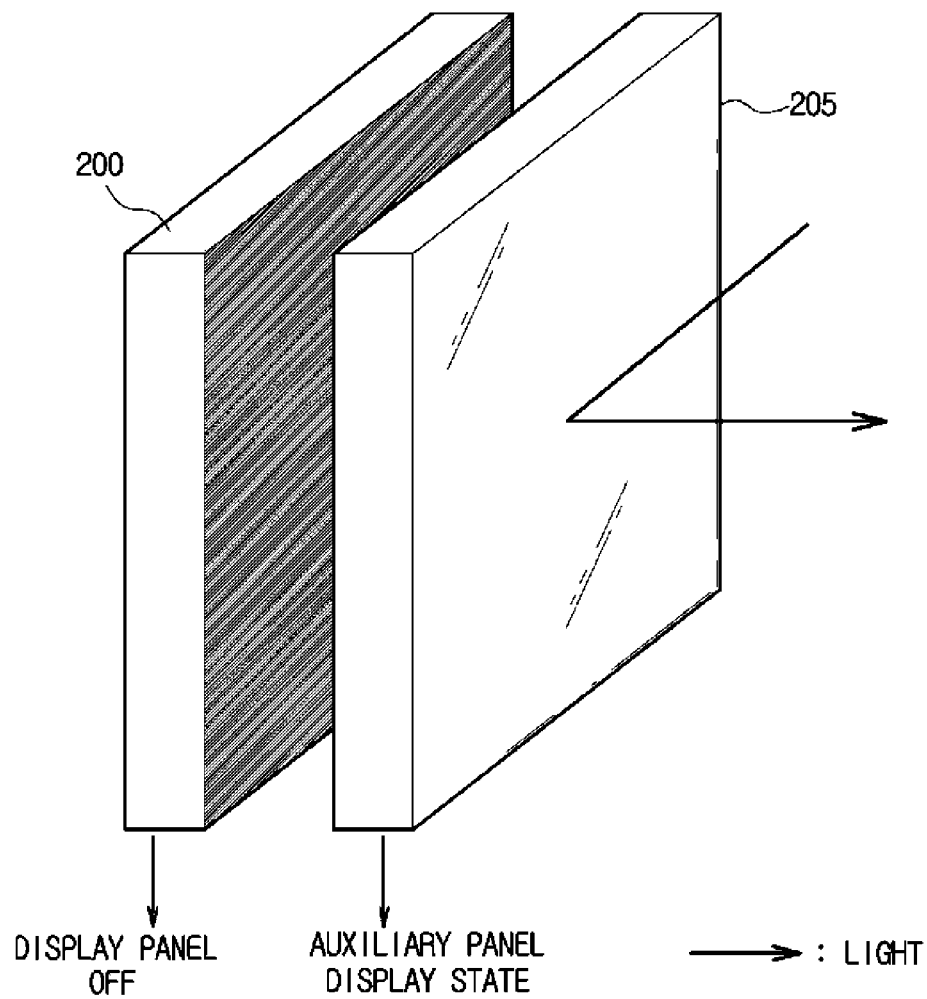

FIGS. 12 and 13 show a state in which the display panel 200 included in the display apparatus 300 according to the second embodiment of the present disclosure is driven, and FIGS. 14 and 15 show a state in which the display panel 200 included in the display apparatus 300 according to the second embodiment of the present disclosure is no longer driven.

If a command for turning on the display apparatus 300 is received through the input device 301, the controller 303 may display an image on the display panel 200 so that a user can watch the television, and convert the auxiliary panel 205 to a transmissive state. That is, if the driving method of the display panel 200 is the AM type, the display panel driver 202 may apply a gate driving signal and a data driving signal to the gate lines and the data lines formed on the TFT panel of the display panel 200, thereby displaying an image on the display panel 200. Also, the auxiliary panel driver 203 may apply a high voltage to the auxiliary panel 205 so that the cholesteric liquid crystals of the auxiliary panel 205 become the homeotropic state to convert the auxiliary panel 205 to the transmissive state.

That is, as shown in FIGS. 12 and 13, if the display apparatus 300 is turned on so that the display panel 200 is driven, the auxiliary panel 205 may be converted to the transmissive state so that light generated from the display panel 200 can be transmitted through the auxiliary panel 205. Accordingly, the user can view an image displayed on the display panel 200.

If a command for turning off the display apparatus 300 is received through the input device 301, the controller 303 may stop driving the display panel 200, and convert the auxiliary panel 205 to the display state so that a predetermined object can be displayed on the auxiliary panel 205. That is, if the controller 303 receives a signal for turning off the display apparatus 300, the controller 303 may transmit an operation state signal to the memory and the auxiliary panel driver 203, and the auxiliary panel driver 203 may adjust a voltage to be applied to the auxiliary panel 205 based on a command from the controller 303 so that an area on which an object is displayed becomes a planar state.

More specifically, if the driving method of the auxiliary panel 205 is the PM type, a voltage to be applied to the first electrodes and the second electrodes of the auxiliary panel 205 may be controlled based on information of an object to be displayed. If the driving method of the auxiliary panel 205 is the AM type, a gate driving signal and a data driving signal based on a gate control signal, a data control signal, a related data signal, etc. may be provided to the gate lines and the data lines formed on the TFT panel of the auxiliary panel 205, thereby displaying an object on the auxiliary panel 205. Since the display panel 200 shows black color when driving terminates, light passed through the liquid crystal layer of the auxiliary panel 205, that is, light not belonging to the reflective wavelength band may be absorbed in the display panel 200 so as not to be again reflected toward the auxiliary panel 205, thereby enhancing the gamut of color to be displayed on the auxiliary panel 205, and improving visibility.

After the predetermined object is displayed on the auxiliary panel 205, the auxiliary panel 205 may maintain the state although no voltage is additionally applied, due to the characteristics of cholesteric liquid crystals. After a voltage is controlled to change the displayed object to another object so that the other object is displayed, the auxiliary panel 205 may maintain the state although no voltage is additionally applied.

That is, as shown in FIGS. 14 and 15, if the display apparatus 300 is turned off so that driving of the display panel 200 terminates, the auxiliary panel 205 may become the display state so that the user can view the object displayed on the auxiliary panel 205. That is, the display apparatus 300 according to the second embodiment can be used like a picture when the display apparatus 300 is in a turned-off state. That is, an object to be displayed through the auxiliary panel 205 may be stored in advance, and the pre-stored object may be displayed through the auxiliary panel 205 when the display apparatus 300 is turned off, thereby providing an interior decoration like a picture on a wall. A plurality of objects to be displayed through the auxiliary panel 205 may be stored in the display apparatus 300, and the plurality of objects may be sequentially displayed automatically at regular time intervals.

Figure 16:
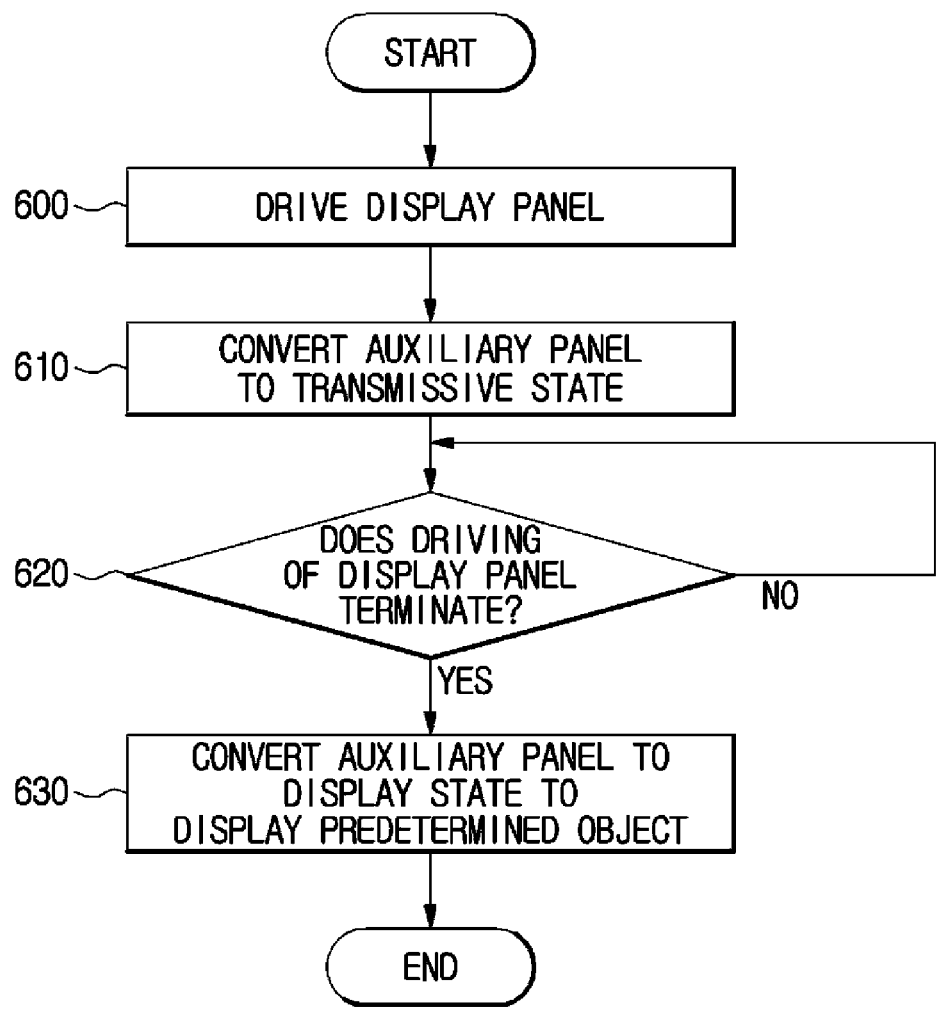
FIG. 16 is a flowchart illustrating a method of controlling the display apparatus according to the second embodiment of the present disclosure.

FIG. 16 is a flowchart illustrating a method of controlling the display apparatus 300 according to the second embodiment of the present disclosure.

Referring to FIG. 16, if the display apparatus 300 is turned on so that the display panel 200 is driven, in operation 600, the controller 303 may convert the auxiliary panel 205 to a transmissive state, in operation 610.

If a command for turning on the display apparatus 300 is received through the input device 301, the controller 303 may display an image on the display panel 200 so that a user can watch the television, and convert the auxiliary panel 205 to a transmissive state. That is, if the driving method of the display panel 200 is the AM type, the display panel driver 202 may apply a gate driving signal and a data driving signal to the gate lines and the data lines formed on the TFT panel of the display panel 200, thereby displaying an image on the display panel 200. Also, the auxiliary panel driver 203 may apply a high voltage to the auxiliary panel 205 so that the cholesteric liquid crystals of the auxiliary panel 205 become a homeotropic state so as to convert the auxiliary panel 205 to a transmissive state. That is, as shown in FIGS. 12 and 13, if the display apparatus 300 is turned on so that the display panel 200 is driven, the auxiliary panel 205 may become a transmissive state so that light generated in the display panel 200 can be transmitted through the auxiliary panel 205. Accordingly, the user can view an image displayed on the display panel 200.

If the display apparatus 300 is turned off so that driving of the display panel 200 terminates, in operation 620, the controller 303 may convert the auxiliary panel 205 to a display state to display a predetermined object, in operation 630.

If a command for turning off the display apparatus 300 is received through the input device 301, the controller 303 may stop driving the display panel 200, and convert the auxiliary panel 205 to a display state so that the predetermined object can be displayed on the auxiliary panel 205. That is, the auxiliary panel driver 203 may stop applying a voltage based on a command from the controller 303 so that an area on which the object is displayed becomes a planer state, More specifically, if the driving method of the auxiliary panel 205 is the PM type, a voltage to be applied to the first electrodes and the second electrodes of the auxiliary panel 205 may be controlled based on information of an object to be displayed. If the driving method of the auxiliary panel 205 is the AM type, a gate driving signal and a data driving signal based on a gate control signal, a data control signal, a related data signal, etc. may be provided to the gate lines and the data lines formed on the TFT panel of the auxiliary panel 205, thereby displaying an object on the auxiliary panel 205. Since the display panel 200 shows black color when driving terminates, light passed through the liquid crystal layer of the auxiliary panel 205, that is, light not belonging to the reflective wavelength band may be absorbed in the display panel 200 so as not to be again reflected toward the auxiliary panel 205, thereby enhancing the gamut of color to be displayed on the auxiliary panel 205, and improving visibility.

After the predetermined object is displayed on the auxiliary panel 205, the auxiliary panel 205 may maintain the state although no voltage is additionally applied, due to the characteristics of cholesteric liquid crystals. After a voltage is controlled to change a displayed object to another object so that the other object is displayed, the auxiliary panel 205 may maintain the state although no voltage is additionally applied.

That is, as shown in FIGS. 14 and 15, if the display apparatus 200 is turned off so that driving of the display panel 200 terminates, the auxiliary panel 205 may become a display state so that the user can view an object displayed on the auxiliary panel 205. That is, the display apparatus 300 according to the second embodiment can be used like a picture when the display apparatus 300 is in a turned-off state. That is, an object to be displayed through the auxiliary panel 205 may be stored in advance in the memory, and the pre-stored object may be displayed through the auxiliary panel 205 when the display apparatus 300 is turned off, thereby providing an interior decoration like a picture on a wall.

Figure 17:
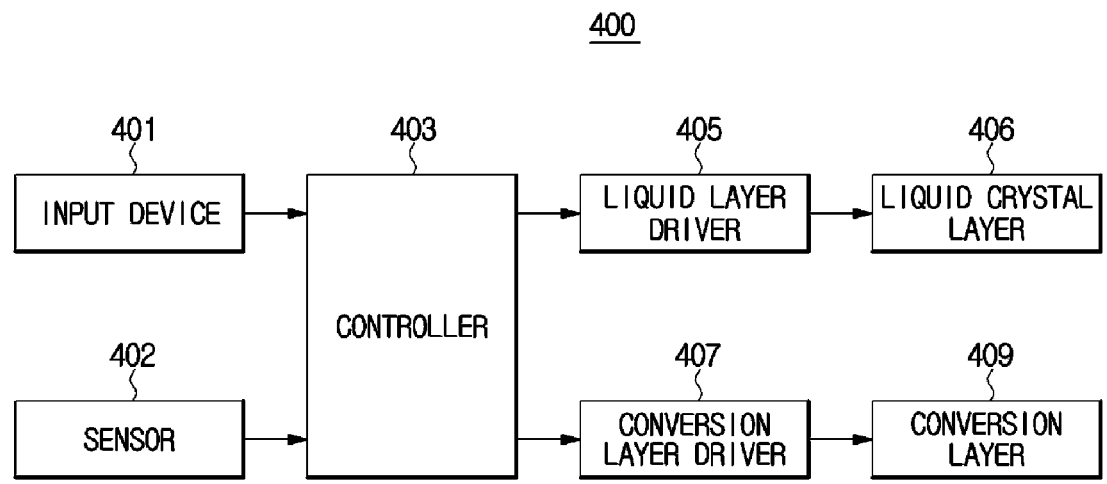
FIG. 17 is a control block diagram of a display apparatus according to a third embodiment of the present disclosure.

FIG. 17 is a control block diagram of a display apparatus according to a third embodiment of the present disclosure, FIGS. 18A to 18D are views for describing a first mode of the display apparatus according to the third embodiment of the present disclosure, FIGS. 19A to 19D are views for describing a second mode of the display apparatus according to the third embodiment of the present disclosure, FIGS. 20A to 20D are views for describing a third mode of the display apparatus according to the third embodiment of the present disclosure, and FIGS. 21A to 21D are views for describing a fourth mode of the display apparatus according to the third embodiment of the present disclosure.

A display apparatus 400 according to the third embodiment of the present disclosure may include an input device 401 to enable a user to input a command for controlling the display apparatus 400, a sensor 402 to sense an ambient brightness around the display apparatus 400, a controller 403 to output a control signal for controlling the display apparatus 400 based on a command received through the input device 401 and the result of sensing by the sensor 402, a liquid crystal layer driver 405 and a conversion layer driver 407 to drive a liquid crystal layer 406 and a conversion layer 409, respectively, according to the control of the controller 403, the conversion layer 409 for enabling conversion between a transparent mode and an opaque mode, and the liquid crystal layer 406 to display image information using outside light.

The input device 401 may be provided in the form of buttons, etc. in the display apparatus 400. For example, the input device 401 may be a remote controller to control the display apparatus 400 remotely. Buttons installed in the display apparatus 400 or in the remote controller may be a hard key type or a soft key type that can receive touch inputs. Also, the input device 401 may include a voice recognition apparatus or a motion recognition apparatus. Also, the input device 401 may include a mobile communication terminal, such as a smart phone or a tablet PC, which can transmit control commands, images, or text to the display apparatus 400 through wireless communication. The wireless communication for receiving commands from the mobile communication terminal may be one of communication methods including Zigbee, NFC, Bluetooth, Wi-Fi, and RFID.

The display apparatus 400 according to the third embodiment of the present disclosure may provide a first mode for displaying information, a second mode for performing a mirror function, a third mode for displaying information while performing a mirror function, and a fourth mode of a transparent state. The input device 401 of the display apparatus 400 according to the third embodiment may include buttons to enable a user to select one of the first to fourth modes. A plurality of buttons may be provided to enable the user to select the first mode, the second mode, the third mode, or the fourth mode, or a single button may be provided to convert between the modes. Also, a button for entering a setting User Interface (UI) for conversion between the modes may be provided. Also, an input for selecting or converting the modes or for entering the setting UI may be provided by various input methods through the input device 401 as described above, in addition to the buttons.

The display apparatus 400 according to the third embodiment may include a reflective layer 410 such as a mirror to reflect light. The reflective layer 410 may be formed of a material that always reflects light, or a material that can be converted between a transparent state of transmitting light and a reflective state of reflecting light.

The conversion layer 409 may be disposed in front of the reflective layer 410, and may be configured to be converted between the transparent mode of transmitting light, and the opaque mode of absorbing light. In the opaque mode, the conversion layer 409 may show black color to absorb light incident to the conversion layer 409. The conversion layer 409 may include any one of Twisted Nematic (TN) liquid crystal and Vertical Alignment (VA) liquid crystal, and include a substrate including electrodes to apply a voltage to the liquid crystals. More specifically, the substrate may be formed of transparent glass or transparent plastic. For example, the plastic may be one selected from a group including silicon, silicon oxide, silicon carbide, PET, PEN, etc. If the substrate is implemented with transparent plastic, the substrate may become thinner and lighter than glass substrates, and also have flexibility. Also, the electrodes may be transparent electrodes in order to increase the transmittance of the display apparatus 400. The transparent electrodes may be formed of a transparent conductive material, and examples of the transparent conductive material may be ITO, IZO, ZAO, etc.

When no voltage is applied to TN liquid crystals, the major axes of liquid crystal molecules may be aligned in parallel to the substrate so as to become the transparent mode of transmitting outside incident light, and when a maximum voltage is applied to the TN liquid crystals, the major axes of the liquid crystal molecules may be aligned vertically to the substrate so as to become the opaque mode of absorbing light incident from the outside. If no voltage is applied to the TN liquid crystals, the TN liquid crystals may become the transparent mode so as to transmit incident light toward the reflective layer 410, and if a voltage is applied to the TN liquid crystals, the TN liquid crystals may become the opaque mode so as to block incident light from being transmitted toward the reflective layer 410.

When no voltage is applied to VA liquid crystals, unlike TN liquid crystals, the major axes of liquid crystal molecules may be aligned vertically to the substrate so as to become the opaque mode of absorbing outside incident light, and when a maximum voltage is applied to the VA liquid crystals, the major axes of the liquid crystal molecules may be aligned in parallel to the substrate so as to become the transparent mode of transmitting outside incident light. When a voltage is applied to VA liquid crystals, the VA liquid crystals may become the transparent mode to transmit incident light toward the reflective layer 410, and if no voltage is applied to the VA liquid crystals, the VA liquid crystals may become the opaque mode to block incident light from being transmitted toward the reflective layer 410.

The liquid crystal layer 406 may be a reflective type display apparatus, and include cholesteric liquid crystals to enable conversion between the transmissive mode of transmitting outside light and the display mode of reflecting outside light to display a predetermined object. The liquid crystal layer 406 may be disposed in front of the conversion layer 409. The liquid crystal layer 406 may be the same as the display apparatus 100 according to the first embodiment of the present disclosure, and accordingly, a detailed description thereof will be omitted.

The first to third modes of the display apparatus 400 according to the third embodiment may be implemented by combinations of the transmissive mode and the display mode of the liquid crystal layer 406 and the transparent mode and the opaque mode of the conversion layer 409. Hereinafter, the first to third modes of the display apparatus 400 will be described in more detail.

Figure 18A:
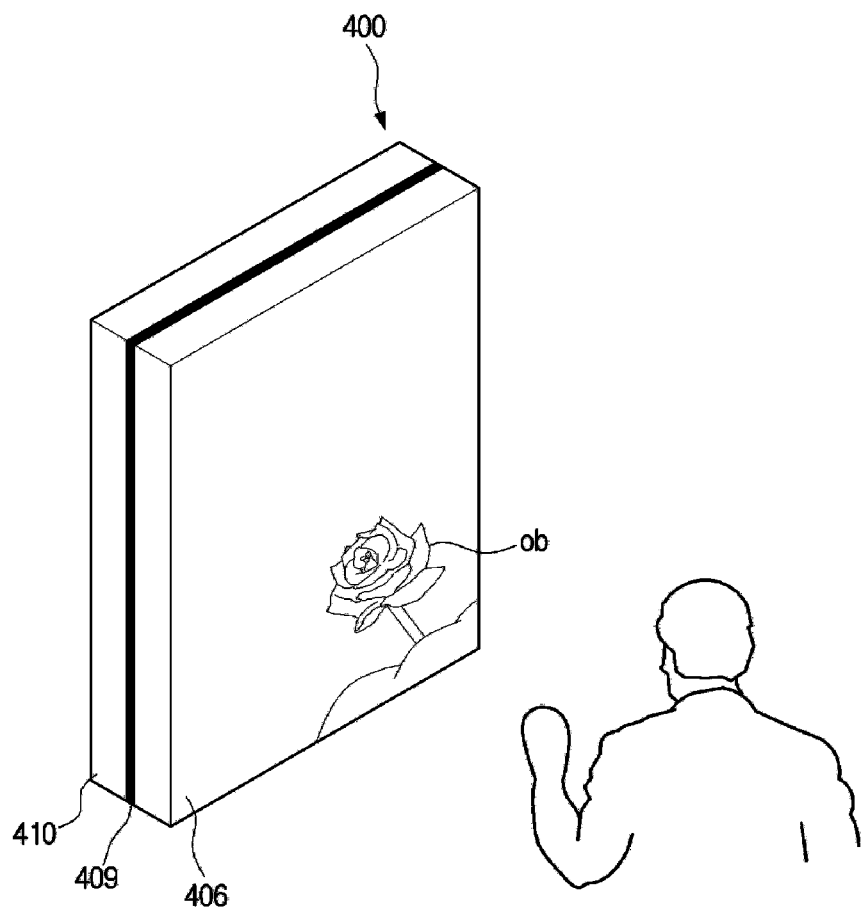
FIGS. 18A to 18D are views for describing a first mode of the display apparatus according to the third embodiment of the present disclosure.

If the first mode is selected through the input device 401, as shown in FIG. 18A, the display apparatus 400 may display an object ob. That is, if the first mode is selected, the controller 403 may convert the liquid crystal layer 406 to the display mode so that the object ob can be displayed on the liquid crystal layer 406. The liquid crystal layer driver 405 may adjust a voltage to be applied to the liquid crystal layer 406 so that an area on which the object ob is displayed becomes the planar state, based on a command from the controller 403. More specifically, if the driving method of the liquid crystal layer 406 is the PM type, the liquid crystal layer driver 405 may adjust a voltage to be applied to the first electrodes and the second electrodes of the liquid crystal layer 406, based on information of the object ob to be displayed. If the driving method of the liquid crystal layer 406 is the AM type, the liquid crystal layer driver 405 may apply a gate driving signal and a data driving signal based on a gate control signal, a data control signal, and a related data signal, etc. to the gate lines and the data lines formed on the TFT panel of the display panel 200, respectively, thereby displaying the object ob on the display panel 200.

Figure 18B:
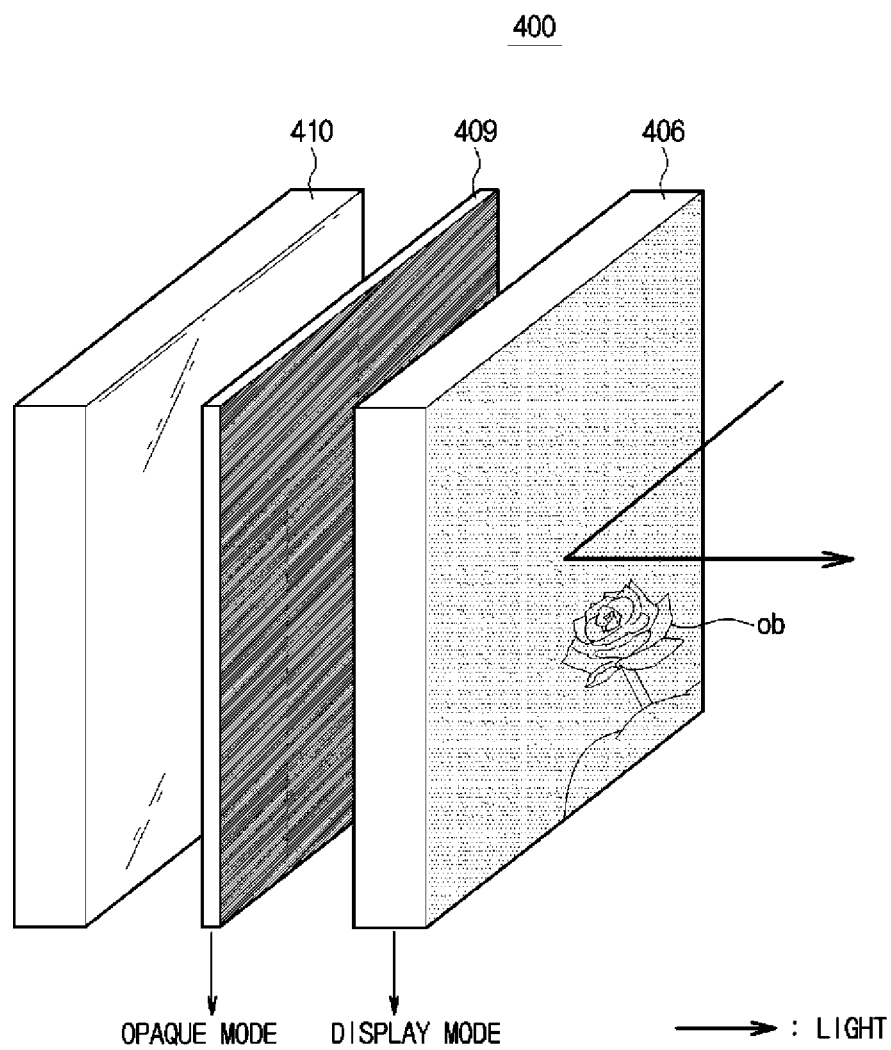

Also, if the first mode is selected, the controller 403 may adjust a voltage to be applied to the conversion layer 409 so that the conversion layer 409 becomes the opaque mode, as shown in FIG. 18B. As described above, if the conversion layer 409 includes TN liquid crystals, the conversion layer driver 407 may apply a voltage to the conversion layer 409 under the control of the controller 403, and if the conversion layer 409 includes VA liquid crystals, the conversion layer driver 407 may apply no voltage to the conversion layer 409 under the control of the controller 403.

If the conversion layer 409 becomes the opaque mode to show black color, light transmitted through the liquid crystal layer 406, that is, light not belonging to a reflective wavelength band may be absorbed in the conversion layer 409 so as not to be again reflected toward the liquid crystal layer 406, thereby enhancing the gamut of color to be displayed on the liquid crystal layer 406, and improving visibility.

Figure 18C:
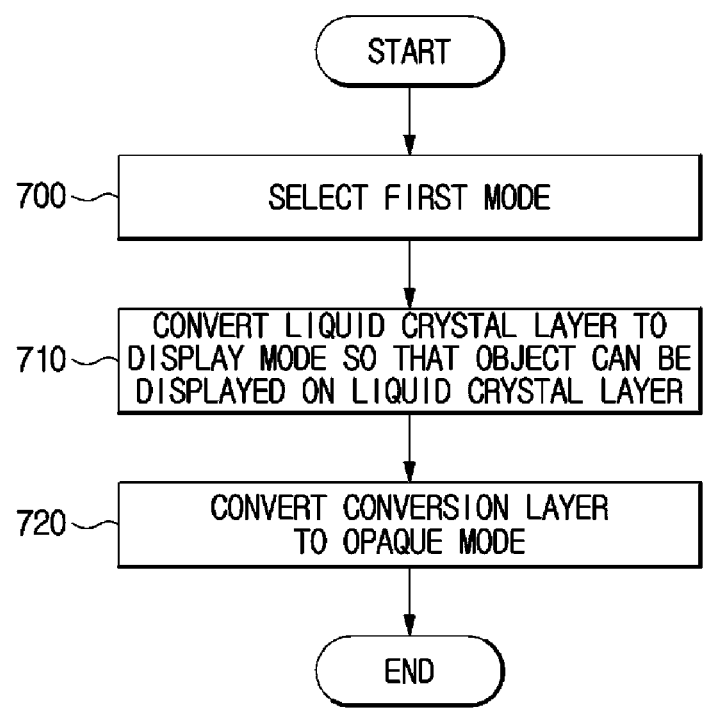

FIG. 18C is a flowchart illustrating a method of controlling the display apparatus according to the third embodiment when the first mode is selected. Referring to FIG. 18C, if the first mode is selected through the input device 401, in operation 700, the controller 403 may convert the liquid crystal layer 406 to the display mode so that an object ob can be displayed on the liquid crystal layer 406, in operation 710.

If the first mode is selected through the input device 401, as shown in FIG. 18A, the display apparatus 400 may display the object ob. That is, if the first mode is selected, the controller 403 may convert the liquid crystal layer 406 to the display mode so that an object ob can be displayed on the liquid crystal layer 406. The liquid crystal layer driver 405 may adjust a voltage to be applied to the liquid crystal layer 406 based on a command from the controller 403 so that an area on which the object ob is displayed becomes the planar state.

Also, the controller 403 may convert the conversion layer 409 to the opaque mode, in operation 720. If the first mode is selected, the controller 403 may adjust a voltage to be applied to the conversion layer 409 so that the conversion layer 409 can become the opaque mode, as shown in FIG. 18B. If the conversion layer 409 includes TN liquid crystals, as described above, the conversion layer driver 407 may apply a voltage to the conversion layer 409 under the control of the controller 403, and if the conversion layer 409 includes VA liquid crystals, the conversion layer driver 407 may apply no voltage to the conversion layer 409 under the control of the controller 403.

Figure 18D:
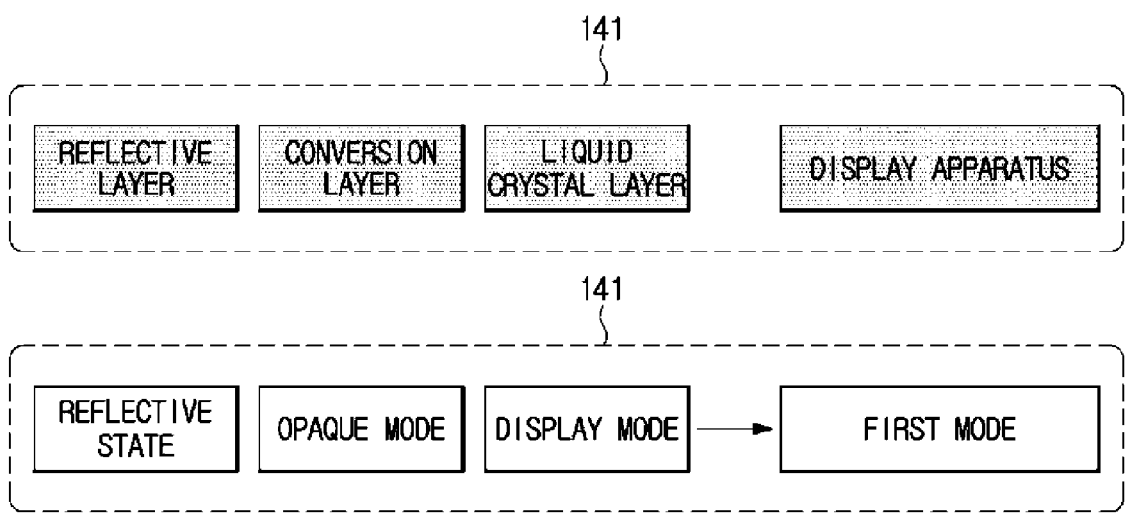

As shown in FIG. 18D, a user may enter a setting UI for converting a mode of the display apparatus 400 through the input device 401. The setting UI may include a first area 140 representing components of the display apparatus 400 to be subject to mode conversion, and a second area 141 representing modes of the components, as shown in FIG. 18D.

The user may convert the liquid crystal layer 406 displayed on the setting UI to the display mode, the conversion layer 409 to the opaque mode, and the reflective layer 410 to the reflective state, respectively, through the input device 401, so as to set the display apparatus 400 to the first mode in which an object can be displayed. The user may set modes of the individual components of the display apparatus 400 displayed on the setting UI, through the input device 401, for example, a remote controller or a smart phone, or the user may touch the display apparatus 400 to set modes of the individual components of the display apparatus 400 displayed on the setting UI.

If the modes of the individual components constituting the display apparatus 400 displayed on the first area 140 change, the setting UI may display a mode of the display apparatus 400 corresponding to the changed modes. That is, if the modes of the individual components constituting the display apparatus 400 displayed on the first area are set as shown in FIG. 18D, the setting UI may display information indicating that the mode of the display apparatus 400 has changed to the first mode, on a part representing a state of the display apparatus 400 of the second area 141. Since the conversion layer 409 is in the opaque mode in the first mode, the first mode can be implemented although the reflective layer 410 is set to a transparent state instead of a reflective state. The states of the liquid crystal layer 406, the conversion layer 409, and the reflective layer 410 which are displayed on the setting UI may be displayed as text (display mode, opaque mode, reflective state), as shown in FIG. 18D, or as images by which the user can intuitively recognize the states of the liquid crystal layer 406, the conversion layer 409, and the reflective layer 410.

Figure 19A:
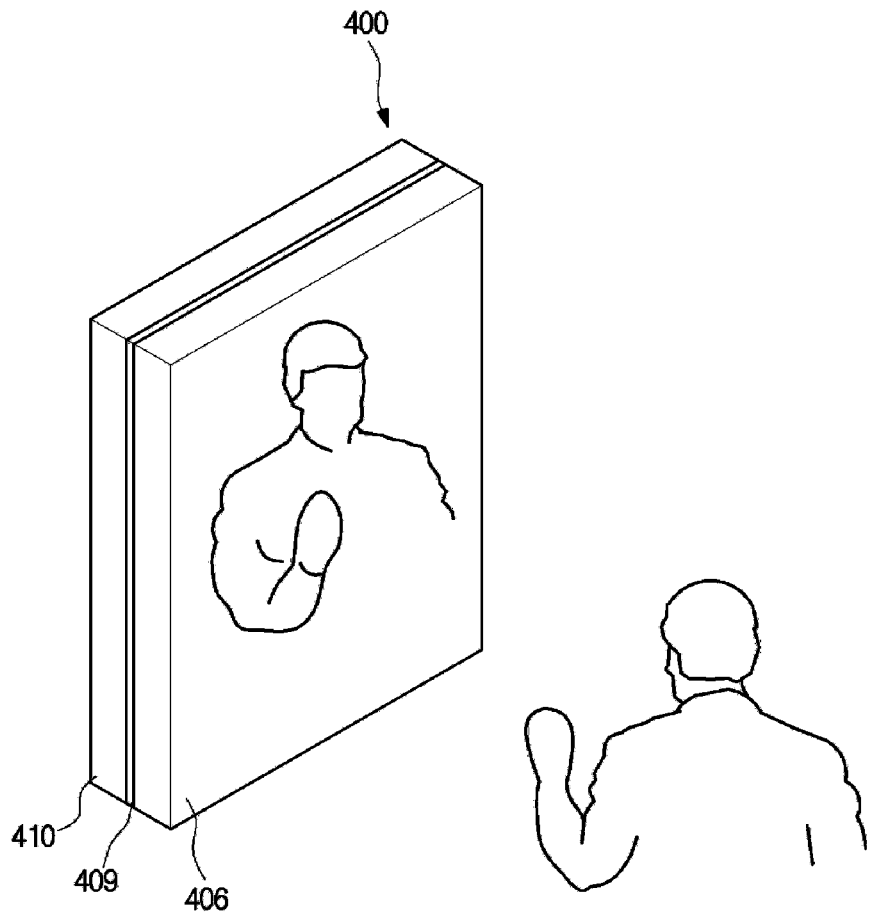
FIGS. 19A to 19D are views for describing a second mode of the display apparatus according to the third embodiment of the present disclosure.

Meanwhile, if the second mode is selected through the input device 401, the display apparatus 400 may show an image of an object located in front of the display apparatus 400, like a mirror, as shown in FIG. 19A. That is, if the second mode is selected, the controller 403 may convert the liquid crystal layer to the transmissive mode so that the liquid crystal layer 406 can transmit light. The liquid crystal driver 405 may apply a high voltage to the liquid crystal layer 406 based on a command from the controller 403 so that the cholesteric liquid crystals of the liquid crystal layer 406 become a homeotropic state to convert the liquid crystal layer 406 to the transmissive mode.

Figure 19B:
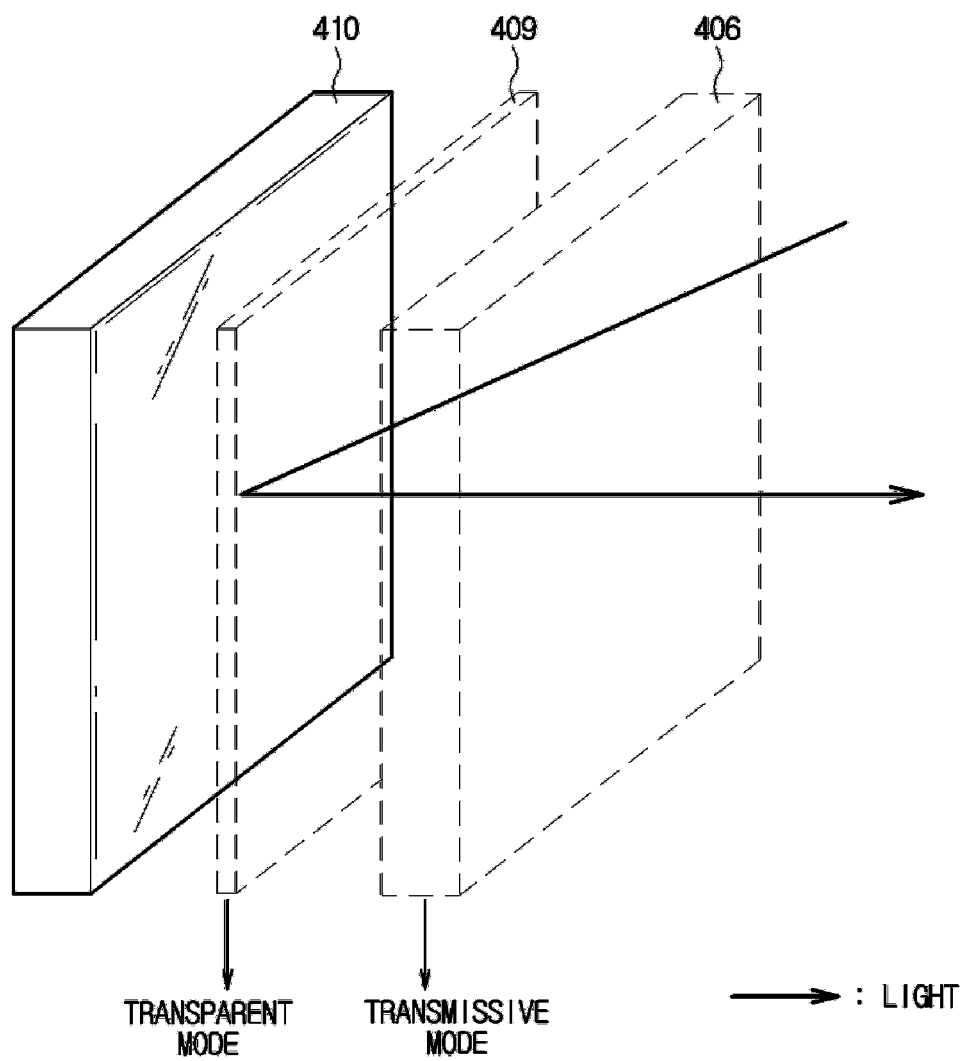

Also, if the second mode is selected, the controller 403 may adjust a voltage to be applied to the conversion layer 409 in order to convert the conversion layer 409 to the transparent mode, as shown in FIG. 19B. If the conversion layer 409 includes TN liquid crystals, the conversion layer driver 407 may apply no voltage to the conversion layer 409 under the control of the controller 403, and if the conversion layer 409 includes VA liquid crystals, the conversion layer driver 407 may apply a voltage to the conversion layer 409 under the control of the controller 403.

If the liquid crystal layer 406 becomes the transmissive mode and the conversion layer 409 becomes the transparent mode, light incident to the display apparatus 400 may be transmitted through the liquid crystal layer 406 and the conversion layer 409, reflected by the reflective layer 410, then transmitted through the conversion layer 409 and the liquid crystal layer 406, and then emitted to the outside. Accordingly, the display apparatus 400 may function as a mirror as shown in FIG. 19A.

Figure 19C:
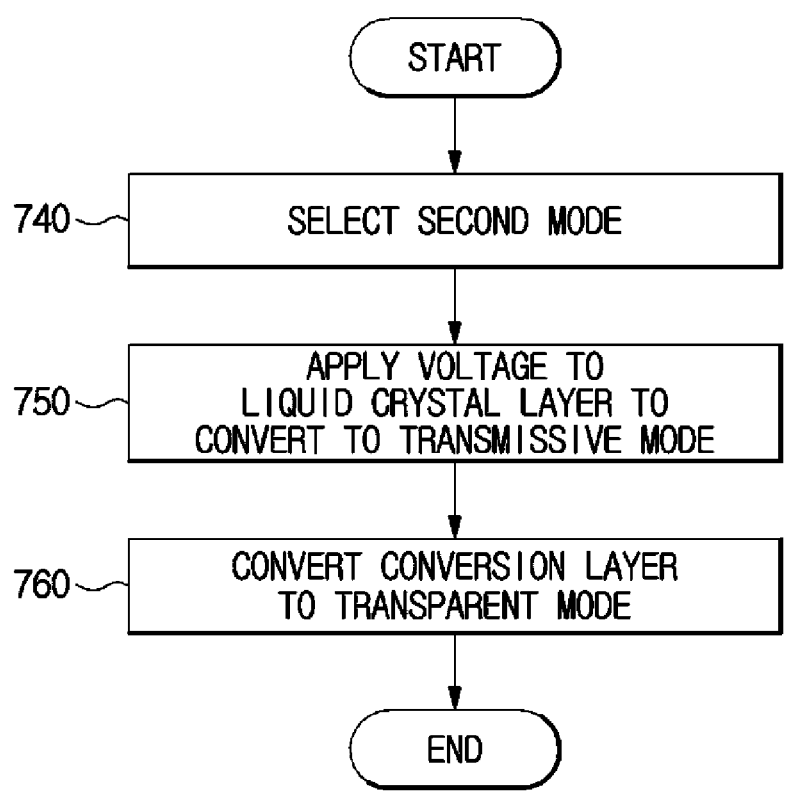

FIG. 19C is a flowchart illustrating a method of controlling the display apparatus according to the third embodiment when the second mode is selected. Referring to FIG. 19C, if the second mode is selected through the input device 401, in operation 740, the controller 403 may apply a voltage to the liquid crystal layer 406 to convert the liquid crystal layer 406 to the transmissive mode, in operation 750.

If the second mode is selected through the input device 401, the display apparatus 400 may show an image of an object located in front of the display apparatus 400, like a mirror, as shown in FIG. 19A. That is, if the second mode is selected, the controller 403 may convert the liquid crystal layer 406 to the transmissive mode so that the liquid crystal layer 406 can transmit light. The liquid crystal layer driver 405 may apply a high voltage to the liquid crystal layer 406 based on a command from the controller 403 so that the cholesteric liquid crystals of the liquid crystal layer 406 become a homeotropic state to convert the liquid crystal layer 406 to the transmissive mode.

Also, the controller 403 may convert the conversion layer 409 to the transparent mode, in operation 760. If the second mode is selected, the controller 403 may adjust a voltage to be applied to the conversion layer 409 to convert the conversion layer 409 to the transparent mode, as shown in FIG. 19B, as shown in FIG. 19B. As described above, if the conversion layer 409 includes TN liquid crystals, the conversion layer driver 407 may apply no voltage to the conversion layer 409 under the control of the controller 403, and if the conversion layer 409 includes VA liquid crystals, the conversion layer driver 407 may apply a voltage to the conversion layer 409 under the control of the controller 403. If the liquid crystal layer 406 becomes the transmissive mode, and the conversion layer 409 becomes the transparent mode, light incident to the display apparatus 400 may be transmitted through the liquid crystal layer 406 and the conversion layer 409, reflected by the reflective layer 410, then transmitted through the conversion layer 409 and the liquid crystal layer 406, and then emitted to the outside. Accordingly, the display apparatus 400 may function as a mirror, as shown in FIG. 19A.

Figure 19D:
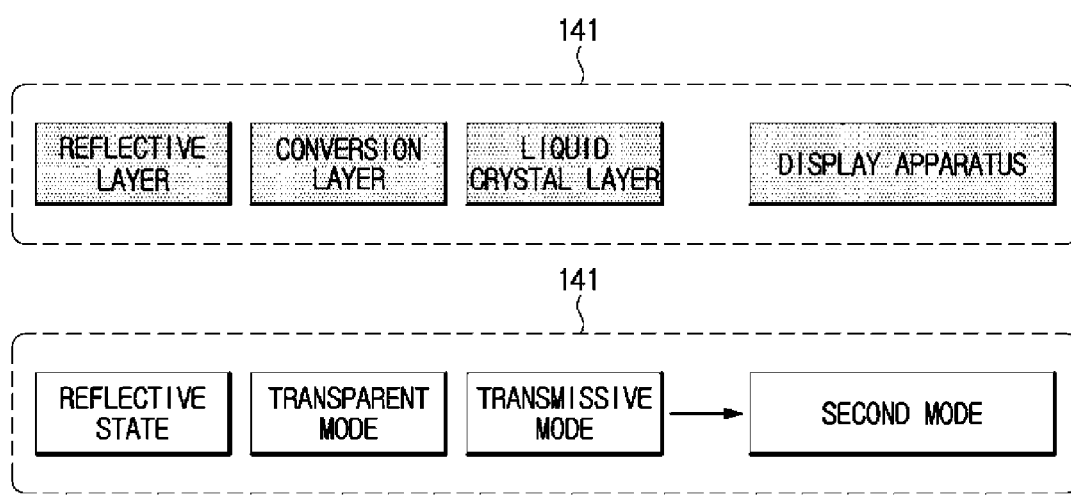

As shown in FIG. 19D, a user may enter a setting UI for converting a mode of the display apparatus 400 through the input device 401. The setting UI may include a first area 140 representing components of the display apparatus 400 to be subject to mode conversion, and a second area 141 representing modes of the components, as shown in FIG. 19D.

The user may convert the liquid crystal layer 406 displayed on the setting UI to the display mode, the conversion layer 409 to the opaque mode, and the reflective layer 410 to the reflective state, respectively, through the input device 401, so as to set the display apparatus 400 to the second mode for performing a mirror function. The user may set modes of the individual components of the display apparatus 400 displayed on the setting UI, through the input device 401, for example, a remote controller or a smart phone, or the user may touch the display apparatus 400 to set modes of the individual components of the display apparatus 400 displayed on the setting UI.

If the modes of the individual components constituting the display apparatus 400 displayed on the first area 140 change, the setting UI may display a mode of the display apparatus 400 corresponding to the changed modes. That is, if the modes of the individual components constituting the display apparatus 400 displayed on the first area are set as shown in FIG. 19D, the setting UI may display information indicating that the mode of the display apparatus 400 has changed to the first mode, on a part representing the state of the display apparatus 400 of the second area 141. The states of the liquid crystal layer 406, the conversion layer 409, and the reflective layer 410 which are displayed on the setting UI may be displayed as text (transmissive mode, transparent mode, reflective state), as shown in FIG. 19D, or as images by which the user can intuitively recognize the states of the liquid crystal layer 406, the conversion layer 409, and the reflective layer 410.

Figure 20A:
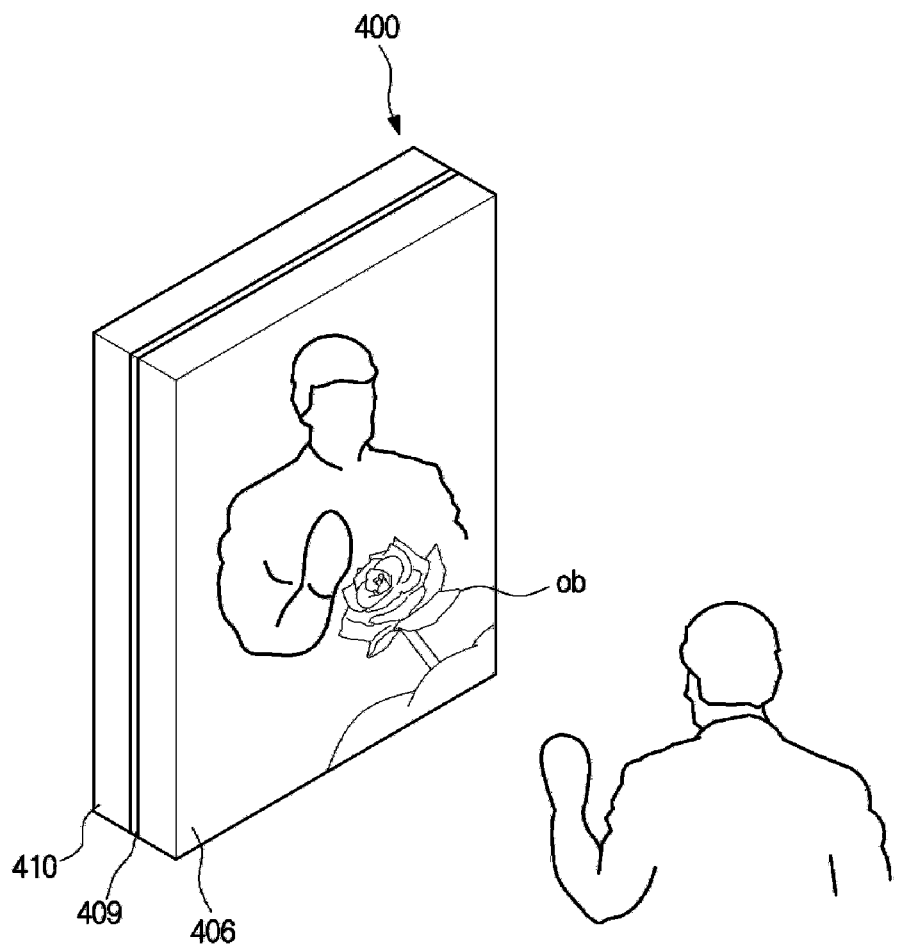

If the third mode is selected through the input device 401, as shown in FIG. 20A, the display apparatus 400 may display an object ob, while functioning as a mirror. That is, if the third mode is selected, the controller 403 may convert the liquid crystal layer 406 to the transmissive mode so that the liquid crystal layer 406 can transmit light, and convert an area on which the object ob is displayed to the transmissive mode. The liquid crystal layer driver 405 may apply a high voltage to the liquid crystal layer 406 based on a command from the controller 403 so that the cholesteric liquid crystals of the liquid crystal layer 406 become a homeotropic state to convert the liquid crystal layer 406 to the transmissive mode. The liquid crystal layer driver 405 may adjust a voltage to be applied to the liquid crystal layer 406 so that the area on which the object ob is displayed becomes a planar state.

In other words, as shown in (b) of FIG. 20B, the liquid crystal layer driver 405 may apply a high voltage to the liquid crystal layer 406 so that the liquid crystal layer 406 becomes a homeotropic state to be converted to the transmissive mode, and adjust a voltage to be applied to the area on which the object ob is displayed so that the area becomes a planer state to enter the display mode D. In order to put emphasis on execution of the mirror function, by reducing reflectivity of the area on which the object ob is displayed to be lower than reflectivity of the liquid crystal layer 406 in the first mode, the object ob may be displayed with minimum visibility. That is, by adjusting reflectivity of the area on which the object ob is displayed, it is possible to enhance the mirror function or the display function.

Also, it is possible to select pixels to be converted to the display mode and convert only the selected pixels to the display mode, at a level at which the shape of the object ob can be recognized and visibility of the object ob can be ensured, without converting all pixels belonging to an area in which the object is displayed to the display mode. Also, by adjusting the reflectivity of the selected pixels, it is possible to more enhance the mirror function.

Also, if the third mode is selected, the controller 403 may adjust a voltage to be applied to the conversion layer 409 so as to convert the conversion layer 409 to the transparent mode, as shown in (a) of FIG. 20B. As described above, if the conversion layer 409 includes TN liquid crystals, the conversion layer driver 407 may apply no voltage to the conversion layer 409 under the control of the controller 403, and if the conversion layer 409 includes VA liquid crystals, the conversion layer driver 407 may apply a voltage to conversion layer 409 under the control of the controller 403.

If an area on which the object ob of the liquid crystal layer 406 is displayed is in the display mode, the remaining area is in the transmissive mode, and the conversion layer 409 is in the transparent mode, light incident to the area in which the object ob is displayed, among light incident to the display apparatus 400, may be reflected to display the object ob on the liquid crystal layer 406. The remaining incident light may be transmitted through the liquid crystal layer 406 and the conversion layer 409, reflected by the reflective layer 410, then again transmitted through the conversion layer 409 and the liquid crystal layer 406, and thus emitted to the outside. Accordingly, the display apparatus 400 can display the object ob, while functioning as a mirror, as shown in FIG. 20A.

Meanwhile, in the third mode, if surroundings of the display apparatus 400 are bright, the object ob may also be displayed brightly. If the surroundings of the display apparatus 400 are very bright due to a fluorescent light or the light of the sun, the object ob may also be displayed very brightly so that the user may be dazzled. In this case, since visibility can be sufficiently ensured although the object ob is displayed less brightly, it is possible to lower the brightness of the object ob for power saving. The display apparatus 400 according to the third embodiment may include a sensor 402 for sensing an ambient brightness of the display apparatus 400 to sense an ambient brightness of the display apparatus 400.

If an ambient brightness of the display apparatus 400 sensed by the sensor 402 is greater than or equal to a reference value, the controller 403 may lower reflectivity of the area on which the object ob of the liquid crystal layer 406 is displayed, thereby adjusting a brightness of the object ob. The display apparatus 400 may store information about a change in brightness of the object ob, a change in reflectivity of the liquid crystal layer 406 or a change of a voltage to be applied to the liquid crystal layer 406, according to a change in ambient brightness of the display apparatus 400, in advance, and adjust a brightness of the liquid crystal layer 406 based on the stored information.

Figure 20C:
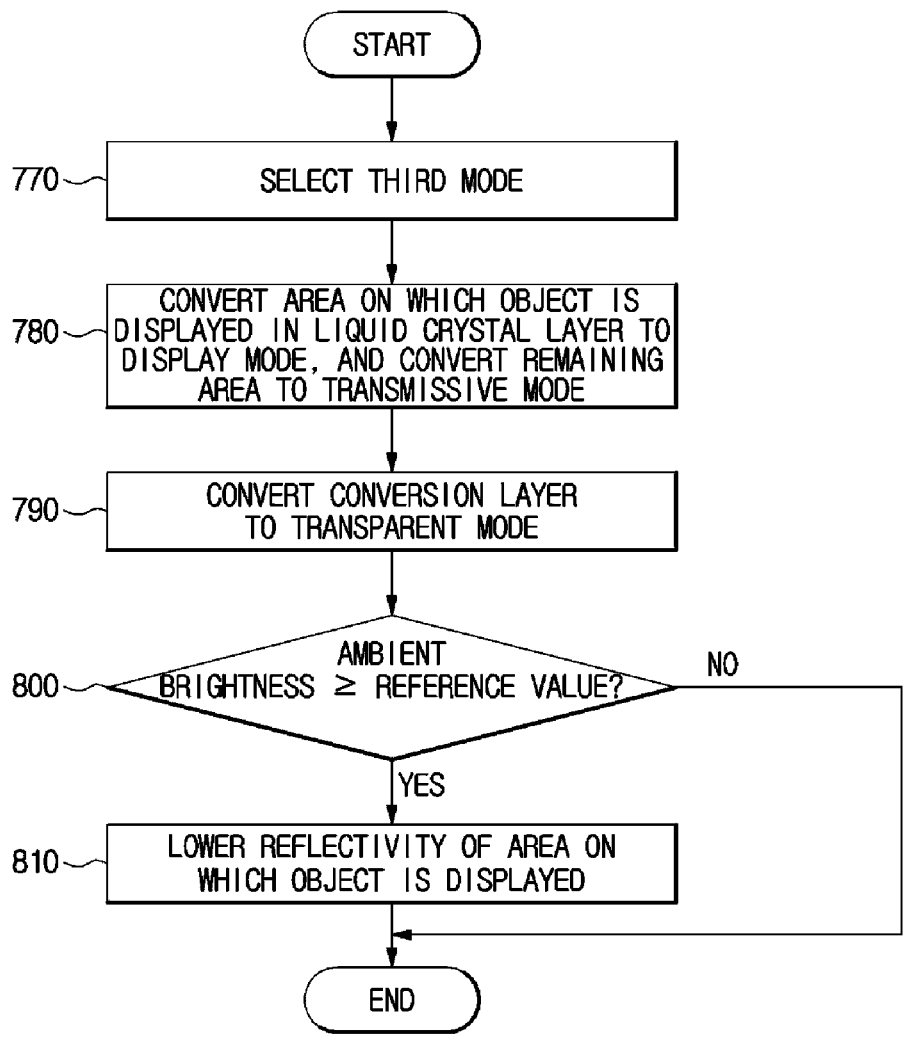

FIG. 20C is a flowchart illustrating a method of controlling the display apparatus 400 according to the third embodiment when the third mode is selected. Referring to FIG. 20C, if the third mode is selected through the input device 401, in operation 770, the controller 403 may convert the area on which the object ob is displayed in the liquid crystal layer 406, to the display mode, and convert the remaining area to the transmissive mode, in operation 780.

If the third mode is selected through the input device 401, as shown in FIG. 20A, the display apparatus 400 may display the object ob, while functioning as a mirror. That is, if the third mode is selected, the controller 403 may convert the liquid crystal layer 406 to the transmissive mode so that the liquid crystal layer 406 can transmit light, and convert the area on which the object ob is displayed to the display mode. The liquid crystal layer driver 405 may apply a high voltage to the liquid crystal layer 406 based on a command from the controller 403 so that the cholesteric liquid crystals of the liquid crystal layer 406 become a homeotropic state to convert the liquid crystal layer 406 to the transmissive mode. The liquid crystal layer driver 405 may adjust a voltage to be applied to the area on which the object is displayed such that the area becomes a planar state.

In other words, as shown in (b) of FIG. 20B, the liquid crystal layer driver 405 may adjust a high voltage to the liquid crystal layer 406 such that the liquid crystal layer 406 becomes a homeotropic state to be converted to the transmissive mode, and adjust a voltage to be applied to the area on which the object ob is displayed such that the area becomes a planar state to enter the display mode. In order to put emphasis on execution of the mirror function, by reducing reflectivity of the area on which the object ob is displayed to be lower than reflectivity of the liquid crystal layer 406 in the first mode, the object ob may be displayed with minimum visibility. That is, by adjusting reflectivity of an area on which the object ob is displayed, it is possible to enhance the mirror function or the display function. Also, it is possible to select pixels to be converted to the display mode and convert only the selected pixels to the display mode, at a level at which the shape of the object ob can be recognized and visibility of the object ob can be ensured, without converting all pixels belonging to the area in which the object is displayed to the display mode.

Also, the controller 403 may convert the conversion layer 409 to the transparent mode, in operation 790. If the third mode is selected, the controller 403 may adjust a voltage to be applied to the conversion layer 409 so as to convert the conversion layer 409 to the transparent mode, as shown in (a) of FIG. 20B. As described above, if the conversion layer 409 includes TN liquid crystals, the conversion layer driver 407 may apply no voltage to the conversion layer 409 under the control of the controller 403, and if the conversion layer 409 includes VA liquid crystals, the conversion layer driver 407 may apply a voltage to the conversion layer 409 under the control of the controller 403.

Also, if an ambient brightness of the display apparatus 400 sensed by the sensor 402 of the display apparatus 400 is greater than or equal to a reference value, in operation 800, the controller 403 may lower reflectivity of the area on which the object ob is displayed, in operation 810.

If the surroundings of the display apparatus 400 are bright in the third mode, the object ob may also be displayed brightly. If the surroundings of the display apparatus 400 are very bright due to a fluorescent light or the light of the sun, the object ob may also be displayed very brightly so that a user may be dazzled. In this case, since visibility can be sufficiently ensured although the object ob is displayed less brightly, it is possible to lower the brightness of the object ob in view of power saving. If an ambient brightness of the display apparatus 400 sensed by the sensor 402 is greater than or equal to a reference value, the controller 403 may lower reflectivity of the area on which the object ob of the liquid crystal layer 406 is displayed, thereby adjusting a brightness of the object ob. The display apparatus 400 may store information about a change in brightness of the object ob, a change in reflectivity of the liquid crystal layer 406 or a change of a voltage to be applied to the liquid crystal layer 406, according to a change in ambient brightness of the display apparatus 400, in advance, and adjust a brightness of the liquid crystal layer 406 based on the stored information.

Figure 20D:
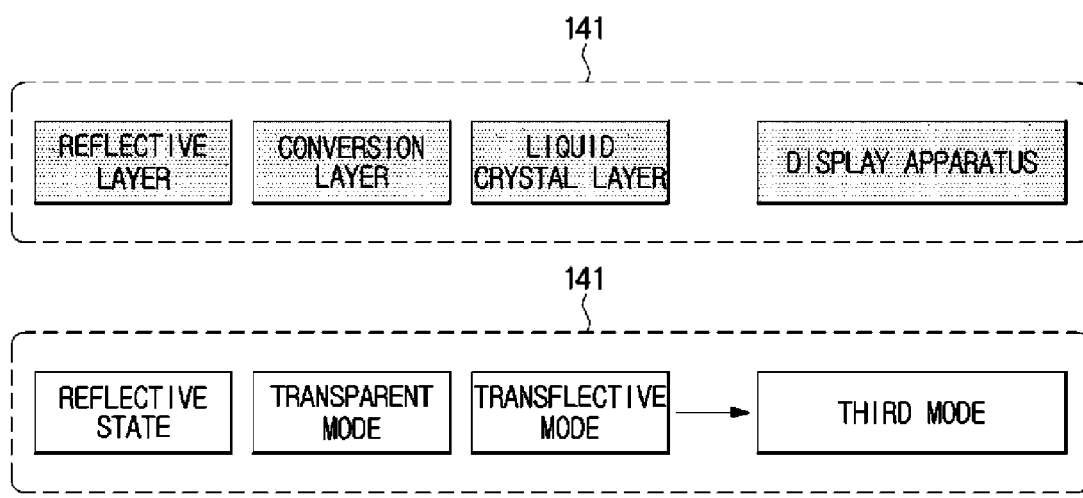

As shown in FIG. 20D, a user may enter a setting UI for converting a mode of the display apparatus 400 through the input device 401. The setting UI may include a first area 140 representing components of the display apparatus 400 to be subject to mode conversion, and a second area 141 representing modes of the components, as shown in FIG. 20D.

The user may convert the liquid crystal layer 406 displayed on the setting UI to a transflective mode, the conversion layer 409 to the transparent mode, and the reflective layer 410 to the reflective state, respectively, through the input device 401, so as to set the display apparatus 400 to the third mode for performing a mirror function. The transflective mode of the liquid crystal layer 406 means a case in which the area of the liquid crystal layer 406 on which the object ob is displayed is in the display mode, and the remaining area is in the transmissive mode of transmitting light. The user may set modes of the individual components of the display apparatus 400 displayed on the setting UI, through the input device 401, for example, a remote controller or a smart phone, or the user may touch the display apparatus 400 to set modes of the individual components of the display apparatus 400 displayed on the setting UI.

If the modes of the individual components constituting the display apparatus 400 displayed on the first area 140 change, the setting UI may display a mode of the display apparatus 400 corresponding to the changed modes. That is, if the modes of the individual components constituting the display apparatus 400 displayed on the first area are set as shown in FIG. 20D, the setting UI may display information indicating that the mode of the display apparatus 400 has changed to the third mode, on a part representing the state of the display apparatus 400 of the second area 141. The states of the liquid crystal layer 406, the conversion layer 409, and the reflective layer 410 which are displayed on the setting UI may be displayed as text (transflective mode, transparent mode, reflective state), as shown in FIG. 20D, or as images by which the user can intuitively recognize the states of the liquid crystal layer 406, the conversion layer 409, and the reflective layer 410.

Figure 21A:
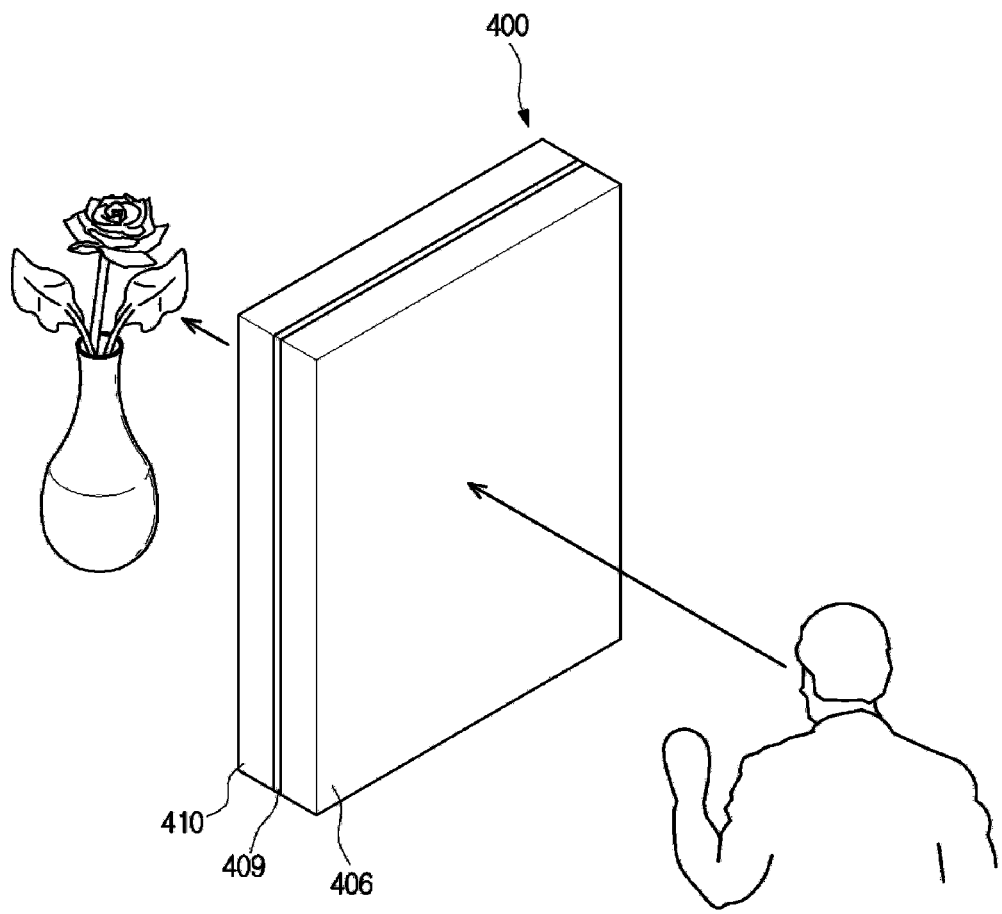
FIGS. 21A to 21D are views for describing a fourth mode of the display apparatus according to the third embodiment of the present disclosure.

If the fourth mode is selected through the input device 401, as shown in FIG. 21A, the display apparatus 400 may become a transparent state. The controller 403 may convert the liquid crystal layer 406 to the transmissive mode so that the liquid crystal layer 406 can transmit light. The liquid crystal layer driver 405 may apply a high voltage to the liquid crystal layer 406 based on a command from the controller 403 so that the cholesteric liquid crystals of the liquid crystal layer 406 become a homeotropic state to convert the liquid crystal layer to the transmissive mode.

Figure 21B:
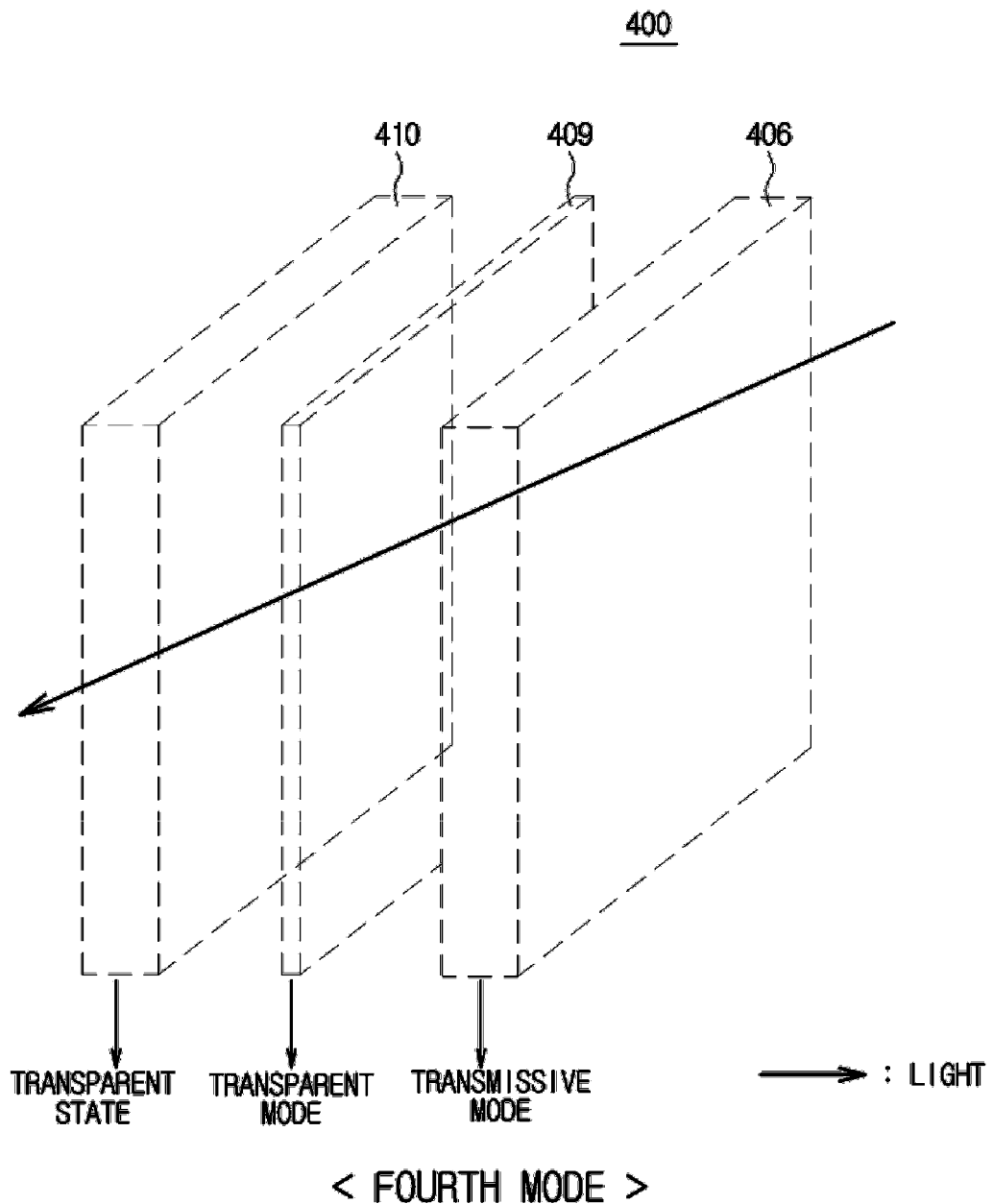

Also, if the fourth mode is selected, the controller 403 may adjust a voltage to be applied to the conversion layer 409 so that the conversion layer 409 can enter the transparent mode, as shown in FIG. 21B. As described above, if the conversion layer 409 includes TN liquid crystals, the conversion layer driver 407 may apply no voltage to the conversion layer 409 under the control of the controller 403, and if the conversion layer 409 includes VA liquid crystals, the conversion layer driver 407 may apply a voltage to the conversion layer under the control of the controller 403.

Also, if the fourth mode is selected, the controller 403 may convert the reflective layer 410 to a transparent state.

If the liquid crystal layer 406 becomes the transmissive mode, the conversion layer 409 becomes the transparent mode, and the reflective layer 410 becomes a transparent state, light incident to the display apparatus 400 may be transmitted through the liquid crystal layer 406, the conversion layer 409, and the reflective layer 410. Accordingly, the display apparatus 400 may become a transparent state, as shown in FIG. 21A.

Figure 21C:
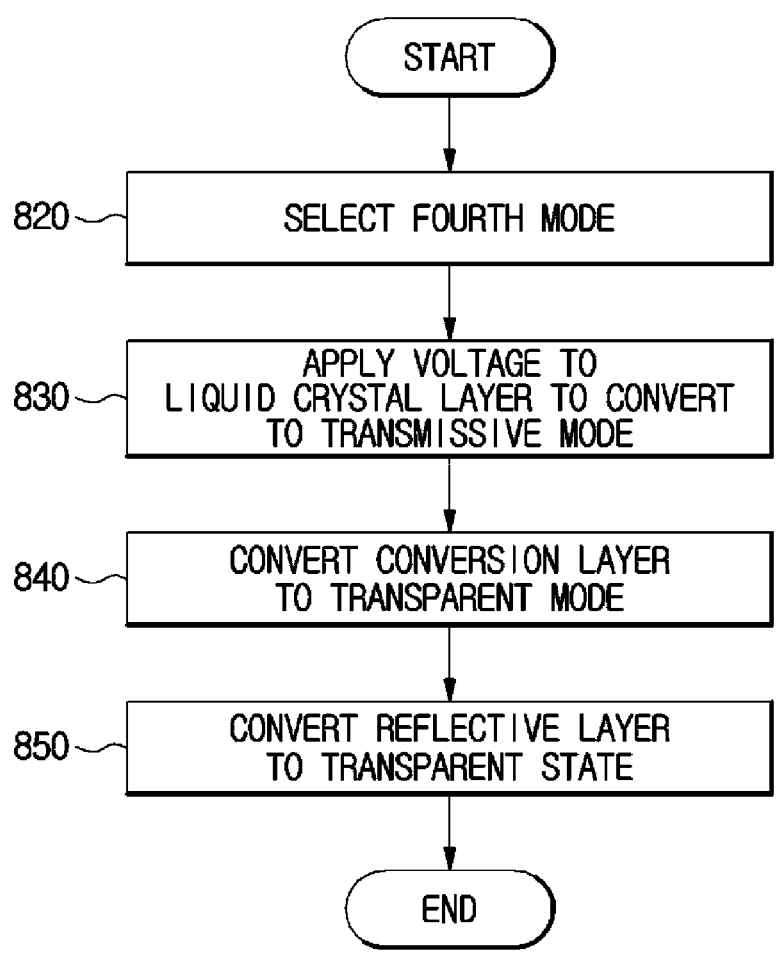

FIG. 21C is a flowchart illustrating a method of controlling the display apparatus according to the third embodiment when the fourth mode is selected. Referring to FIG. 21C, if the fourth mode is selected through the input device 401, in operation 820, the controller 403 may apply a voltage to the liquid crystal layer 406 to convert the liquid crystal layer 406 to the transmissive mode, in operation 830.

If the fourth mode is selected through the input device 401, as shown in FIG. 21A, the display apparatus 400 may become a transparent state. That is, if the fourth mode is selected, the controller 403 may convert the liquid crystal layer 406 to the transmissive mode so that the liquid crystal layer 406 can transmit light. The liquid crystal layer driver 405 may apply a high voltage to the liquid crystal layer 406 based on a command from the controller 403 so that the cholesteric liquid crystals of the liquid crystal layer 406 become a homeotropic state to convert the liquid crystal layer 406 to the transmissive mode.

Also, the controller 403 may convert the conversion layer 409 to the transparent mode, in operation 840. If the fourth mode is selected, the controller 403 may adjust a voltage to be applied to the conversion layer 409 so that the conversion layer 409 can become the transparent mode 409, as shown in FIG. 21B. As described above, if the conversion layer 409 includes TN liquid crystals, the conversion layer driver 407 may apply no voltage to the conversion layer 409 under the control of the controller 403, and if the conversion layer 409 includes VA liquid crystals, the conversion layer driver 407 may apply a voltage to the conversion layer 409 under the control of the controller 403.

Also, the controller 403 may convert the reflective layer 410 to a transparent state, in operation 850. As described above, the reflective layer 410 may be formed of a material that can be converted between a transparent state and a reflective state, for example, when a voltage is applied thereto.

If the liquid crystal layer 406 becomes the transmissive mode, the conversion layer 409 becomes the transparent mode, and the reflective layer 410 becomes a transparent state, light incident to the display apparatus 400 may be transmitted through the liquid crystal layer 40, the conversion layer 409, and the reflective layer 410. Accordingly, the display apparatus 400 may become a transparent state, as shown in FIG. 21A.

Figure 21D:
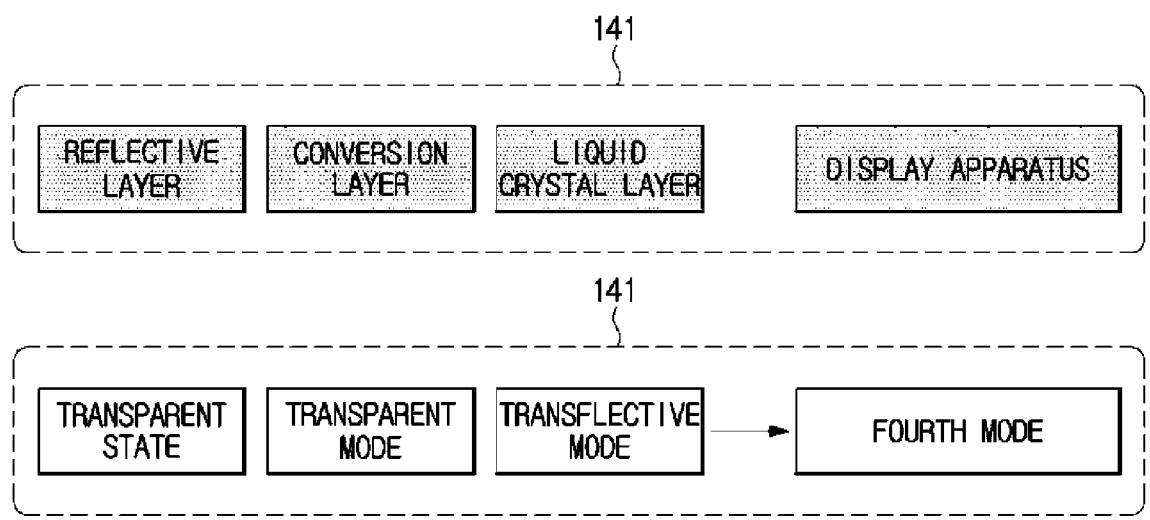

As shown in FIG. 21D, a user may enter a setting UI for converting a mode of the display apparatus 400 through the input device 401. The setting UI may include a first area 140 representing components of the display apparatus 400 to be subject to mode conversion, and a second area 141 representing modes of the components, as shown in FIG. 21D.

The user may convert the liquid crystal layer 406 displayed on the setting UI to the transmissive mode, the conversion layer 409 to the transparent mode, and the reflective layer 410 to a transparent state, respectively, through the input device 401, so as to set the display apparatus 400 to the fourth mode of a transparent state. The user may set modes of the individual components of the display apparatus 400 displayed on the setting UI, through the input device 401, for example, a remote controller or a smart phone, or the user may touch the display apparatus 400 to set modes of the individual components of the display apparatus 400 displayed on the setting UI.

If the modes of the individual components constituting the display apparatus 400 displayed on the first area 140 change, the setting UI may display a mode of the display apparatus 400 corresponding to the changed modes. That is, if the modes of the individual components constituting the display apparatus 400 displayed on the first area are set as shown in FIG. 21D, the setting UI may display information indicating that the mode of the display apparatus 400 has changed to the fourth mode, on a part representing the state of the display apparatus 400 of the second area 141. The states of the liquid crystal layer 406, the conversion layer 409, and the reflective layer 410 which are displayed on the setting UI may be displayed as text (transmissive mode, transparent mode, transparent state), as shown in FIG. 21D, or as images by which the user can intuitively recognize the states of the liquid crystal layer 406, the conversion layer 409, and the reflective layer 410.

Figure 22:
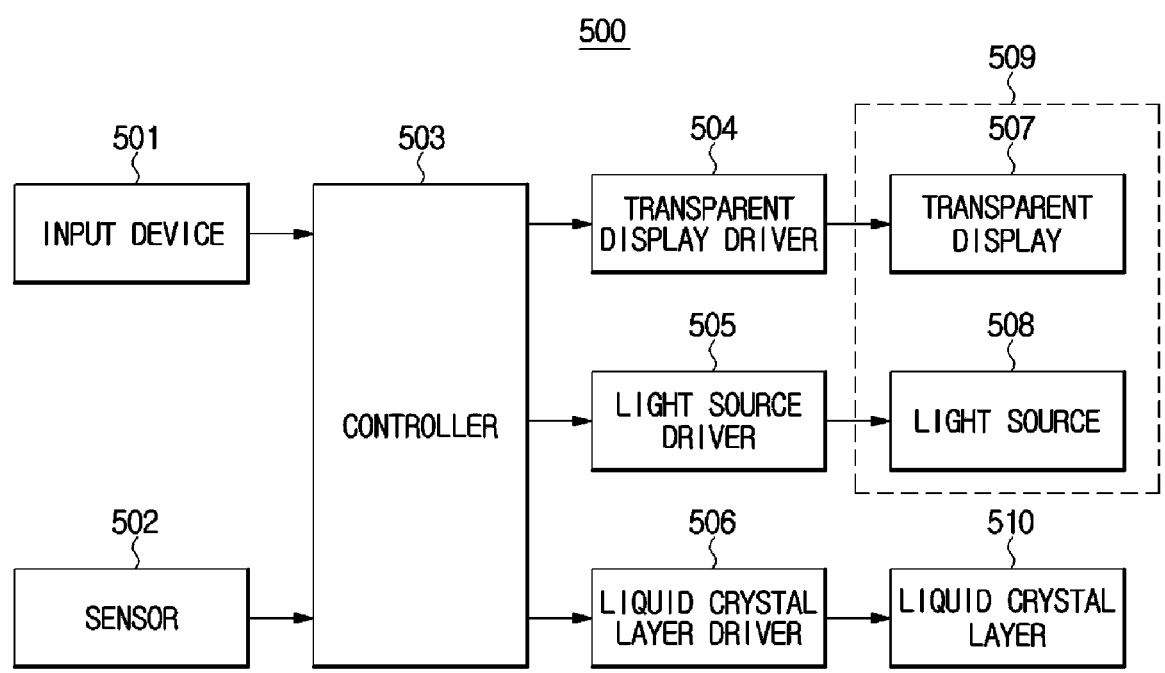
FIG. 22 is a control block diagram of a display apparatus according to a fourth embodiment of the present disclosure.
Figure 23A:
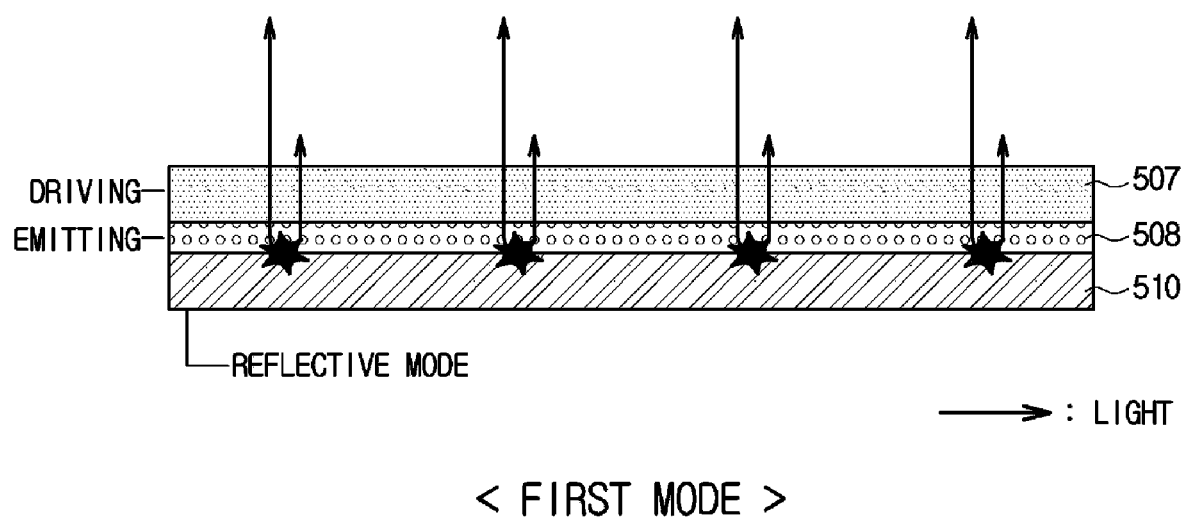
FIGS. 23A to 23C are views for describing a first mode of the display apparatus according to the fourth embodiment of the present disclosure.
Figure 23B:
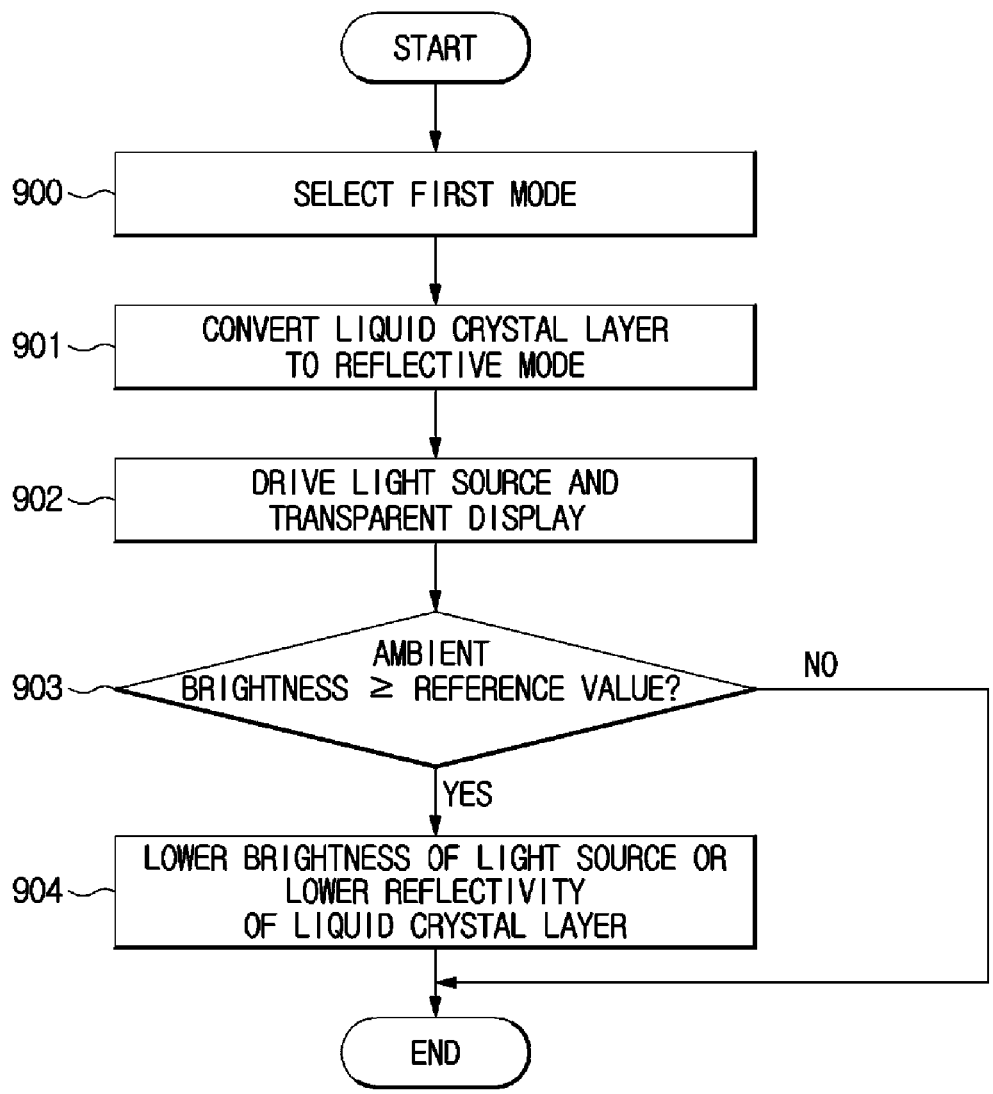
Figure 23C:
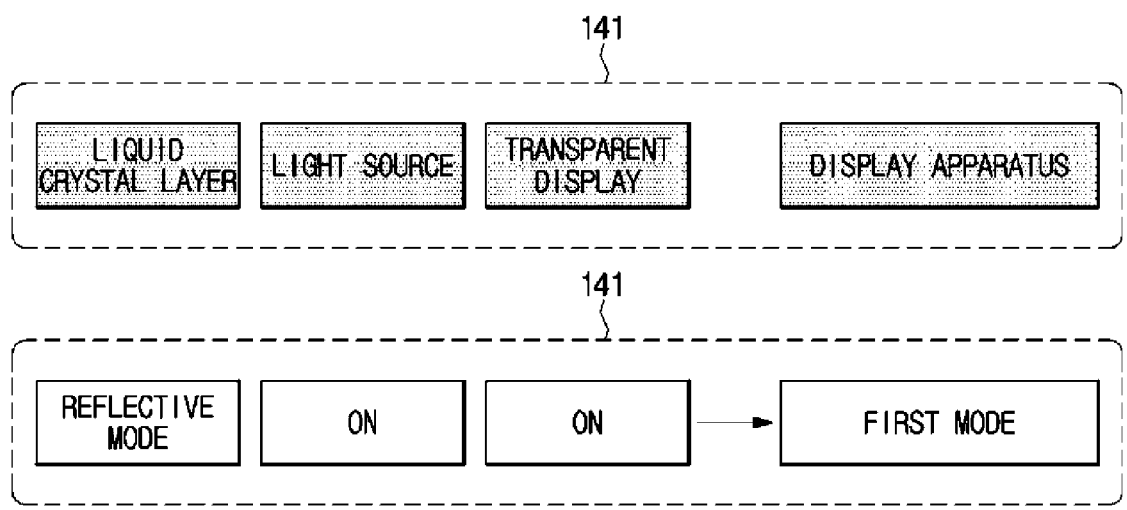
Figure 24A:
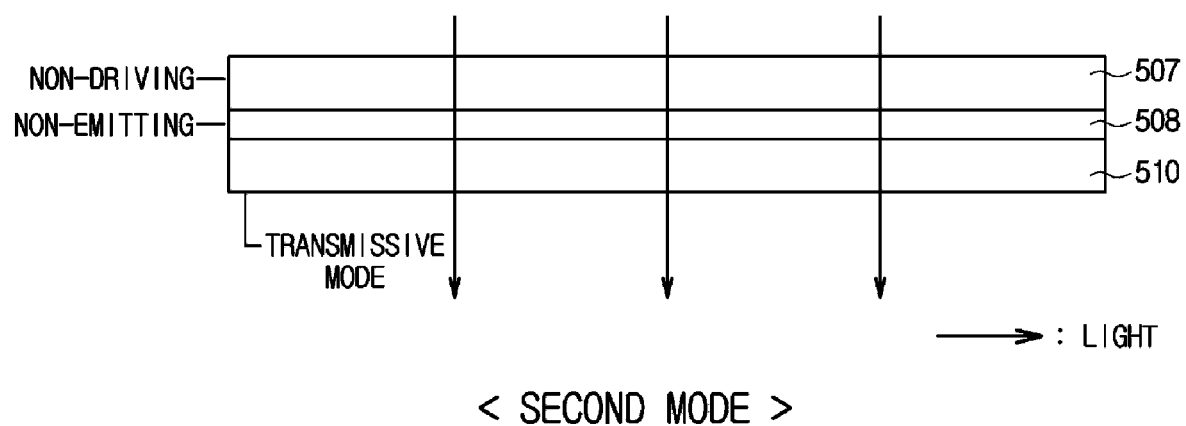
FIGS. 24A to 24C are views for describing a second mode of the display apparatus according to the fourth embodiment of the present disclosure.
Figure 24B:
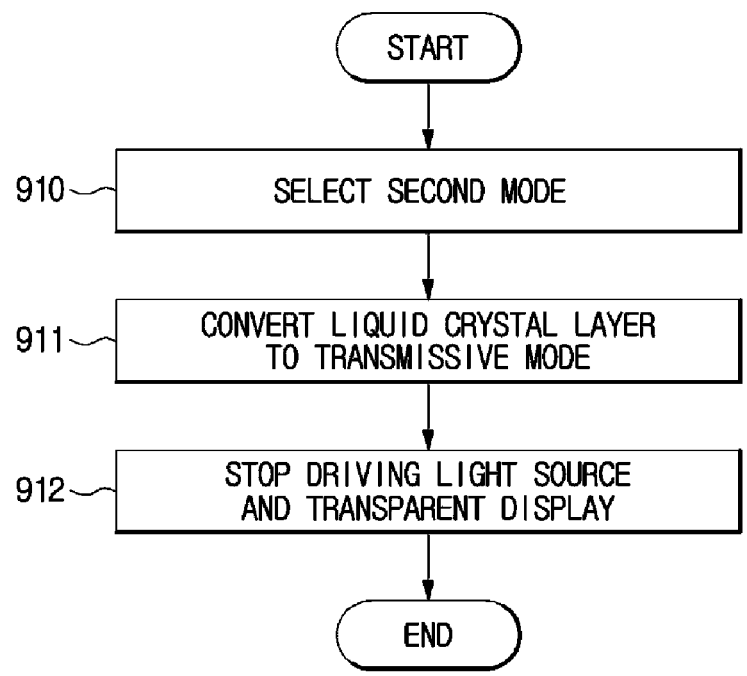
Figure 24C:
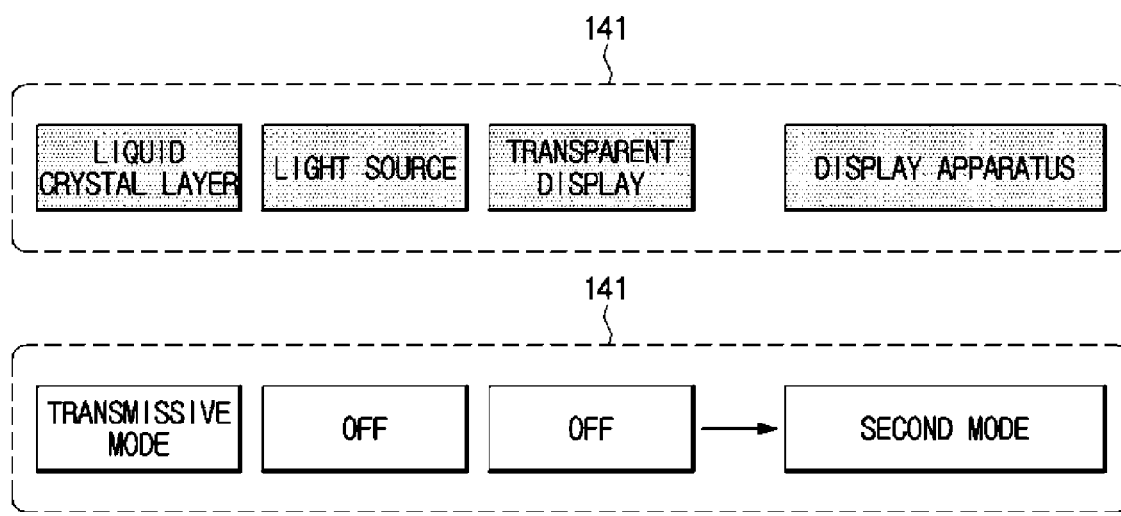
Figure 25A:
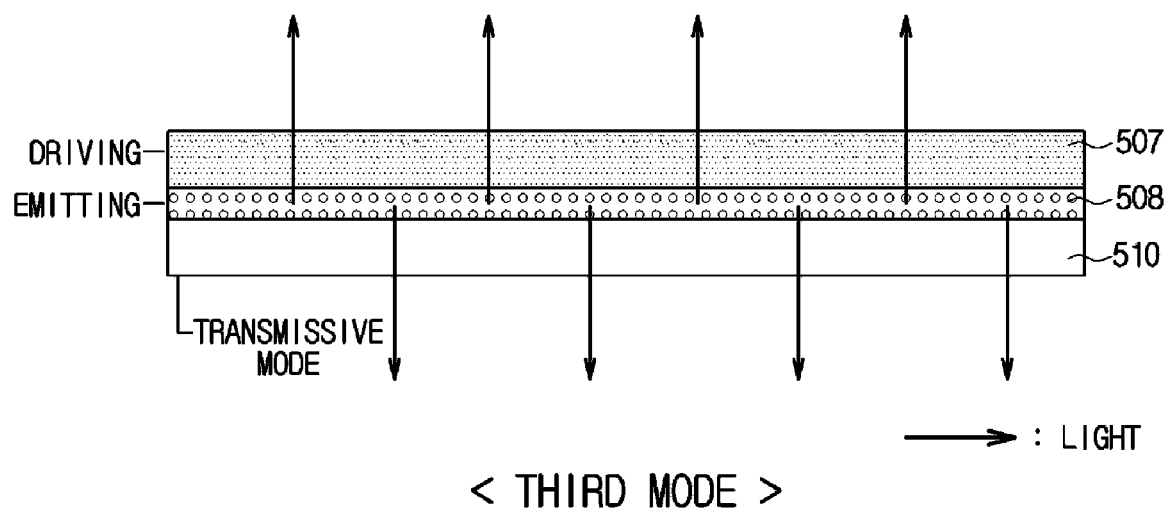
FIGS. 25A to 25C are views for describing a third mode of the display apparatus according to the fourth embodiment of the present disclosure.
Figure 25B:
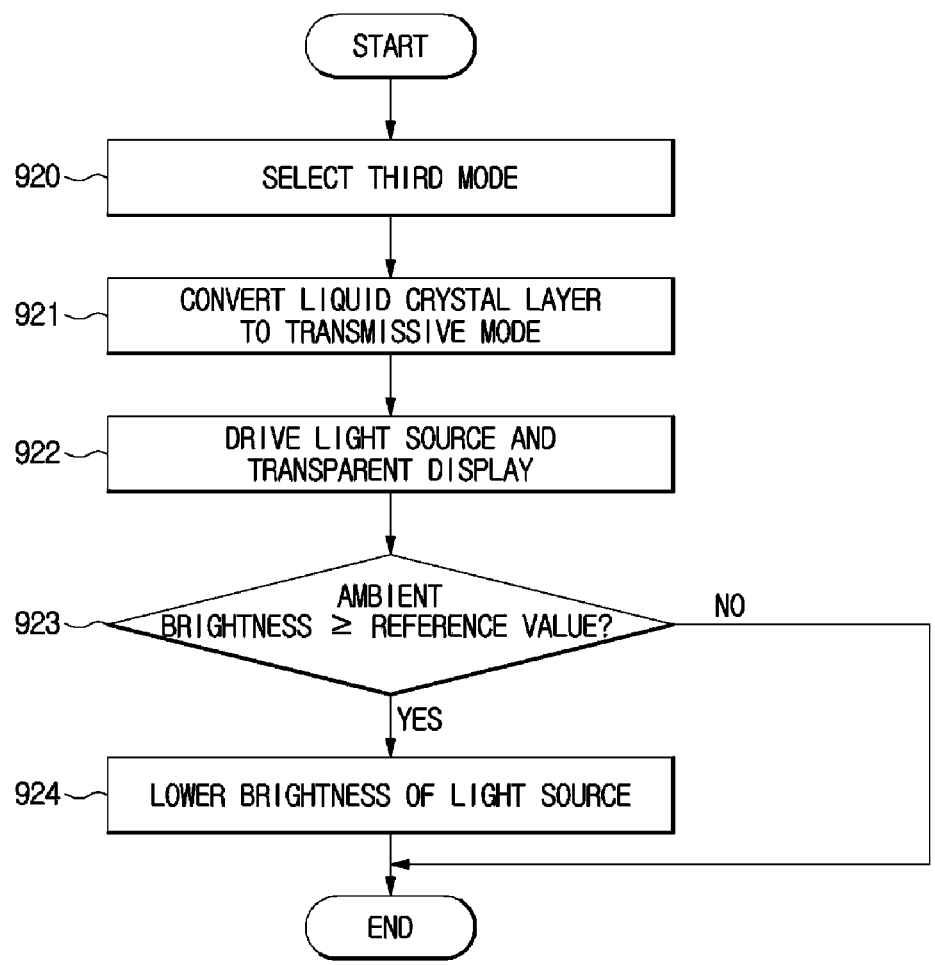
Figure 25C:
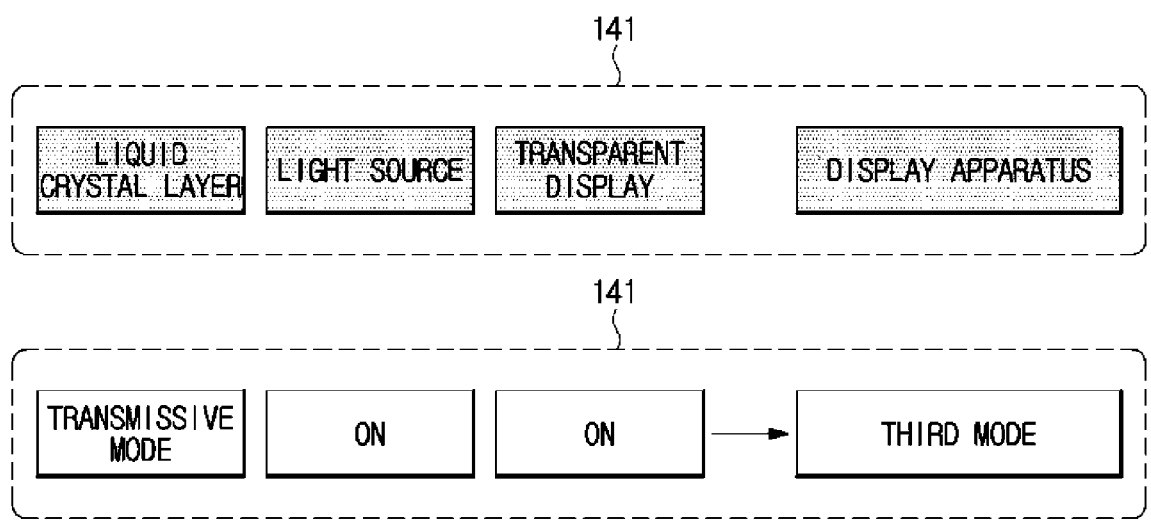
Figure 26A:
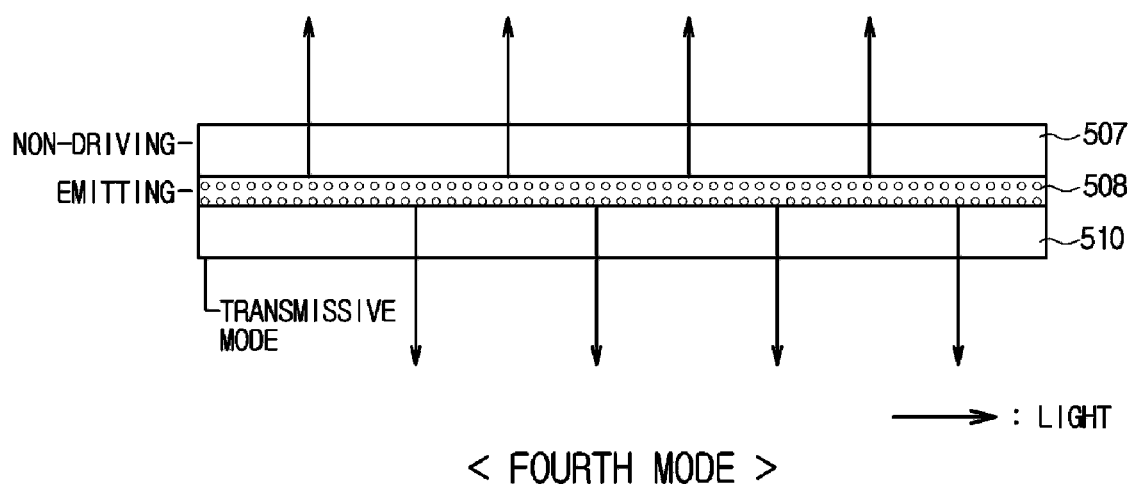
FIGS. 26A to 26C are views for describing a fourth mode of the display apparatus according to the fourth embodiment of the present disclosure.
Figure 26B:
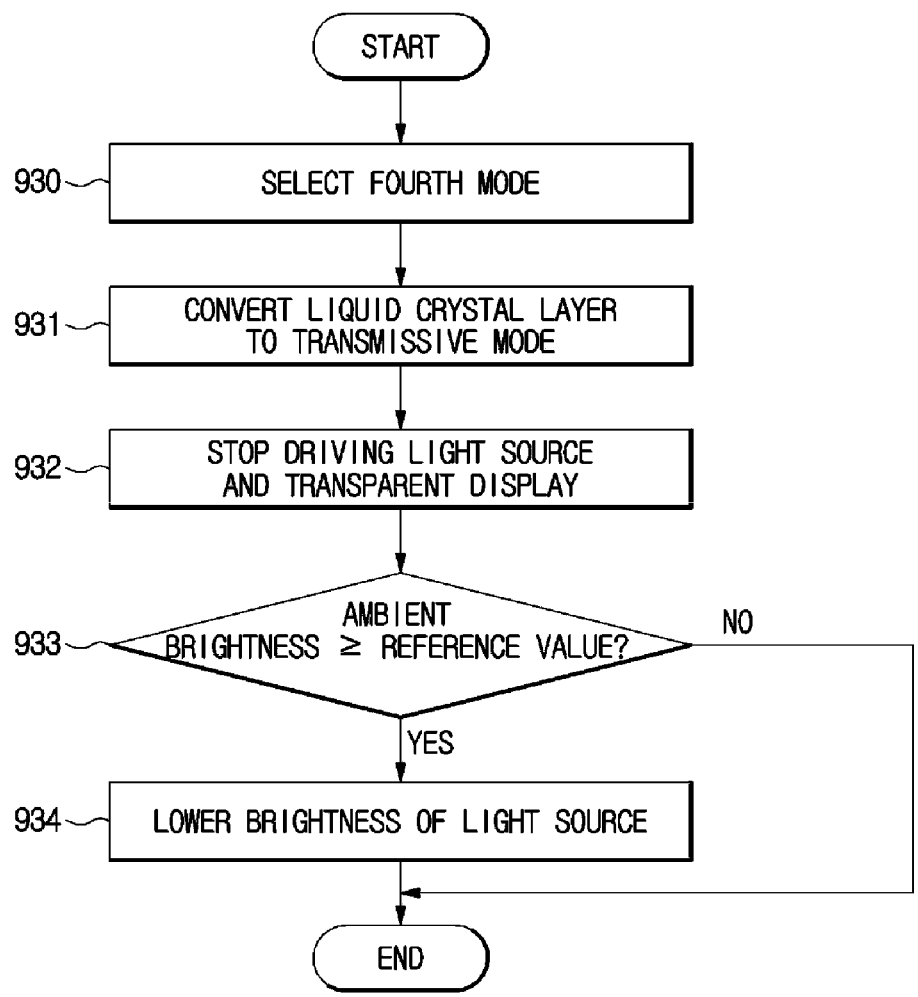
Figure 26C:
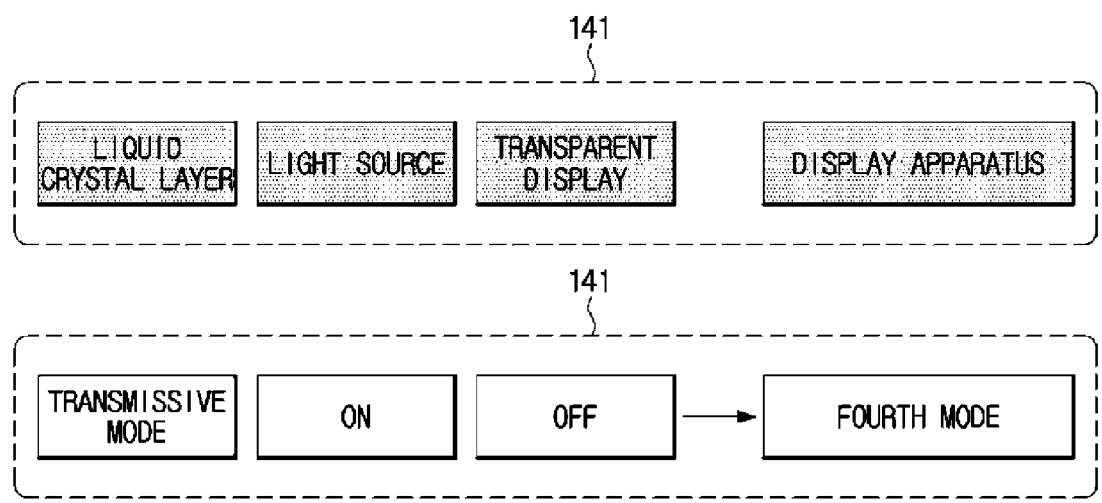

FIG. 22 is a control block diagram of a display apparatus according to a fourth embodiment of the present disclosure, FIGS. 23A to 23C are views for describing a first mode of the display apparatus according to the fourth embodiment of the present disclosure, FIGS. 24A to 24C are views for describing a second mode of the display apparatus according to the fourth embodiment of the present disclosure, FIGS. 25A to 25C are views for describing a third mode of the display apparatus according to the fourth embodiment of the present disclosure, and FIGS. 26A to 26C are views for describing a fourth mode of the display apparatus according to the fourth embodiment of the present disclosure.

A display apparatus 500 according to the fourth embodiment of the present disclosure may be a transparent display apparatus 500 to enable a user to see various information displayed on the display apparatus 500, while seeing an object located behind the display apparatus 500. The transparent display apparatus 500 according to the fourth embodiment may be used in various fields, such as a showcase, a smart window, or an electronic display for advertising.

The display apparatus 500 may include an input device 501 to enable a user to input a command for controlling the display apparatus 500, a sensor 502 to sense an ambient brightness around the display apparatus 500, a controller 503 to output a control signal for controlling the display apparatus 500 based on a command input through the input device 501 and the result of sensing by the sensor 502, a transparent display driver 504 to drive a transparent display 507 according to the control of the controller 503, a light source driver 505 to drive a light source 508 according to the control of the controller 503, a liquid crystal layer driver 506 to drive a liquid crystal layer 510 according to the control of the controller 503, a transparent display panel 509 including the transparent display 507 to display image information in a transparent state and the light source 508 to generate light, and the liquid crystal layer 510 to enable conversion between a transparent mode and a reflective mode.

The input device 501 may be provided in the form of buttons, etc. in the display apparatus 500. For example, the input device 501 may be a remote controller to control the display apparatus 500 remotely. Buttons installed in the display apparatus 500 or in the remote controller may be a hard key type or a soft key type that can receive touch inputs. Also, the input device 501 may include a voice recognition apparatus or a motion recognition apparatus. Also, the input device 501 may include a mobile communication terminal, such as a smart phone or a tablet PC, which can transmit control commands, images, or text to the display apparatus 500 through wireless communication. The wireless communication for receiving commands from the mobile communication terminal may be one of communication methods including Zigbee, NFC, Wi-Fi, and RFID.

The display apparatus 500 according to the fourth embodiment of the present disclosure may provide a first mode for displaying information, a second mode for maintaining a transparent state, a third mode for displaying information in a transparent state, and a fourth mode for performing a lighting function. The input device 501 of the display apparatus 500 according to the fourth embodiment may include buttons to enable a user to select one of the first to fourth modes. A plurality of buttons may be provided to enable a user to select the first mode, the second mode, the third mode, or the fourth mode, or a single button may be provided in such a way to convert between the modes. Also, a button for entering a setting UI for conversion between the modes may be provided. Also, an input for selecting or converting the modes or for entering the setting UI may be provided by various input methods through the input device 501 as described above, in addition to the buttons.

The transparent display panel 509 may include the transparent display 507 including a transparent LCD, and the light source 508. The transparent LCD may include liquid crystals filled between transparent substrates on which transparent electrodes are formed. The substrates may be implemented with transparent glass or transparent plastic. For example, the plastic may be one selected from a group including silicon, silicon oxide, silicon carbide, PET, PEN, etc. If the substrates are implemented with transparent plastic, the substrates may become thinner and lighter than glass substrates, and also have flexibility.

The transparent electrodes may be formed of a transparent conductive material, and examples of the transparent conductive material may be ITO, IZO, ZAO, etc.

The light source 508 may be implemented as a transparent backlight unit disposed behind the transparent LCD to irradiate light to the transparent LCD. For example, the light source 508 may be a transparent OLED.

Alternatively, the light source 508 may be implemented with a transparent light guide plate disposed behind the transparent LCD, and a plurality of light sources 508 disposed in at least one edge of the transparent light guide plate. The light source 508 may be a Cold Cathode Fluorescent Lamp (CCFL), an External Electrode Fluorescent Lamp (EEFL), or a Light Emitting Diode (LED) array.

The liquid crystal layer 510 disposed behind the transparent display panel 509 may be a reflective type display apparatus. The liquid crystal layer 510 may include cholesteric liquid crystals, and may be converted between a transmissive mode of transmitting outside light and a reflective mode of reflecting outside light. The liquid crystal layer 510 may be the same as the display apparatus 100 according to the first embodiment, and accordingly, a detailed description thereof will be omitted.

The first to fourth modes of the display apparatus 500 according to the fourth embodiment of the present disclosure may be implementing by driving the light source 508, driving the transparent display 507, and combining the transmissive mode and the reflective mode of the liquid crystal layer 510. Hereinafter, the first to fourth modes will be described in more detail.

If the first mode is selected through the input device 501, the controller 503 may drive the transparent display 507 and the light source 508, and convert the liquid crystal layer 510 to the reflective mode. The transparent display driver 504 and the light source driver 505 may control a voltage to be applied to the transparent display 507 and the light source 508 according to a control command from the controller 503 so that the transparent display 507 can be driven and the light source 508 can emit light.

The liquid crystal layer 510 may reflect all of red light, green light, and blue light in the reflective mode. The liquid crystal driver 506 may remove a voltage applied to the liquid crystal layer 510 rapidly so that all of a first sub cell having a reflective wavelength band corresponding to red light, a second sub cell having a reflective wavelength band corresponding to green light, and a third sub cell having a reflective wavelength band corresponding to blue light become the planar state.

When the liquid crystal layer 510 is in the reflective mode, the liquid crystal layer 150 may function as a shutter of reflecting light generated by the light source 508 and transmitted backward in a front direction, as shown in FIG. 23A. Accordingly, in the first mode, an image displayed on the display apparatus 500 may have high visibility. That is, the first mode may be selected when visibility is more important than the transparent state.

Meanwhile, if surroundings of the display apparatus 500 are bright in the first mode, visibility can be sufficiently ensured although an image is displayed less brightly by lowering the brightness of the light source 508. Accordingly, it is possible to lower the brightness of the object ob in view of power saving. The display apparatus 500 according to the fourth embodiment may include a sensor 502 for sensing an ambient brightness of the display apparatus 500 to sense an ambient brightness of the display apparatus 500.

If an ambient brightness of the display apparatus 500 sensed by the sensor 502 is greater than or equal to a reference value, the controller 503 may lower the brightness of the light source 508, thereby adjusting a brightness of an image to be displayed. Alternatively, the controller 503 may lower reflectivity of the liquid crystal layer 510 to reduce an amount of light reflected from the liquid crystal layer 510 in the front direction, thereby adjusting the brightness of an image. That is, by adjusting at least one of the brightness of the light source 508 or the reflectivity of the liquid crystal layer 510 according to an ambient brightness around the display apparatus 500, an effect of power saving can be obtained. The display apparatus 500 may store information about a change in brightness of an image, a change in brightness of the light source 508, or a change in reflectivity of the liquid crystal layer 510, or a change of a voltage to be applied to the liquid crystal layer 510, according to a change in ambient brightness of the display apparatus 500, and adjust the brightness of the light source 508 or the reflectivity of the liquid crystal layer 510 based on the stored information.

FIG. 23B is a flowchart illustrating a method of controlling the display apparatus 500 according to the fourth embodiment when the first mode is selected. Referring to FIG. 23B, if the first mode is selected through the input device 501, in operation 900, the controller 503 may convert the liquid crystal layer 510 to the reflective mode, in operation 901, and drive the light source 508 and the transparent display 507, in operation 902.

If the first mode is selected through the input device 501, the controller 503 may convert the liquid crystal layer 510 to the reflective mode, and drive the transparent display 507 and the light source 508. The transparent display driver 504 and the light source driver 505 may control a voltage to be applied to the transparent display 507 and the light source 508 according to a control command from the controller 503 so that the transparent display 507 can be driven and the light source 508 can emit light. The liquid crystal layer 510 may reflect all of red light, green light, and blue light in the reflective mode. The liquid crystal driver 506 may remove a voltage applied to the liquid crystal layer 510 rapidly so that all of a first sub cell having a reflective wavelength band corresponding to red light, a second sub cell having a reflective wavelength band corresponding to green light, and a third sub cell having a reflective wavelength band corresponding to blue light become the planar state.

When the liquid crystal layer 510 is in the reflective mode, the liquid crystal layer 150 may function as a shutter of reflecting light generated by the light source 508 and transmitted backward in a front direction, as shown in FIG. 23A. Accordingly, in the first mode, an image displayed on the display apparatus 500 may have high visibility.

If an ambient brightness of the display apparatus 500 is greater than or equal to a reference value, in operation 903, the controller 503 may lower the brightness of the light source 508, or lower the reflectivity of the liquid crystal layer 510, in operation 904.

If surroundings of the display apparatus 500 are bright in the first mode, visibility can be sufficiently ensured although an image is displayed less brightly by lowering the brightness of the light source 508. Accordingly, it is possible to lower the brightness of the light source 508 in view of power saving. If an ambient brightness of the display apparatus 500 sensed by the sensor 502 is greater than or equal to a reference value, the controller 503 may lower the brightness of the light source 508 to adjust the brightness of an image to be displayed. Alternatively, the controller 503 may lower reflectivity of the liquid crystal layer 510 to reduce an amount of light reflected from the liquid crystal layer 510 in the front direction, thereby adjusting the brightness of an image. That is, by adjusting at least one of the brightness of the light source 508 and the reflectivity of the liquid crystal layer 510 according to an ambient brightness around the display apparatus 500, an effect of power saving can be obtained.

As shown in FIG. 23C, a user may enter a setting UI for converting a mode of the display apparatus 500 through the input device 501. The setting UI may include a first area 140 representing components of the display apparatus 500 to be subject to mode conversion or driving control, and a second area 141 representing modes of the components, as shown in FIG. 23C.

The user may convert the liquid crystal layer 510 displayed on the setting UI to the reflective mode, through the input device 501, and drive the transparent display 507 and the light source 508 so as to set the display apparatus 400 to the first mode in which information can be displayed. The user may set modes of the individual components of the display apparatus 400 displayed on the setting UI, through the input device 501, for example, a remote controller or a smart phone, or the user may touch the display apparatus 500 to set modes of the individual components of the display apparatus 500 displayed on the setting UI.

If the modes of the individual components constituting the display apparatus 500 displayed on the first area 140 change, the setting UI may display a mode of the display apparatus 500 corresponding to the changed modes. That is, if the modes of the individual components constituting the display apparatus 500 displayed on the first area 140 are set as shown in FIG. 23C, the setting UI may display information indicating that the mode of the display apparatus 500 has changed to the first mode, on a part representing the state of the display apparatus 500 of the second area 141. The states of the liquid crystal layer 510, the light source 508, and the transparent display 507 which are displayed on the setting UI may be displayed as text (reflective mode, ON, ON), as shown in FIG. 23C, or as images by which the user can intuitively recognize the states of the liquid crystal layer 510, the transparent display 507, and the light source 508.

If the second mode is selected through the input device 501, the controller 503 may stop driving the transparent display 507 and the light source 508, and convert the liquid crystal layer to the transmissive mode so that the liquid crystal layer 510 can transmit light. The liquid crystal driver 506 may apply a high voltage to the liquid crystal layer 510 based on a command from the controller 503 so that the cholesteric liquid crystals of the liquid crystal layer 510 become a homeotropic state to convert the liquid crystal layer 510 to the transmissive mode. Since the display apparatus 500 according to the fourth embodiment becomes a transparent state in the second mode, light may be transmitted through the display apparatus 500, as shown in FIG. 24A.

FIG. 24B is a flowchart illustrating a method of controlling the display apparatus 500 according to the fourth embodiment when the second mode is selected. Referring to FIG. 24B, if the second mode is selected through the input device 501, in operation 910, the controller 503 may convert the liquid crystal layer 510 to the transmissive mode, in operation 911, and stop driving the light source 508 and the transparent display 507, in operation 912.

If the second mode is selected through the input device 501, the controller 503 may stop driving the transparent display 507 and the light source 508, and convert the liquid crystal layer 510 to the transmissive mode so that the liquid crystal layer 510 can transmit light. The liquid crystal driver 506 may apply a high voltage to the liquid crystal layer 510 based on a command from the controller 503 so that the cholesteric liquid crystals of the liquid crystal layer 510 become the homeotropic state to convert the liquid crystal layer 510 to the transmissive mode. Since the display apparatus 500 according to the fourth embodiment becomes a transparent state in the second mode, light may be transmitted through the display apparatus 500, as shown in FIG. 24A.

As shown in FIG. 24C, a user may enter a setting UI for converting a mode of the display apparatus 500 through the input device 501. The setting UI may include a first area 140 representing components of the display apparatus 500 to be subject to mode conversion or driving control, and a second area 141 representing modes of the components, as shown in FIG. 24C.

The user may convert the liquid crystal layer 510 displayed on the setting UI to the transmissive mode through the input device 501, and stop driving the transparent display 507 and the light source 508 to set the display apparatus 500 to the second mode of a transparent state. The user may set modes of the individual components of the display apparatus 500 displayed on the setting UI, through the input device 501, for example, a remote controller or a smart phone, or the user may touch the display apparatus 500 to set modes of the individual components of the display apparatus 500 displayed on the setting UI.

If the modes of the individual components constituting the display apparatus 500 displayed on the first area 140 change, the setting UI may display a mode of the display apparatus 500 corresponding to the changed modes. That is, if the modes of the individual components constituting the display apparatus 500 displayed on the first area are set as shown in FIG. 24C, the setting UI may display information indicating that the mode of the display apparatus 500 has changed to the second mode, on a part representing the state of the display apparatus 500 of the second area 141. The states of the liquid crystal layer 510, the light source 508, and the transparent display 507 which are displayed on the setting UI may be displayed as text (transmissive mode, OFF, OFF), as shown in FIG. 24C, or as images by which the user can intuitively recognize the states of the liquid crystal layer 510, the transparent display 507, and the light source 508.

If the third mode is selected through the input device 501, the controller 503 may drive the transparent display 507 and the light source 508, and convert the liquid crystal layer 510 to the transmissive mode so that the liquid crystal layer 510 can transmit light. The transparent display driver 504 and the light source driver 505 may control a voltage to be applied to the transparent display 507 and the light source 508 according to a control command from the controller 503 so that the transparent display 507 can be driven and the light source 508 can emit light.

The liquid crystal driver 506 may apply a high voltage to the liquid crystal layer 510 based on a command from the controller 503 so that the cholesteric liquid crystals of the liquid crystal layer 510 become a homeotropic state to convert the liquid crystal layer 510 to the transmissive mode.

In the third mode, since the liquid crystal layer 510 is converted to the transmissive mode, unlike the first mode, light generated by the light source 508 and transferred backward may be transmitted through the liquid crystal layer 510, as shown in FIG. 25A. Accordingly, the brightness of an image displayed in the third mode may be lower than the brightness of an image displayed in the first mode, and accordingly, the image displayed in the third mode may have lower visibility than that of the image displayed in the first mode. That is, the third mode may be selected when transparency is more important than visibility of information.

Meanwhile, if surroundings of the display apparatus 500 are bright in the third mode, visibility can be sufficiently ensured although an image is displayed less brightly by lowering the brightness of the light source 508. Accordingly, it is possible to lower the brightness of the object ob in view of power saving. The display apparatus 500 according to the fourth embodiment may include a sensor 502 for sensing an ambient brightness of the display apparatus 500 to sense an ambient brightness of the display apparatus 500.

If an ambient brightness of the display apparatus 500 sensed by the sensor 502 is greater than or equal to a reference value, the controller 503 may lower the brightness of the light source 508, thereby adjusting a brightness of an image to be displayed.

FIG. 25B is a flowchart illustrating a method of controlling the display apparatus 500 according to the fourth embodiment when the third mode is selected. Referring to FIG. 25B, if the third mode is selected through the input device 501, in operation 920, the controller 503 may convert the liquid crystal layer 510 to the transmissive mode in operation 921, and drive the light source 508 and the transparent display 507, in operation 922.

If the third mode is selected through the input device 501, the controller 503 may drive the transparent display 507 and the light source 508, and convert the liquid crystal layer 510 to the transmissive mode so that the liquid crystal layer 510 can transmit light. The transparent display driver 540 and the light source driver 505 may control a voltage to be applied to the transparent display 507 and the light source 508 according to a control command from the controller 503 so that the transparent display 507 can be driven and the light source can emit light. The liquid crystal layer driver 506 may apply a high voltage to the liquid crystal layer 510 based on a command from the controller 503 so that the cholesteric liquid crystals of the liquid crystal layer 510 become the homeotropic state to convert the liquid crystal layer 510 to the transmissive mode. In the third mode, since the liquid crystal layer 510 is converted to the transmissive mode, unlike the first mode, light generated by the light source 508 and transferred backward may be transmitted through the liquid crystal layer 510. Accordingly, the brightness of an image displayed in the third mode may be lower than the brightness of an image displayed in the first mode, and accordingly, the image displayed in the third mode may have lower visibility than that of the image displayed in the first mode. That is, the third mode may be selected when transparency is more important than visibility of information.

If an ambient brightness of the display apparatus 500 is greater than or equal to a reference value, in operation 923, the controller 503 may lower the brightness of the light source 508, in operation 924.

If surroundings of the display apparatus 500 are bright in the third mode, visibility can be sufficiently ensured although an image is displayed less brightly by lowering the brightness of the light source 508. Accordingly, it is possible to lower the brightness of the light source 508 in view of power saving. If an ambient brightness of the display apparatus 500 sensed by the sensor 502 is greater than or equal to a reference value, the controller 503 may lower the brightness of the light source 508, thereby adjusting a brightness of an image to be displayed.

As shown in FIG. 25C, a user may enter a setting UI for converting a mode of the display apparatus 500 through the input device 501. The setting UI may include a first area 140 representing components of the display apparatus 400 to be subject to mode conversion or driving control, and a second area 141 representing modes of the components.

The user may convert the liquid crystal layer 510 displayed on the setting UI to the transmissive mode through the input device 501, and drive the transparent display 507 and the light source 508 to set the display apparatus 500 to the third mode in which information is displayed with more enhanced transparency of the display apparatus 500 than in the first mode. The user may set modes of the individual components of the display apparatus 500 displayed on the setting UI, through the input device 501, for example, a remote controller or a smart phone, or the user may touch the display apparatus 500 to set modes of the individual components of the display apparatus 500 displayed on the setting UI.

If the modes of the individual components constituting the display apparatus 500 displayed on the first area 140 change, the setting UI may display a mode of the display apparatus 500 corresponding to the changed modes. That is, if the modes of the individual components constituting the display apparatus 500 displayed on the first area are set as shown in FIG. 25C, the setting UI may display information indicating that the mode of the display apparatus 500 has changed to the first mode, on a part representing the state of the display apparatus 500 of the second area 141. The states of the liquid crystal layer 510, the light source 508, and the transparent display 507 which are displayed on the setting UI may be displayed as text (transmissive mode, ON, ON), as shown in FIG. 25C, or as images by which the user can intuitively recognize the states of the liquid crystal layer 510, the transparent display 507, and the light source 508.

If the fourth mode is selected through the input device 501, the controller 503 may stop driving the transparent display 507, and drive the light source 508. Also, the controller 503 may convert the liquid crystal layer 510 to the transmissive mode so that the liquid crystal layer 510 can transmit light. The light source driver 505 may control a voltage to be applied to the light source 508 according to a control command from the controller 503 so that the light source 508 can emit light.

The liquid crystal layer driver 506 may apply a high voltage to the liquid crystal layer 510 based on a command from the controller 503 so that the cholesteric liquid crystals of the liquid crystal layer 510 become a homeotropic state to convert the liquid crystal layer 510 to the transmissive mode.

Since the transparent display 507 is not driven in the fourth mode, unlike the third mode, the display apparatus 500 may display neither an image nor information. Also, since the liquid crystal layer 510 is converted to the transmissive mode, light generated by the light source 508 and transferred forward may be transmitted through the transparent display 507, and light transferred backward may be transmitted through the liquid crystal layer 510, as shown in FIG. 26A. Accordingly, in the fourth mode, the display apparatus 500 may function as a lighting.

Meanwhile, if surroundings of the display apparatus 500 are bright in the fourth mode, it is possible to lower the brightness of the light source 508 in view of power saving. The display apparatus 500 according to the fourth embodiment may include a sensor 502 for sensing an ambient brightness of the display apparatus 500 to sense an ambient brightness of the display apparatus 500. If an ambient brightness of the display apparatus 500 sensed by the sensor 502 is greater than or equal to a reference value, the controller 503 may lower the brightness of the light source 508, thereby adjusting the brightness of the display apparatus 500 functioning as a lighting.

FIG. 26B is a flowchart illustrating a method of controlling the display apparatus 500 according to the fourth embodiment when the fourth mode is selected. Referring to FIG. 2B, if the fourth mode is selected through the input device 501, in operation 930, the controller 503 may convert the liquid crystal layer 510 to the transmissive mode, in operation 931, and stop driving the light source 508 and the transparent display 507, in operation 932.

If the fourth mode is selected through the input device 501, the controller 503 may stop driving the transparent display 507, and drive the light source 508. Also, the controller 503 may convert the liquid crystal layer 510 to the transmissive mode so that the liquid crystal layer 510 can transmit light. The light source driver 505 may control a voltage to be applied to the light source 508 according to a control command from the controller 503 so that the light source 508 can emit light. The liquid crystal layer driver 506 may apply a high voltage to the liquid crystal layer 510 based on a command from the controller 503 so that the cholesteric liquid crystals of the liquid crystal layer 510 become a homeotropic state to convert the liquid crystal layer 510 to the transmissive mode. Since the transparent display 507 is not driven in the fourth mode, unlike the third mode, the display apparatus 500 may display neither an image nor information. Also, since the liquid crystal layer 510 is converted to the transmissive mode, light generated by the light source 508 and transferred forward may be transmitted through the transparent display 507, and light transferred backward may be transmitted through the liquid crystal layer 510. Accordingly, in the fourth mode, the display apparatus 500 may function as a lighting.

If an ambient brightness of the display apparatus 500 is greater than or equal to a reference value, in operation 933, the controller 503 may lower the brightness of the light source 508, in operation 934.

Meanwhile, if surroundings of the display apparatus 500 are bright in the fourth mode, it is possible to lower the brightness of the light source 508 in view of power saving. The display apparatus 500 according to the fourth embodiment may include a sensor 502 for sensing an ambient brightness of the display apparatus 500 to sense an ambient brightness of the display apparatus 500. If an ambient brightness of the display apparatus 500 sensed by the sensor 502 is greater than or equal to a reference value, the controller 503 may lower the brightness of the light source 508 to adjust the brightness of the display apparatus 500 functioning as a lighting.

As shown in FIG. 26C, a user may enter a setting UI for converting a mode of the display apparatus 500 through the input device 501. The setting UI may include a first area 140 representing components of the display apparatus 500 to be subject to mode conversion or driving control, and a second area 141 representing modes of the components, as shown in FIG. 26C.

The user may convert the liquid crystal layer 510 displayed on the setting UI to the transmissive mode, drive the light source 508, and stop driving the transparent display 507, through the input device 501, so as to set the display apparatus 500 to the fourth mode in which the display apparatus 500 functions as a lighting. The user may set modes of the individual components of the display apparatus 500 displayed on the setting UI, through the input device 501, for example, a remote controller or a smart phone, or the user may touch the display apparatus 500 to set modes of the individual components of the display apparatus 500 displayed on the setting UI.

If the modes of the individual components constituting the display apparatus 500 displayed on the first area 140 change, the setting UI may display a mode of the display apparatus 500 corresponding to the changed modes. That is, if the modes of the individual components constituting the display apparatus 500 displayed on the first area 140 are set as shown in FIG. 26C, the setting UI may display information indicating that the mode of the display apparatus 500 has changed to the fourth mode, on a part representing the state of the display apparatus 500 of the second area 141. The states of the liquid crystal layer 510, the light source 508, and the transparent display 507 which are displayed on the setting UI may be displayed as text (reflective mode, ON, ON), as shown in FIG. 23C, or as images by which the user can intuitively recognize the states of the liquid crystal layer 510, the transparent display 507, and the light source 508.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display apparatus comprising:
a reflective layer;
a liquid crystal layer disposed in front of the reflective layer, and configured to be converted between a transmissive mode for transmitting outside light, a display mode for reflecting outside light to display an object, and a transflective mode for transmitting outside light and reflecting outside light at a predetermined area; and
a conversion layer disposed between the reflective layer and the liquid crystal layer, and configured to be converted between an opaque mode and a transparent mode.

2. The display apparatus according to claim 1, further comprising a controller configured to:
apply a predetermined voltage to the liquid crystal layer to convert the liquid crystal layer to the transmissive mode,
control supplying of a voltage to the liquid crystal layer to convert the liquid crystal layer to the display mode, and
control supplying of a voltage to an area on which the object is displayed to convert the liquid crystal layer to the transflective mode.

3. The display apparatus according to claim 1, wherein the conversion layer includes Twisted Nematic (TN) liquid crystals.

4. The display apparatus according to claim 3, further comprising:
an input device configured to enable a user to select a first mode for displaying information and a second mode for performing a mirror function; and
a controller configured to:
apply, if the second mode is selected, a predetermined voltage to the liquid crystal layer to convert the liquid crystal layer to the transmissive mode,
stop supplying a voltage to the conversion layer to convert the conversion layer to the transparent mode,
control, if the first mode is selected, supplying of a voltage to the liquid crystal layer to convert the liquid crystal layer to the display mode, and
apply a predetermined voltage to the conversion layer to convert the conversion layer to the opaque mode.

5. The display apparatus according to claim 4, wherein:
the input device is further configured to enable a user to further select a third mode for performing a mirror function and displaying the object at the predetermined area, and
if the third mode is selected, the controller is further configured to:
apply a predetermined voltage to the liquid crystal layer to convert the liquid crystal layer to the transflective mode,
control supplying of a voltage to the predetermined area on which the object is displayed so that the predetermined area has predetermined reflectivity, and
stop supplying a voltage to the conversion layer to convert the conversion layer to the transmissive mode.

6. The display apparatus according to claim 5, further comprising a sensor configured to sense an ambient brightness around the display apparatus,
wherein if an ambient brightness sensed by the sensor is greater than or equal to a reference value, the controller is further configured to reduce reflectivity of the predetermined area on which the object is displayed to be lower than the reflectivity of the liquid crystal layer in the first mode.

7. The display apparatus according to claim 5, further comprising a sensor configured to sense an ambient brightness around the display apparatus,
wherein:
if the third mode is selected, the controller is further configured to stop supplying a voltage to a part of pixels constituting the predetermined area on which the object is displayed, and
if an ambient brightness sensed by the sensor is greater than or equal to a reference value, the controller is further configured to supply a voltage to the part of the pixels so that the part of the pixels has reflectivity that is lower than the reflectivity of the liquid crystal layer in the first mode.

8. The display apparatus according to claim 1, wherein the conversion layer includes Vertical Alignment (VA) liquid crystals.

9. The display apparatus according to claim 8, further comprising:
an input device configured to enable a user to select a first mode for displaying information and a second mode for performing a mirror function; and
a controller configured to:
apply, if the second mode is selected, a predetermined voltage to the liquid crystal layer to convert the liquid crystal layer to the transmissive mode,
apply a predetermined voltage to the conversion layer to convert the conversion layer to the transparent mode,
control, if the first mode is selected, supplying of a voltage to the liquid crystal layer to convert the liquid crystal layer to the display mode, and
stop applying a voltage to the conversion layer to convert the conversion layer to the opaque mode.

10. The display apparatus according to claim 9, wherein the input device is configured to enable a user to further select a third mode for performing a mirror function and displaying the object at the predetermined area, and
wherein if the third mode is selected, the controller is further configured to:
apply a predetermined voltage to the liquid crystal layer to convert the liquid crystal layer to a transflective mode,
adjust supplying of a voltage to the predetermined area on which the object is displayed so that the predetermined area has predetermined reflectivity, and
apply a predetermined voltage to the conversion layer to convert the conversion layer to the transparent mode.

11. The display apparatus according to claim 10, further comprising a sensor configured to sense an ambient brightness around the display apparatus,
wherein if an ambient brightness sensed by the sensor is greater than or equal to a reference value, the controller is further configured to supply a voltage to the predetermined area on which the object is displayed so that the predetermined area has reflectivity that is lower than the reflectivity of the liquid crystal layer in the first mode.

12. The display apparatus according to claim 10, further comprising a sensor configured to sense an ambient brightness around the display apparatus,
wherein:
if the third mode is selected, the controller is further configured to stop supplying a voltage to a part of pixels constituting the predetermined area on which the object is displayed, and
if an ambient brightness sensed by the sensor is greater than or equal to a reference value, the controller is further configured to supply a voltage to the part of the pixels so that the part of the pixels has reflectivity that is lower than the reflectivity of the liquid crystal layer in the first mode.

13. The display apparatus according to claim 1, wherein the reflective layer includes a device to be converted between a reflective mode and a transparent mode depending on whether or not a voltage is applied.

14. The display apparatus according to claim 1, wherein the liquid crystal layer comprises:
cholesteric liquid crystals; and
a substrate including an electrode configured to apply a voltage to the cholesteric liquid crystals.

15. The display apparatus according to claim 14, wherein the substrate further includes an auxiliary electrode disposed in electrodes, and having electrical conductivity that is higher than the electrical conductivity of the electrodes.

16. The display apparatus according to claim 15, wherein auxiliary electrodes are disposed in at least one of end portion in a width direction of the electrodes to narrow space between the electrodes.

17. The display apparatus according to claim 14, wherein an auxiliary panel further includes a partition wall disposed in space between electrodes.

18. The display apparatus according to claim 14, wherein:
the substrate comprises:
a first substrate including a plurality of first electrodes; and
a second substrate including a plurality of second electrodes, and facing the first substrate, and
the cholesteric liquid crystals are disposed between the first substrate and the second substrate.

19. The display apparatus according to claim 18, wherein the liquid crystal layer includes a partition wall aligned in at least one direction of a direction extending from space between the plurality of first electrodes toward the second substrate and a direction extending from space between the plurality of second electrodes toward the first substrate.

* * * * *